(12) United States Patent
Baillie et al.

(10) Patent No.: US 12,311,768 B2
(45) Date of Patent: May 27, 2025

(54) ELECTRIC AXLE ASSEMBLY

(71) Applicant: ALLISON TRANSMISSION, INC., Indianapolis, IN (US)

(72) Inventors: Christopher G. Baillie, Lake Orion, MI (US); Shaun Mepham, Clarkston, MI (US)

(73) Assignee: Allison Transmission, Inc., Indianapolis, IN (US)

( * ) Notice: Subject to any disclaimer, the term of this patent is extended or adjusted under 35 U.S.C. 154(b) by 129 days.

(21) Appl. No.: 17/280,664

(22) PCT Filed: Sep. 27, 2019

(86) PCT No.: PCT/US2019/053648
§ 371 (c)(1),
(2) Date: Mar. 26, 2021

(87) PCT Pub. No.: WO2020/069437
PCT Pub. Date: Apr. 2, 2020

(65) Prior Publication Data
US 2021/0379983 A1    Dec. 9, 2021

Related U.S. Application Data

(60) Provisional application No. 62/737,452, filed on Sep. 27, 2018.

(51) Int. Cl.
*B60K 7/00* (2006.01)
*B60K 11/02* (2006.01)

(52) U.S. Cl.
CPC ............ *B60K 7/0007* (2013.01); *B60K 11/02* (2013.01); *B60K 2007/0092* (2013.01)

(58) Field of Classification Search
CPC .................. B60K 7/0007; B60K 11/02; B60K 2007/0092
(Continued)

(56) References Cited

U.S. PATENT DOCUMENTS 7,307,363 B2    12/2007    Pashnik et al.
7,379,154 B2 *   5/2008    Bruls .................. G03F 7/70308
                                                          355/75

(Continued)

FOREIGN PATENT DOCUMENTS

CN         1937366 A      3/2007
CN       103069696 A      4/2013
(Continued)

OTHER PUBLICATIONS

United Kingdom Combined Search and Examination Report for Application No. GB2219304.9, Feb. 6, 2023, 2 pages.
(Continued)

*Primary Examiner* — Hau V Phan
(74) *Attorney, Agent, or Firm* — Barnes & Thornburg LLP

(57) ABSTRACT

An electric axle assembly includes a drive unit and a drive train stored in a case, and a cooling system coupled to the case for circulating a cooling fluid through the case. The electric axle assembly is mounted on a vehicle to support the vehicle for movement along a ground surface. The drive unit provides motive force through the drive train to wheels of the vehicle for propelling the vehicle along the ground.

6 Claims, 51 Drawing Sheets

(58) Field of Classification Search
USPC ..................................................... 180/65.51
See application file for complete search history.

(56) References Cited

U.S. PATENT DOCUMENTS

| | | | |
|---|---|---|---|
| 7,397,154 B2 | 7/2008 | Tilton et al. | |
| 7,679,234 B1* | 3/2010 | Tilton | H02K 9/20 |
| | | | 361/699 |
| 8,188,625 B2* | 5/2012 | Fukushima | H02K 9/19 |
| | | | 310/54 |
| 8,247,933 B2* | 8/2012 | Dang | H02K 1/20 |
| | | | 310/59 |
| 8,466,649 B2* | 6/2013 | Hyde | H02K 9/24 |
| | | | 318/725 |
| 8,482,167 B2 | 7/2013 | Erfanfar et al. | |
| 8,541,915 B2 | 9/2013 | Burns et al. | |
| 8,823,223 B2* | 9/2014 | Han | H02K 5/203 |
| | | | 310/64 |
| 9,840,143 B1* | 12/2017 | Keller | F16H 57/04 |
| 9,853,523 B2 | 12/2017 | Caron et al. | |
| 10,630,140 B2 | 4/2020 | Pritchard et al. | |
| 2005/0253465 A1* | 11/2005 | Takenaka | H02K 5/203 |
| | | | 310/52 |
| 2006/0113661 A1* | 6/2006 | Yamabuchi | G05D 23/192 |
| | | | 257/E23.098 |
| 2007/0199339 A1 | 8/2007 | Ishihara et al. | |
| 2009/0208782 A1* | 8/2009 | Lienkamp | H01M 8/04007 |
| | | | 429/415 |
| 2012/0104843 A1* | 5/2012 | Fuchtner | B60L 50/16 |
| | | | 307/9.1 |
| 2012/0104883 A1 | 5/2012 | Burns et al. | |
| 2013/0327511 A1* | 12/2013 | Johnston | F28F 9/02 |
| | | | 165/173 |
| 2016/0061093 A1* | 3/2016 | Johansson | F01P 7/167 |
| | | | 165/41 |
| 2017/0271955 A1 | 9/2017 | Hanumalagutti et al. | |
| 2018/0054097 A1 | 2/2018 | Dlala et al. | |
| 2018/0083509 A1 | 3/2018 | Yang et al. | |
| 2020/0185985 A1 | 6/2020 | Blum et al. | |

FOREIGN PATENT DOCUMENTS

| | | |
|---|---|---|
| CN | 103863078 A | 6/2014 |
| CN | 203645474 U | 6/2014 |
| CN | 106481793 A | 3/2017 |
| CN | 107204684 A | 9/2017 |
| CN | 107284214 A | 10/2017 |
| CN | 107813699 A | 3/2018 |
| DE | 102015214309 | 2/2017 |
| DE | 102015214309 A1 | 2/2017 |
| EP | 1819029 A2 | 8/2007 |
| EP | 2911277 A2 | 8/2015 |
| JP | H09154257 A | 6/1997 |
| JP | 2005278277 A | 10/2005 |
| KR | 20130092261 | 8/2013 |
| KR | 101338796 B1 | 12/2013 |
| KR | 101376224 B1 | 3/2014 |
| WO | 2017114423 A1 | 7/2017 |
| WO | WO2017/114423 | 7/2017 |

OTHER PUBLICATIONS

PCT Search Report and Written Opinion prepared for PCT/US2019/053648, completed Feb. 14, 2020.
International Preliminary Report on Patentability for International Patent Application No. PCT/US2019/053648, Mar. 23, 2021, 7 pages.
International Preliminary Report on Patentability for International Patent Application No. PCT/US2019/053457, Mar. 23, 2021, 8 pages.
Office Action issued in co-pending Chinese Application No. 2019800718573, Aug. 3, 2023, 14 pages.
Office Action issued in co-pending Chinese Application No. 201980074834, Sep. 1, 2023, 22 pages.
Office Action issued in co-pending Chinese Application No. 2019800718573, Jan. 30, 2024, 12 pages.
Examination Report in co-pending European Application No. GB2104852, Mar. 25, 2022.
Combined Search and Examination Report for UK Patent Application No. GB2219305.6, Jan. 20, 2023, 4 pages.
Examination Report for UK Patent Application No. GB2104858.2, Mar. 7, 2022, 2 pages.
PCT Search Report and Written Opinion for PCT/US2019/053457, completed Jan. 21, 2020.
Non-Final Office Action issued Oct. 19, 2023 in U.S. Appl. No. 17/280,668, 14 pages.
Office Action issued in co-pending Chinese Application No. 201980074834, May 25, 2024, 19 pages.
Second Office Action issued in co-pending Chinese Application No. 201980074834, May 25, 2024, 19 pages.

* cited by examiner

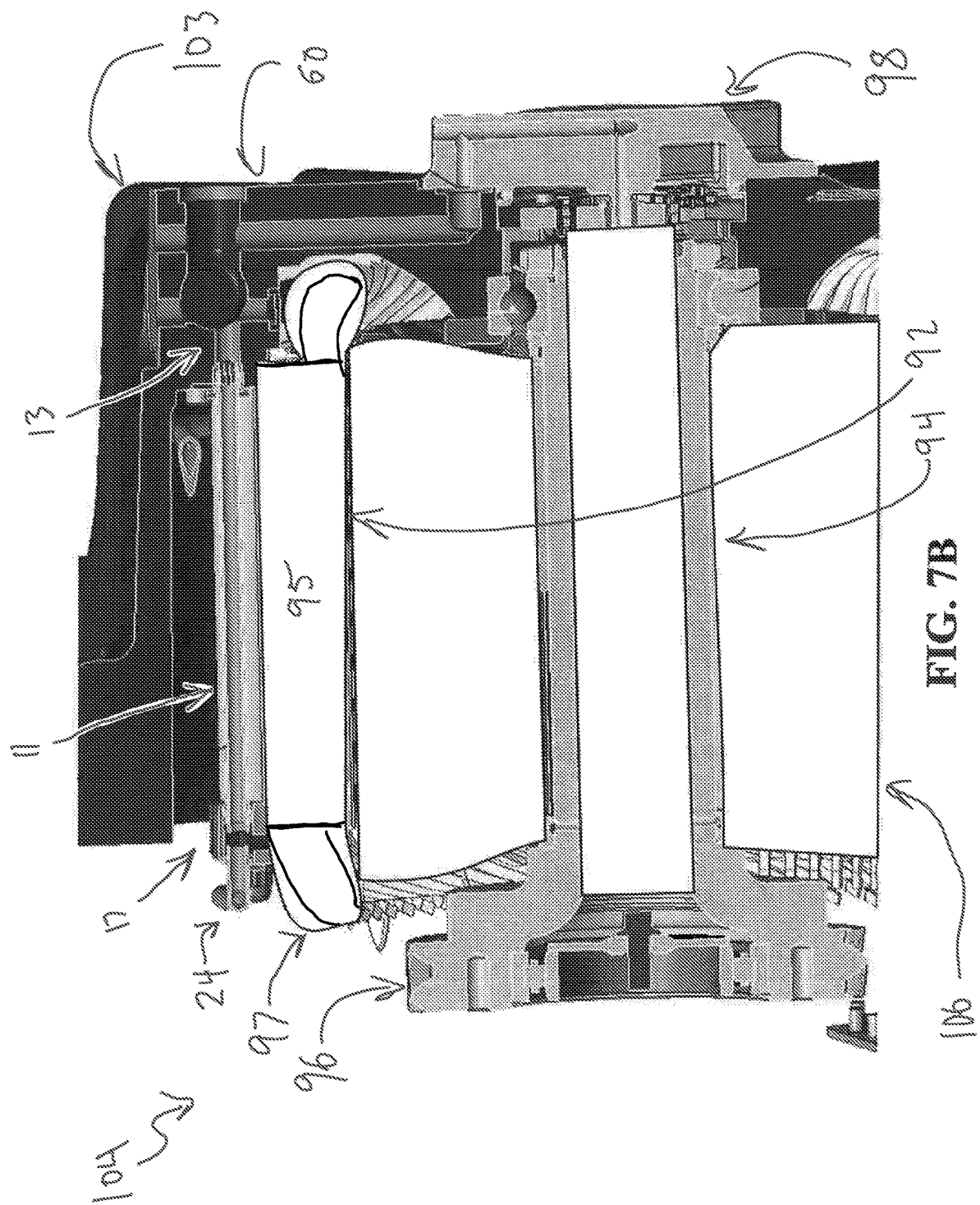

ELECTRIC AXLE ASSEMBLY

CROSS-REFERENCE TO RELATED U.S. PATENT APPLICATION

This present application is the U.S. national phase of PCT/US2019/053648, filed on Sep. 27, 2019, which claims priority under 35 U.S.C. § 119 (e) to U.S. Provisional Patent Application Ser. No. 62/737,452, filed on Sep. 27, 2018, the disclosures of both of which are hereby incorporated by reference in their entirety.

TECHNICAL FIELD

The present disclosure relates generally to axle assemblies for vehicles, and more particularly, to an electric axle assembly for a vehicle.

BACKGROUND

Many vehicles utilize axles to support the vehicle. At least some of these axles are drive axles capable of propelling the vehicle. Typically, an internal combustion engine is coupled to the drive axle via a driveshaft. Increasingly, manufacturers have turned to electric and hybrid propulsion systems for increased performance and efficiency.

Accordingly, there is a need to provide an axle assembly that allows one or more electric drive units to be packaged into the vehicle while optimizing efficiency and performance.

SUMMARY

According to an aspect of the present disclosure, an electric axle assembly includes a drive assembly and a cooling system coupled to the drive assembly. The drive assembly may include a drive unit and a drive train housed in a case. The drive unit may be engaged with the drive train and configured to provide motive force to the drive train. The cooling system may include a pump, a heat exchanger, and a fluid-delivery network. The pump may be configured to pass a cooling fluid from the case to the heat exchanger. The heat exchanger may be configured to draw heat from the cooling fluid. The fluid-delivery network may be configured to pass the cooling fluid from the heat exchanger to at least one of the drive unit and the drive train.

In illustrative embodiments, the fluid-delivery network may include at least one of conduits coupled to the case and passageways formed into the case.

In illustrative embodiments, the conduits may be in fluid communication with the passageways.

In illustrative embodiments, the fluid-delivery network may be arranged to direct the cooling fluid onto and/or into the drive unit for cooling the drive unit.

In illustrative embodiments, the drive assembly may be a first drive assembly, and the electric axle assembly may further include a suspension frame and a second drive assembly. The first and second drive assemblies may be coupled to opposing sides of the suspension frame.

In illustrative embodiments, the cooling system may be coupled to the first and second drive assemblies.

In illustrative embodiments, the cooling system may be a first cooling system coupled to the first drive assembly, and the electric axle assembly may further include a second cooling system coupled to the second drive assembly.

In illustrative embodiments, an exchange medium may flow through the heat exchanger and transfer heat from the cooling fluid to the exchange medium in the heat exchanger.

In illustrative embodiments, the case may be formed to define a sump for collecting the cooling fluid. The pump may draw the cooling fluid from the sump. The cooling fluid may be configured to draw heat from the drive unit and flow into the sump.

In illustrative embodiments, the cooling fluid may be configured to lubricate at least one of the drive unit and the drive train.

According to an aspect of the present disclosure, a cooling system may be used with a drive unit having a stator and a rotor, the rotor having a core and windings coupled to the core, and the rotor adapted for rotation relative to the stator. The cooling system may include a pump, a heat exchanger, and a fluid-delivery network. The pump may be configured to pass a cooling fluid to the heat exchanger. The heat exchanger may be configured to draw heat from the cooling fluid. The fluid-delivery network may be configured to pass the cooling fluid from the heat exchanger to the drive unit.

In illustrative embodiments, the fluid-delivery network may be arranged to direct the cooling fluid onto and/or into the drive unit for cooling the drive unit.

In illustrative embodiments, an exchange medium may flow through the heat exchanger and transfer heat from the cooling fluid to the exchange medium in the heat exchanger.

In illustrative embodiments, the cooling fluid may be configured to lubricate the drive unit.

In illustrative embodiments, the fluid-delivery network may include at least one of conduits coupled to a case housing the drive unit and passageways formed into the case.

In illustrative embodiments, the fluid-delivery network may include a plurality of conduits comprising at least one of: a winding sprayer configured to spray the cooling fluid on the windings of the stator; a core sprayer configured to spray the cooling fluid on the core of the stator; and a feed tube configured to pass the cooling fluid to a ring coupled to the drive unit.

According to an aspect of the present disclosure, a drive assembly includes a case, a drive train housed in the case, a drive unit housed in the case, and a cooling system coupled to the case. The drive unit may be engaged with the drive train and configured to provide motive force to the drive train during operation of the drive unit. The cooling system may include a pump, a heat exchanger, and a fluid-delivery network. The pump may be configured to pass a cooling fluid from the case to the heat exchanger. The heat exchanger may be configured to draw heat from the cooling fluid. The fluid-delivery network may be arranged to direct the cooling fluid onto and/or into the drive unit for cooling the drive unit. The fluid-delivery network may also be configured to pass the cooling fluid from the heat exchanger to at least one of the drive unit and the drive train.

In illustrative embodiments, the fluid-delivery network may include at least one of conduits coupled to the case and passageways formed into the case, and the conduits may be in fluid communication with the passageways.

In illustrative embodiments, an exchange medium may flow through the heat exchanger and transfer heat from the cooling fluid to the exchange medium in the heat exchanger.

In illustrative embodiments, the case may be formed to define a sump for collecting the cooling fluid. The pump may draw the cooling fluid from the sump. The cooling fluid may be configured to draw heat from the drive unit and flow into the sump.

In illustrative embodiments, the cooling fluid may be configured to lubricate at least one of the drive unit and the drive train.

BRIEF DESCRIPTION OF THE DRAWINGS

The systems and methods described herein are illustrated by way of example and not by way of limitation in the accompanying figures (abbreviated as "Fig." or "Figs." herein). For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 7B is a similar view to FIG. 7A.

DETAILED DESCRIPTION

Figure 1:
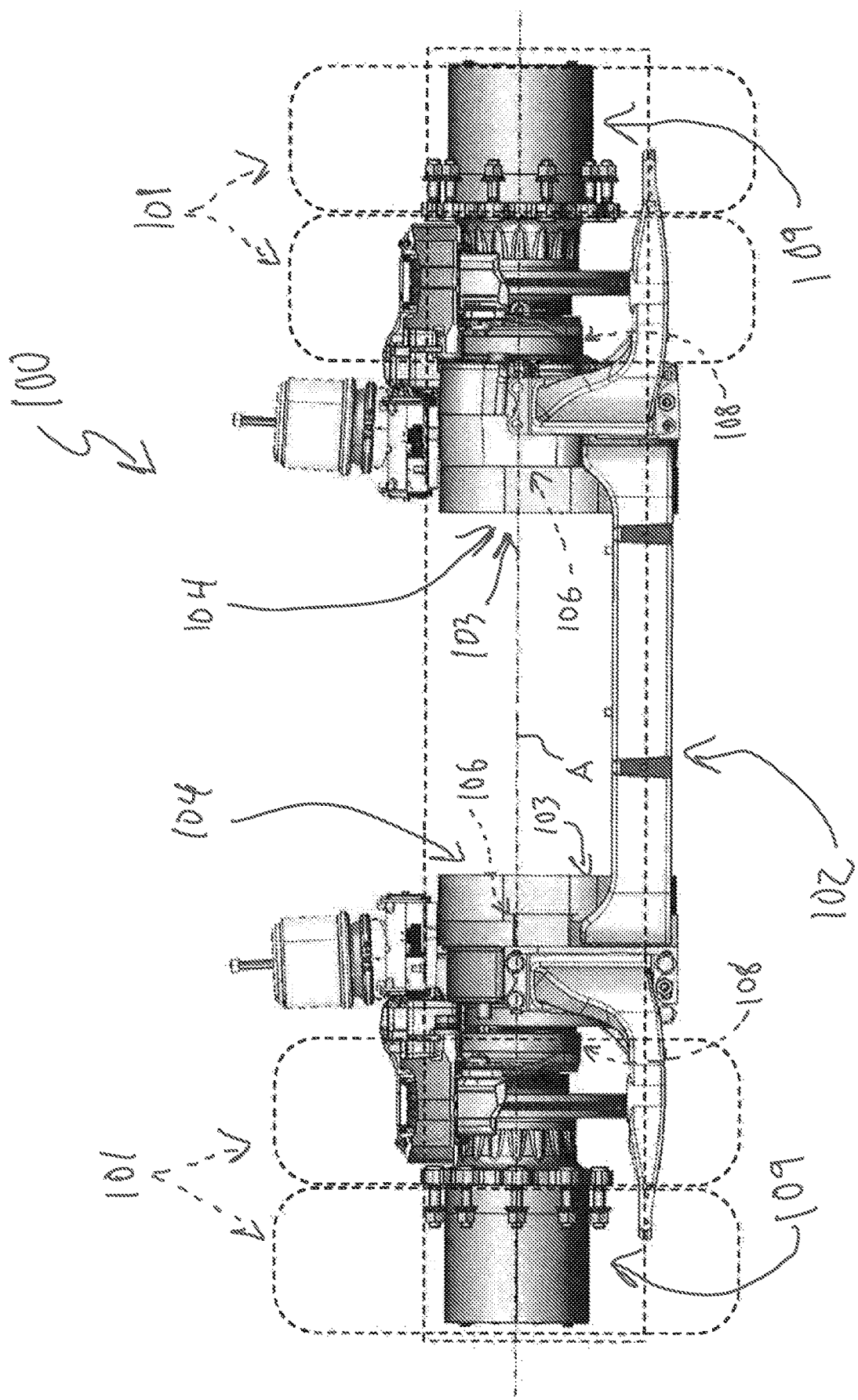
FIG. 1 is a front elevation view of an electric axle assembly for a low floor vehicle according to a first embodiment of the present disclosure.
Figure 2:
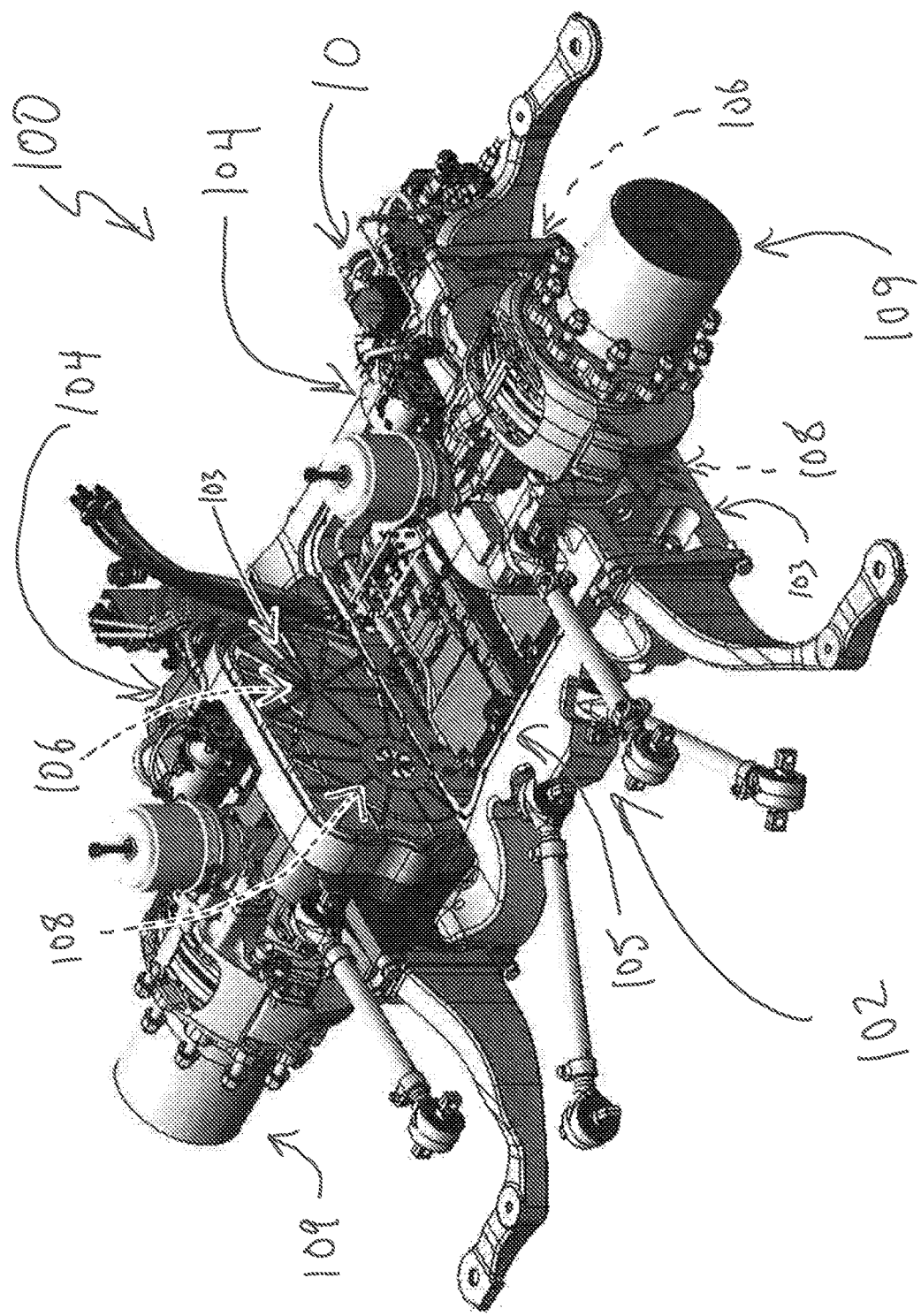
FIG. 2 is a front perspective view of the electric axle assembly shown in FIG. 1.
Figure 3:
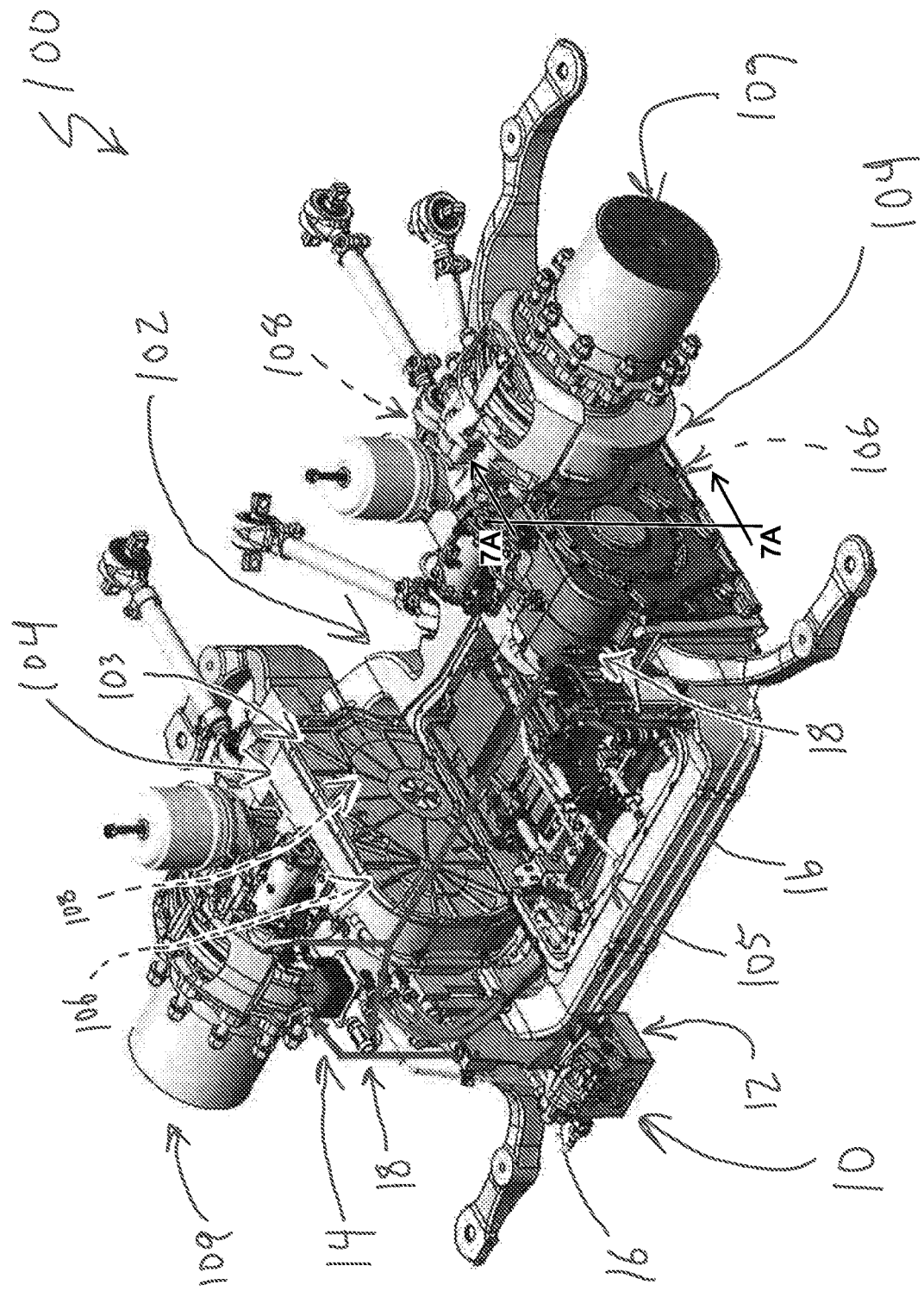
FIG. 3 is a rear perspective view of the electric axle assembly of FIG. 1 with an exemplary cooling system of the electric axle assembly shown schematically.
Figure 4:
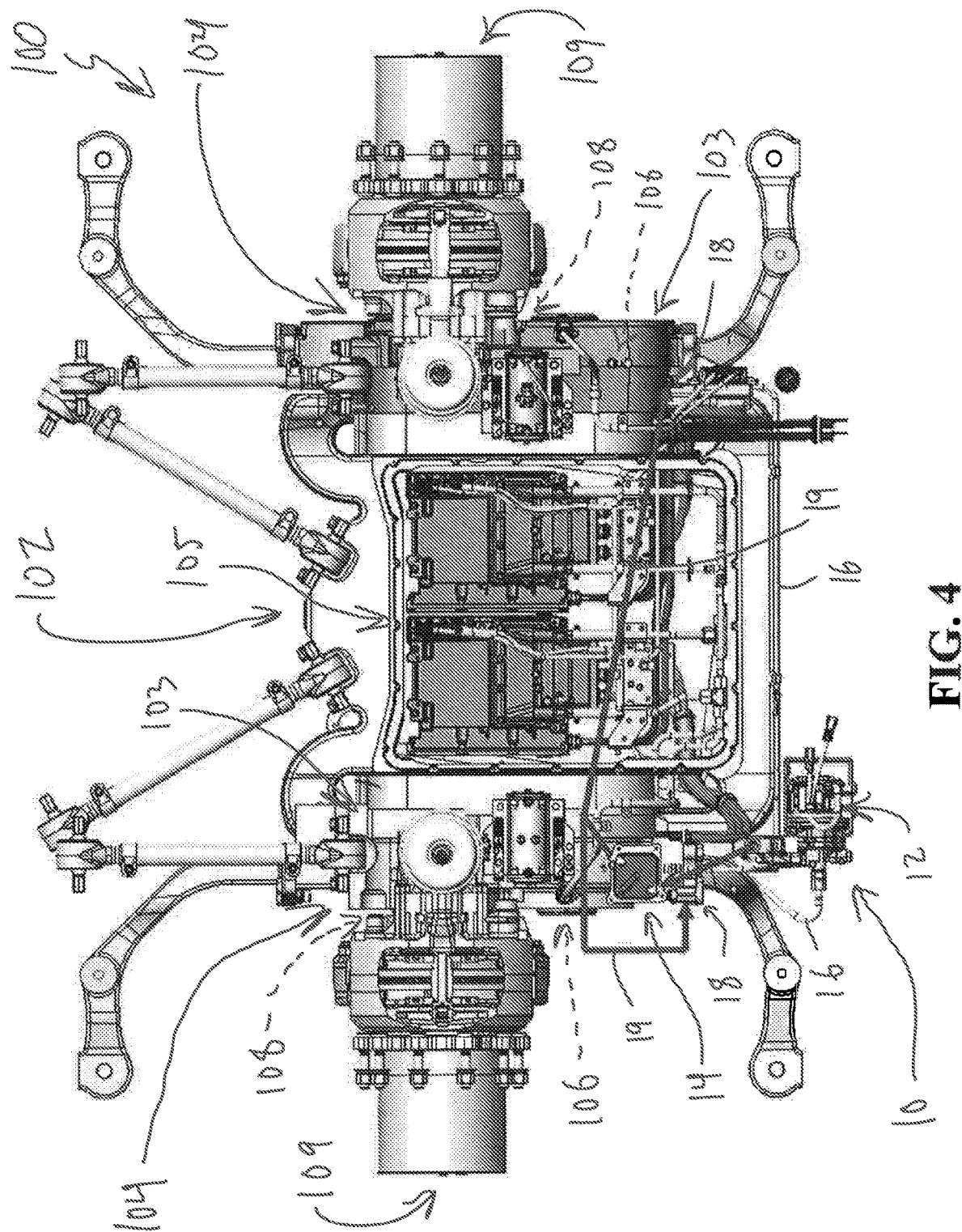
FIG. 4 is a top plan view of the electric axle assembly of FIG. 3.
Figure 5:
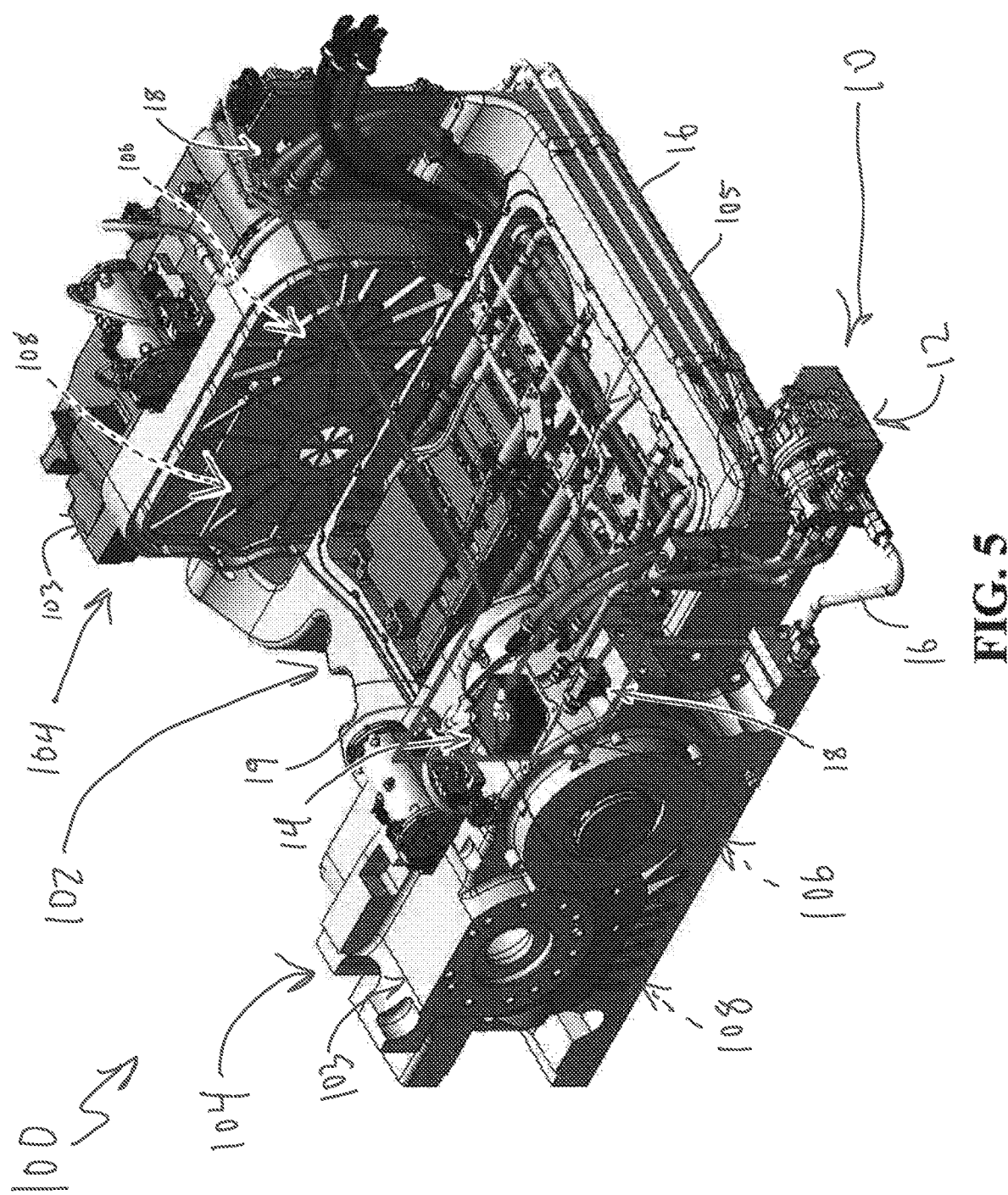
FIG. 5 is a partial rear perspective view of the electric axle assembly of FIG. 3 with suspension and wheel end components removed.
Figure 6:
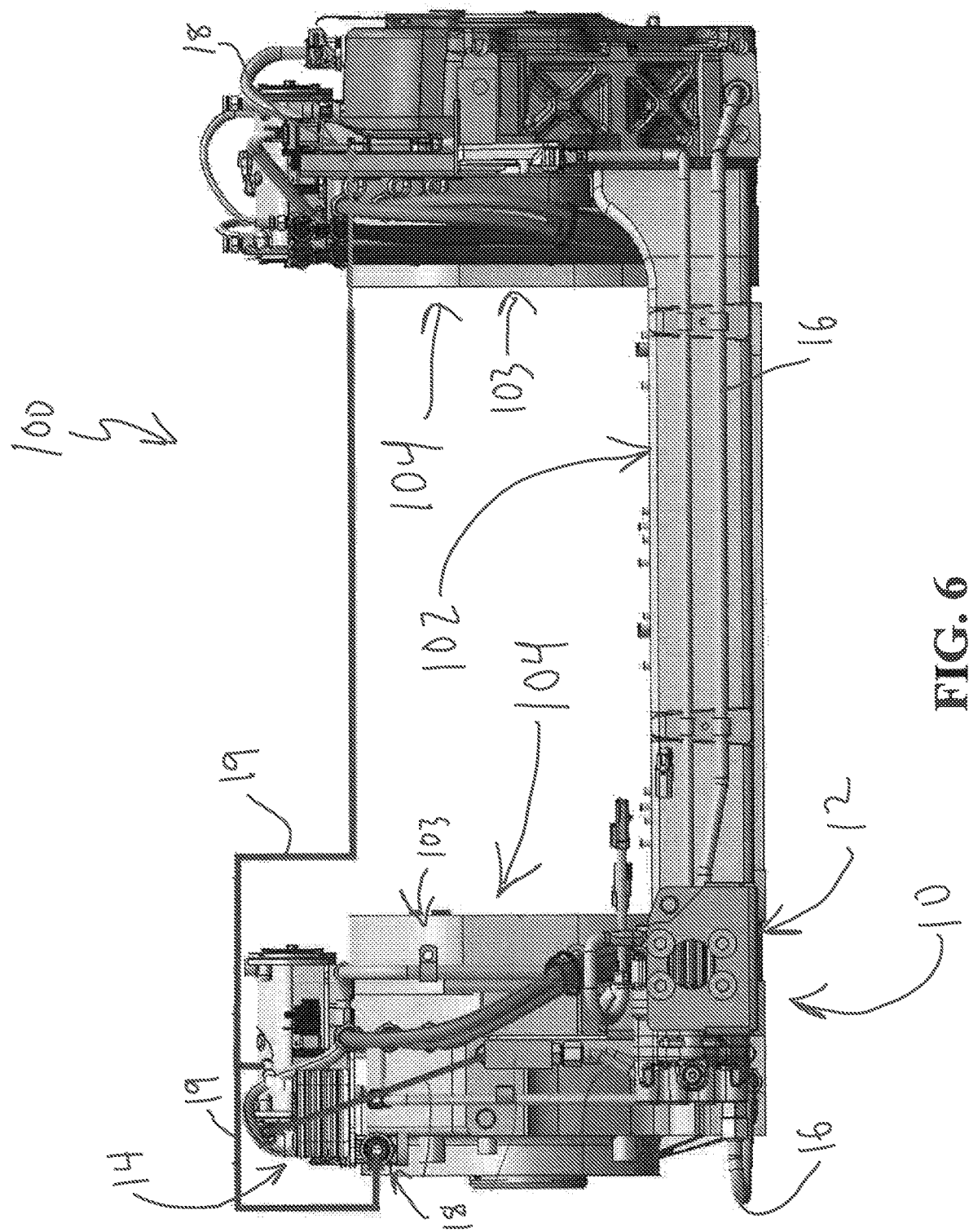
FIG. 6 is a rear elevation view of the electric axle assembly of FIG. 5.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 9:
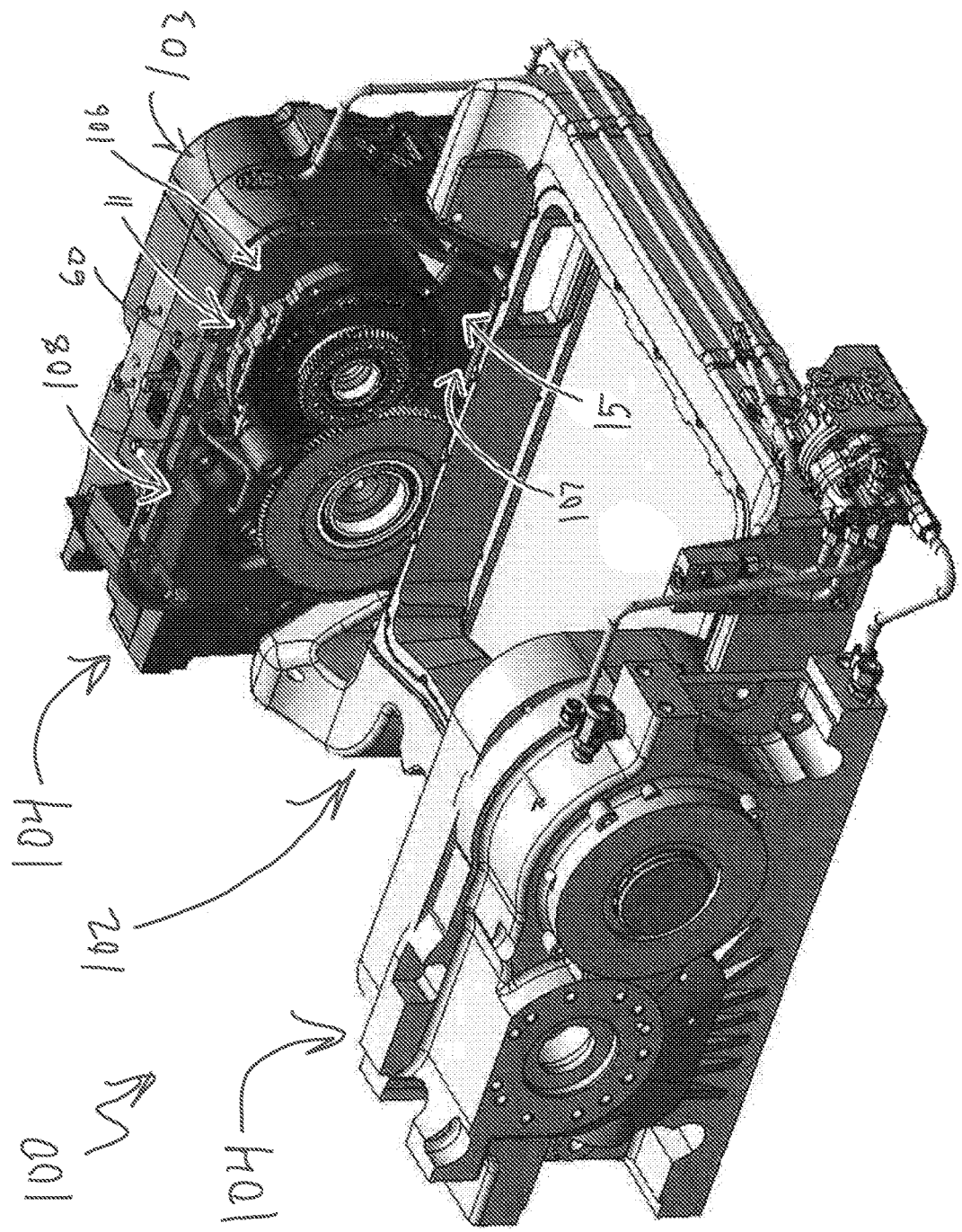
FIG. 9 is a rear perspective view of the electric axle assembly of FIG. 5 with a portion of the case removed.
Figure 10:
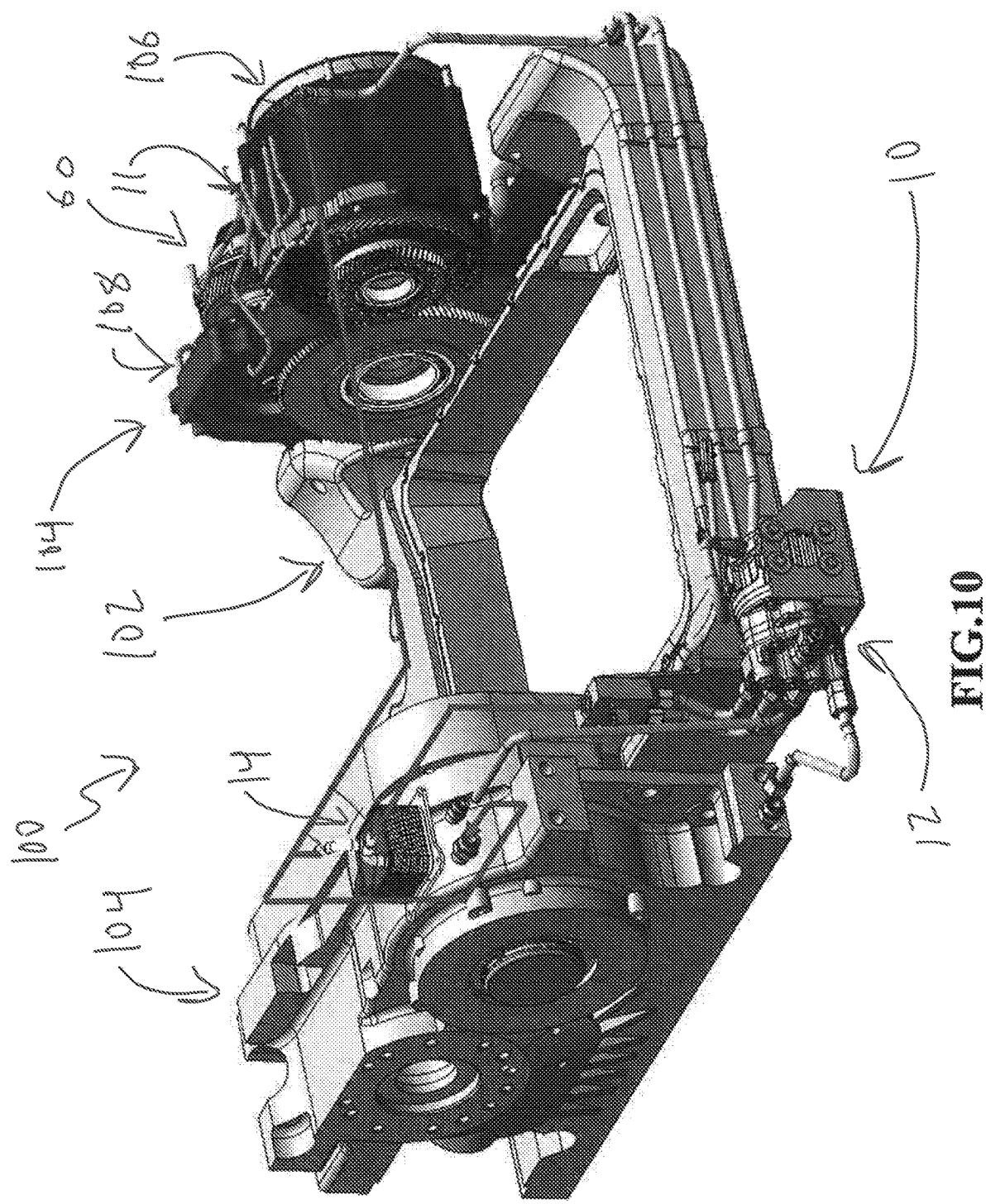
FIG. 10 is a similar view to FIG. 9 with the case removed and the cooling system shown schematically.
Figure 11:
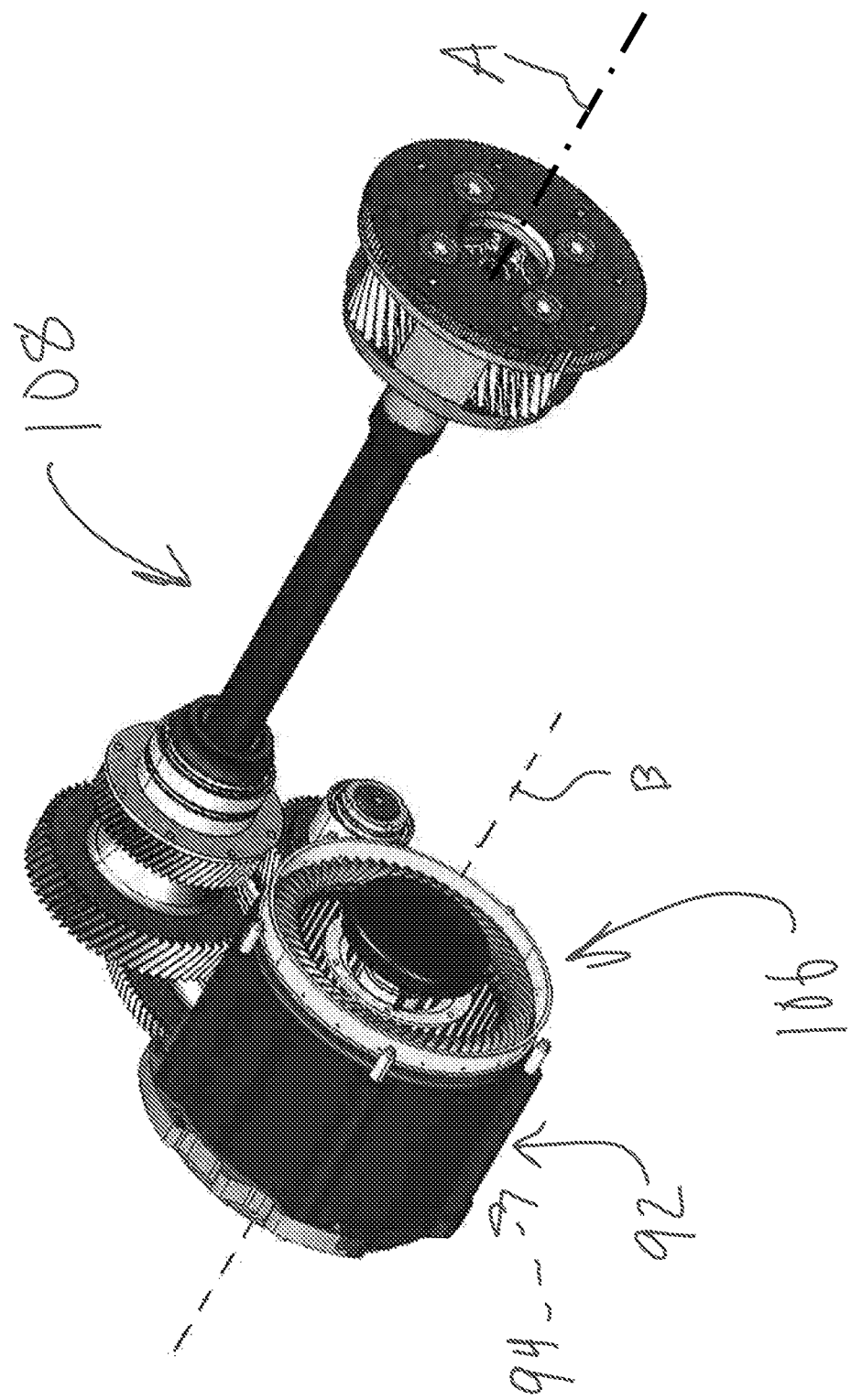
FIG. 11 is a perspective view of an exemplary gear train and a drive unit for the axle assembly shown in FIG. 1.

An illustrative electric axle assembly 100 in accordance with the present disclosure is shown in FIGS. 1-4. The electric axle assembly 100 can be used, for example, in a low floor vehicle, such as a bus, to support the vehicle for travel over the ground and propel the vehicle. The electric axle assembly 100 includes a suspension frame 102 and a pair of drive assemblies 104 coupled to opposing sides of the suspension frame 102. The suspension frame 102 attaches to a vehicle frame (not shown) for supporting the drive assemblies 104 relative to the vehicle frame. A controller 105 controls operation of the electric axle assembly 100. Each of the drive assemblies 104 includes a drive unit 106, such as an electric motor, and a drive train 108. The drive units 106 and drive trains 108 are housed in cases 103 of the drive assemblies 104 as shown in FIG. 9. Wheel hubs 109 allow attachment of wheels 101 to the drive assemblies 104 for rotation about an axis A with rotation of the drive trains 108 as suggested in FIG. 1. The drive units 106 provide motive force to the wheels 101 through the drive trains 108 for propelling the vehicle along the ground. An exemplary drive unit 106 and drive train 108 are shown in FIG. 11. Examples of axle assemblies for low floor vehicles are shown in International Patent Application Publication No. WO2019/014479 and International Patent Application No. PCT/US2019/031786, the disclosures of which are both incorporated by reference herein in their entireties.

A cooling system 10 in accordance with the present disclosure circulates a cooling fluid, such as oil, transmission fluid, or other substantially non-conductive fluid, to drive assemblies 104 as suggested in FIGS. 3-10. The cooling fluid circulated by the cooling system 10 controls heat produced by the drive units 106 during operation. In the illustrative embodiment, the cooling system 10 includes a pump 12 and a heat exchanger 14 as shown in FIGS. 3-6. The pump 12 draws cooling fluid from the cases 103 of the drive assemblies 104 through conduits 16. The pump 12 can be driven by one of the drive units 106 and/or drive trains 108 and/or through a separate drive arrangement. The cooling fluid passes through the heat exchanger 14 to remove heat from the cooling fluid. The cooled fluid passes through conduits (schematically represented by arrows 19 showing the direction of flow) and enters cases 103 through inlets 18. The cooling fluid is distributed through the case 103 for cooling and/or lubricating the drive units 106 and/or the drive trains 108. In some embodiments, the heat exchanger 14 is an air-cooled heat exchanger. In some embodiments, the heat exchanger 14 is a liquid-cooled heat exchanger passing an exchange medium, such as water or antifreeze, in a parallel or counter flow to draw heat from the cooling fluid into the exchange medium. In some embodiments, the exchange medium can be used in another cooling system elsewhere in the vehicle to cool other vehicle components, such as the batteries and/or power inverters. In some embodiments, multiple pumps 12 and/or heat exchangers 14 can be used. In some embodiments, each drive assembly 104 is provided with its own cooling system 10.

The cooling fluid flows onto and/or into the drive unit 106 and/or drive train 108 and down to a lower portion of the case 103 (e.g., near suspension frame 102) defining a sump 107 for the cooling fluid to collect. In some embodiments, a pickup 15 is arranged in the sump 107 and fluidly coupled to the pump 12 (such as by a conduit 16) to draw cooling fluid from the case 103 for re-circulation as shown in FIGS. 9, 10, 12, and 13 (cover removed). In some embodiments, the pickup 15 includes a filter to clear debris from the cooling fluid. In some embodiments, a filter is coupled to the cooling system 10 outside of the cases 103 for clearing debris from the cooling fluid. One or more gears of the drive train 108 can extend into the sump 107 for spreading the cooling fluid to other gears of the drive train 108. Rotation of the gears can also splash the cooling fluid throughout the case 103 for lubricating contact surfaces.

Figure 7A:
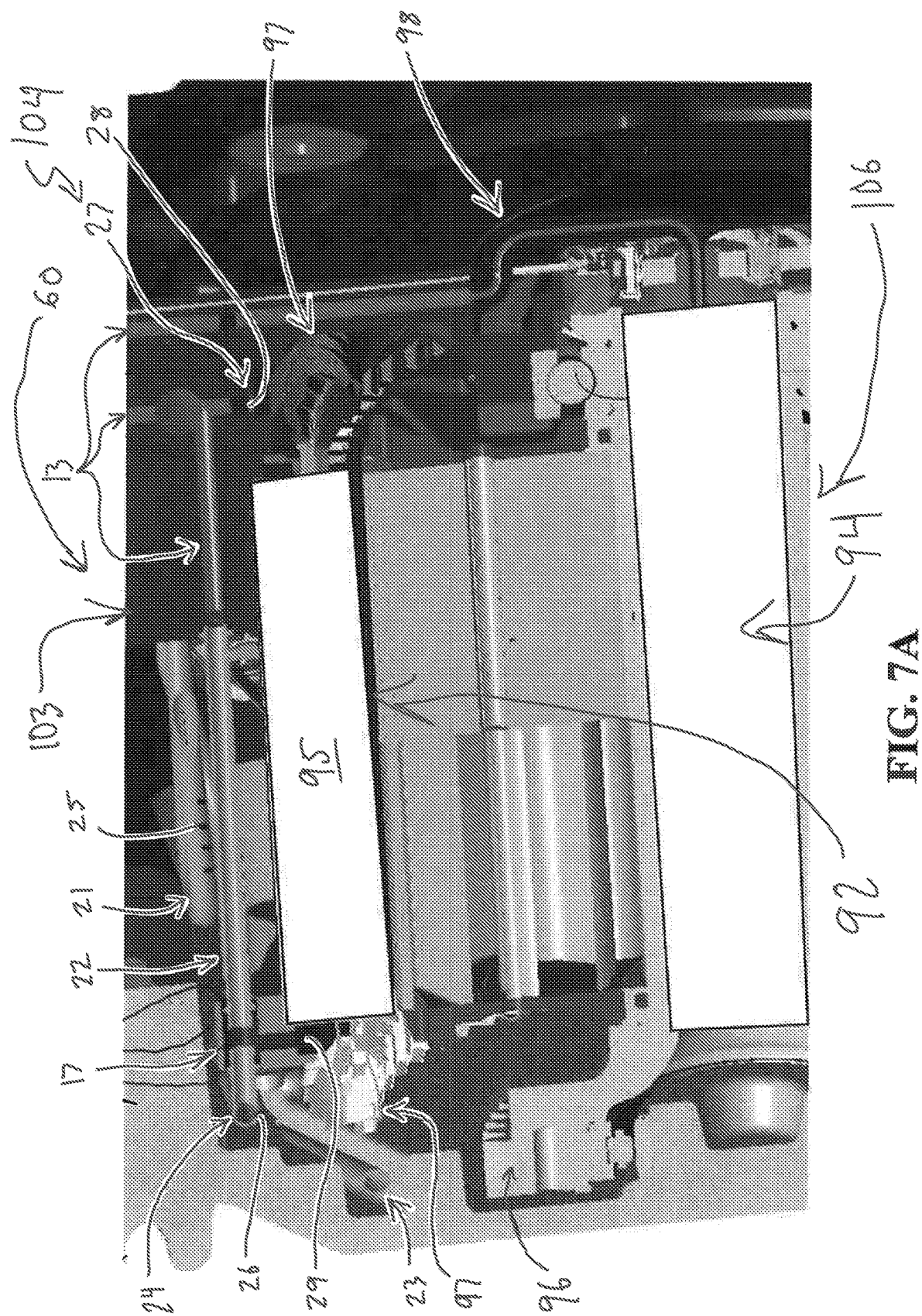
FIG. 7A is a cross-sectional perspective view taken along line 7A-7A in FIG. 3.
Figure 8:
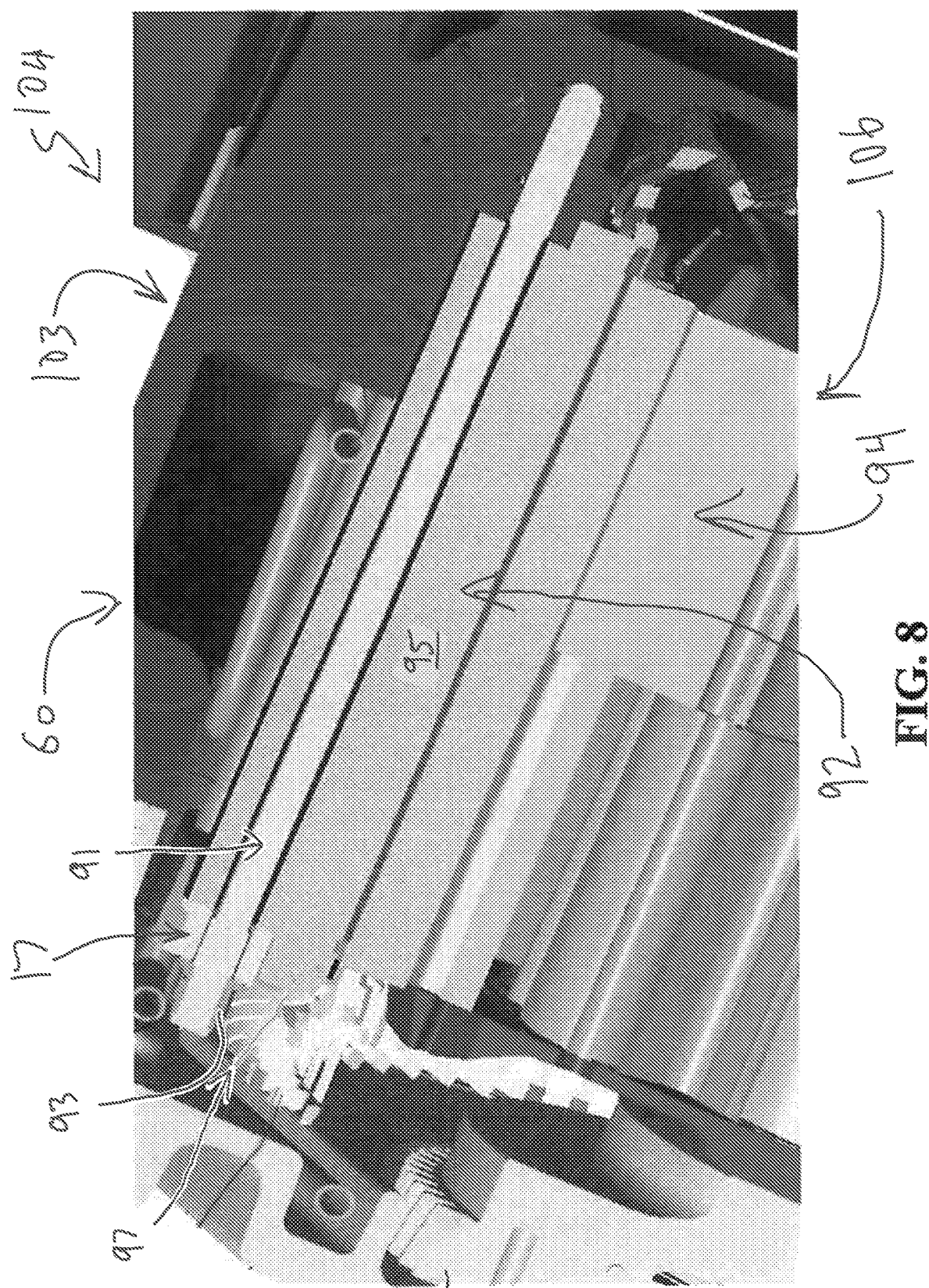
FIG. 8 is a similar view to FIG. 7A.
Figure 12:
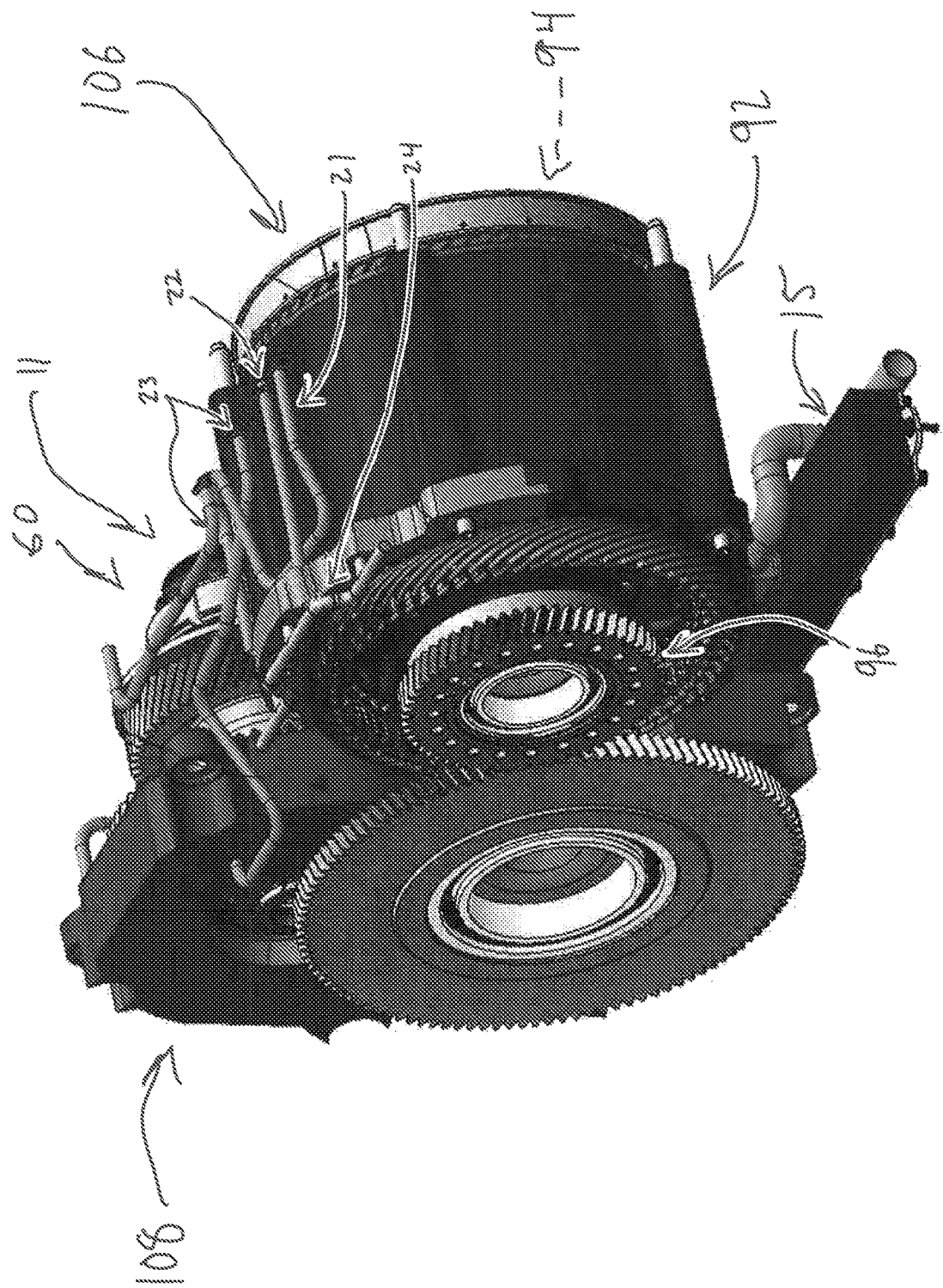
FIG. 12 is a perspective view of the drive unit of FIG. 11 and part of the gear train and cooling system.
Figure 13:
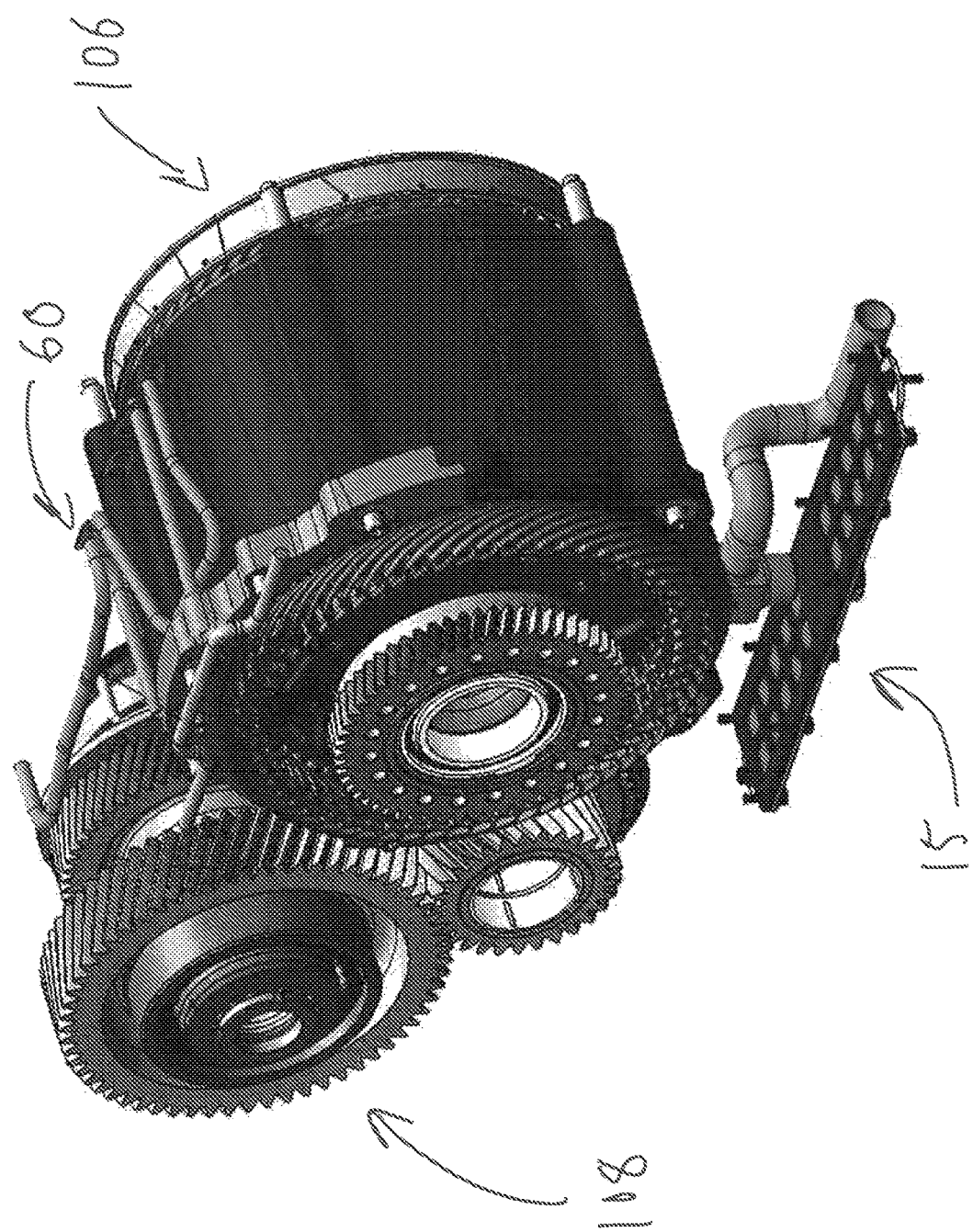
FIG. 13 is a view similar to FIG. 12.

An exemplary drive unit 106 is shown in FIGS. 11-13. The drive unit 106 includes a stator 92 and a rotor 94. The stator 92 is coupled to the case 103 of the drive assembly 104, and the rotor 94 is arranged for rotation relative to the stator 92 about an axis B. A pinion gear 96 is coupled to the rotor 94 and engaged with the drive train 108 for transferring motive force from the drive unit 106 to the drive train 108 as shown in FIG. 12. In some embodiments, the drive unit 106 includes internal passageways in the stator 92 and/or rotor 94 for flow of cooling fluid through the drive unit 106. The stator 92 includes a core 95 and windings 97 as shown in FIGS. 7A-8. The core 95 has a tubular profile, and the windings 97 include electrical conductors, such as copper wire, circumferentially distributed around the core 95 that receive electric energy to generate a magnetic field for driving rotation of the rotor 94.

In the illustrative embodiment, one or more conduits 11 are provided as part of the cooling system 10 for directing the cooling fluid from the heat exchanger 14 to the drive unit 106 and/or drive train 108. The conduits 11 can be arranged to pass the cooling fluid into the internal passageways of the drive unit 106 and/or direct cooling fluid onto the drive unit 106. In some embodiments, the conduits 11 are coupled to passageways 13 in the case 103 for passing cooling fluid from the inlet 18 to the drive unit 106 and/or drive train 108 as shown in FIGS. 7A-8. The passageways 13 extend along and through portions of the case 103 to distribute the cooling fluid to the conduits 11 and otherwise circulate the cooling fluid around the drive assembly 104. The passageways 13 can be formed as part of a casting process or post-processing of the case 103, for example. In some embodiments, the passageways 13 of the case 103 are used without the conduits 11. In some embodiments, the conduits 11 are used without the passageways 13. In some embodiments, one or more rings 17 are arranged to receive the cooling fluid and distribute the cooling fluid around the stator 92 and/or rotor 94, such as for distribution of the cooling fluid to passageways in the drive unit 106. In some embodiments, a cap 98 coupled to the case 103 is arranged to receive cooling fluid from a passageway 13 of the case 103 and pass the cooling fluid into the rotor 94 and/or stator 92 of the drive unit 106.

In exemplary embodiments, the conduits 11 can include one or more core sprayers 21, feed tubes 22, transfer tubes 23, winding sprayers 24, and other possible conduit configurations for delivering cooling fluid through the drive assembly 104 as suggested in FIGS. 7A-10 and 12-13. The conduits 11 can be supplied with cooling fluid by one or more of the passageways 13 in the case 103 or otherwise supplied with cooling fluid from the pump 12. In the illustrative embodiment, the core sprayer 21 is arranged above the drive unit 106 and in fluid communication with the passageways 13 of the case 103. The core sprayer 21 can be formed in a generally S-shaped or U-shaped profile defining a plurality of legs (FIG. 12), with one or more of the legs formed to include one or more outlet orifices 25 (FIG. 7A). Cooling fluid that flows into the core sprayer 21 is distributed into each leg, which feeds the series of outlet orifices 25 to spray the cooling fluid onto the core 95 of the stator 92. It is contemplated that the core sprayer 21 could define more or less than three legs. Other configurations are also contemplated. As shown in FIGS. 7A and 7B, the feed tube 22 transfers cooling fluid from the passageways 13 of the case 103 to a ring 17 having one or more internal passageways 29 for distribution of the cooling fluid around the drive unit 106 and for use by the drive unit 106. In some embodiments, the passageways 29 of the ring 17 can be formed as a cavity during a molding process, with an insert molding process, or by a machining operation, for example. The transfer tubes 23 direct cooling fluid to the drive train 108 and other portions of the drive assembly 104.

The winding sprayer 24 can be arranged above the windings 97 of the drive unit 106 and formed to include outlet orifices 26 for spraying cooling fluid onto the windings 97 as shown in FIG. 7A. In some embodiments, the winding sprayer 24 is coupled to the ring 17 and receives cooling fluid from the feed tube 22 through the ring 17. In some embodiments, winding sprayers 24 are positioned on both sides of the drive unit 106. The winding sprayer 24 can be formed with a contoured portion that provides clearance between the winding sprayer 24 and the windings 97. Other configurations are contemplated. In some embodiments, one or more of the passageways 13 in the case 103 define a rear sprayer 27 for spraying cooling fluid onto the windings 97 opposite from the winding sprayer 24. In some embodiments, the rear sprayer 27 is formed in the case 103 in an arcuate path around the drive unit 106. In some embodiments, the rear sprayer 27 includes a series of outlet orifices 28 circumferentially distributed around the drive unit 106 above the windings 97 for spraying the windings 97 with cooling fluid. Other configurations are contemplated.

In the illustrative embodiment, the ring 17 further acts as a clamp ring for holding the drive unit 106 to the case 103 as shown in FIG. 8. For example, fasteners, such as studs 91 and nuts 93, engage with the clamp ring 17 and case 103 to hold the drive unit 106 on the case 103. The studs 91 are circumferentially distributed around the drive unit 106 and extend through the clamp ring 17 to engage with the case 103, such as by cooperative threading on the stud 91 and case 103. The nut 93 engages with the stud 91, such as by cooperative threading on the stud 91 and nut 93, and engages with the clamp ring 17 to force the clamp ring 17 against the stator 92 and force the stator 92 against the case 103. The clamp ring 17 distributes clamping force from the fasteners evenly around the stator 92. In some embodiments, the studs 91 extend through the stator 92. The clamp ring 17 can be formed as a single component or in multiple sections assembled together. In some embodiments, the clamp ring 17 includes one or more compression limiters for preventing deformation of the clamp ring 17 as the fasteners are tightened. The compression limiters may be formed from a metal, such as steel or aluminum that can withstand compressive forces from the fasteners. The compression limiters may be fixed to the clamp ring 17 by pressing or insert molding, for example.

The conduits 11, passageways 13, and other structures described herein and contemplated by the present disclosure for moving the cooling fluid through the drive assembly 104 can collectively be referred to as a fluid-delivery network 60 of the cooling system 10.

Figure 20:
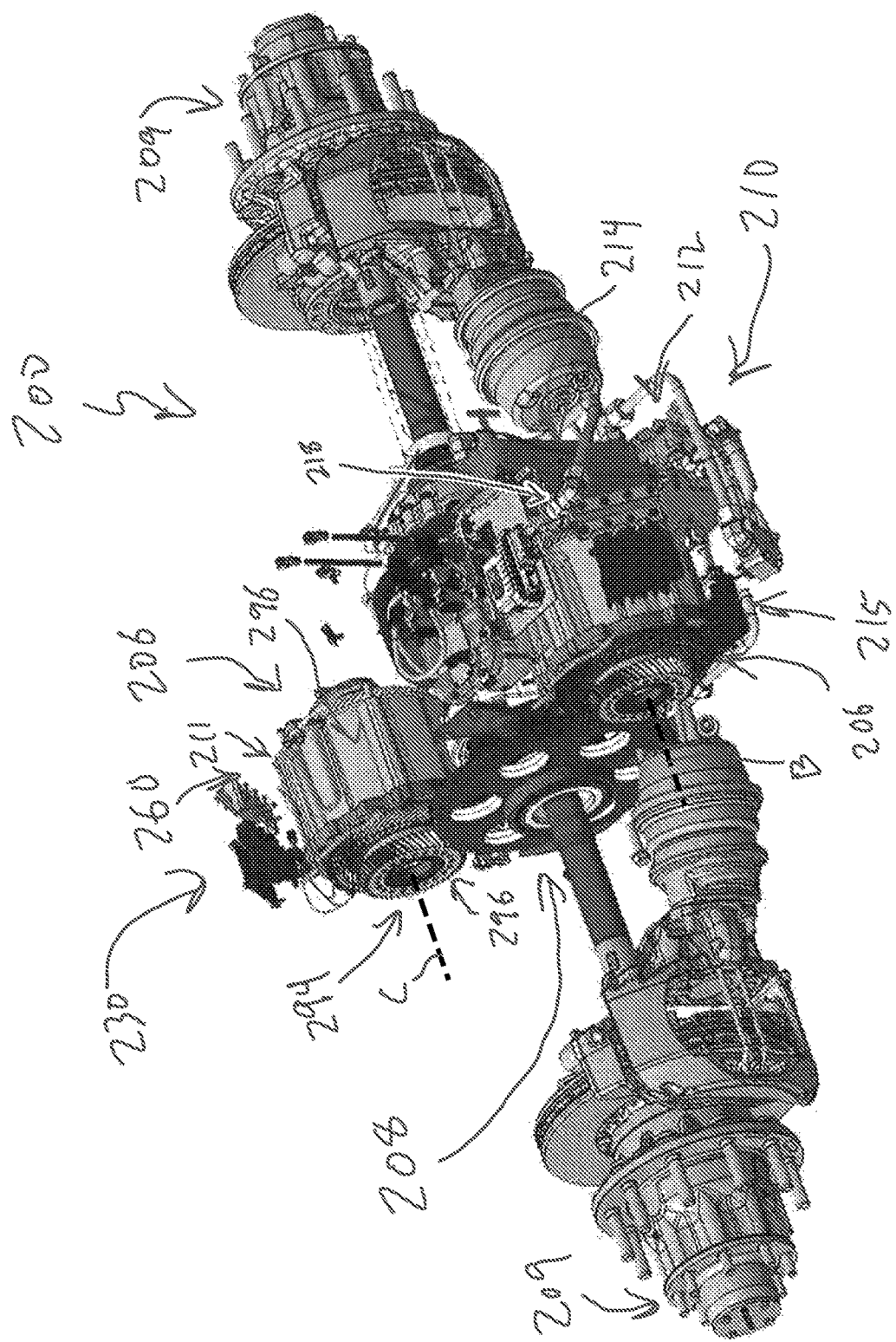
FIG. 20 is a partial front perspective view of the electric axle assembly of FIG. 14 with a case removed to expose drive units, a gear train, and a cooling system of the electric axle assembly.
Figure 21:
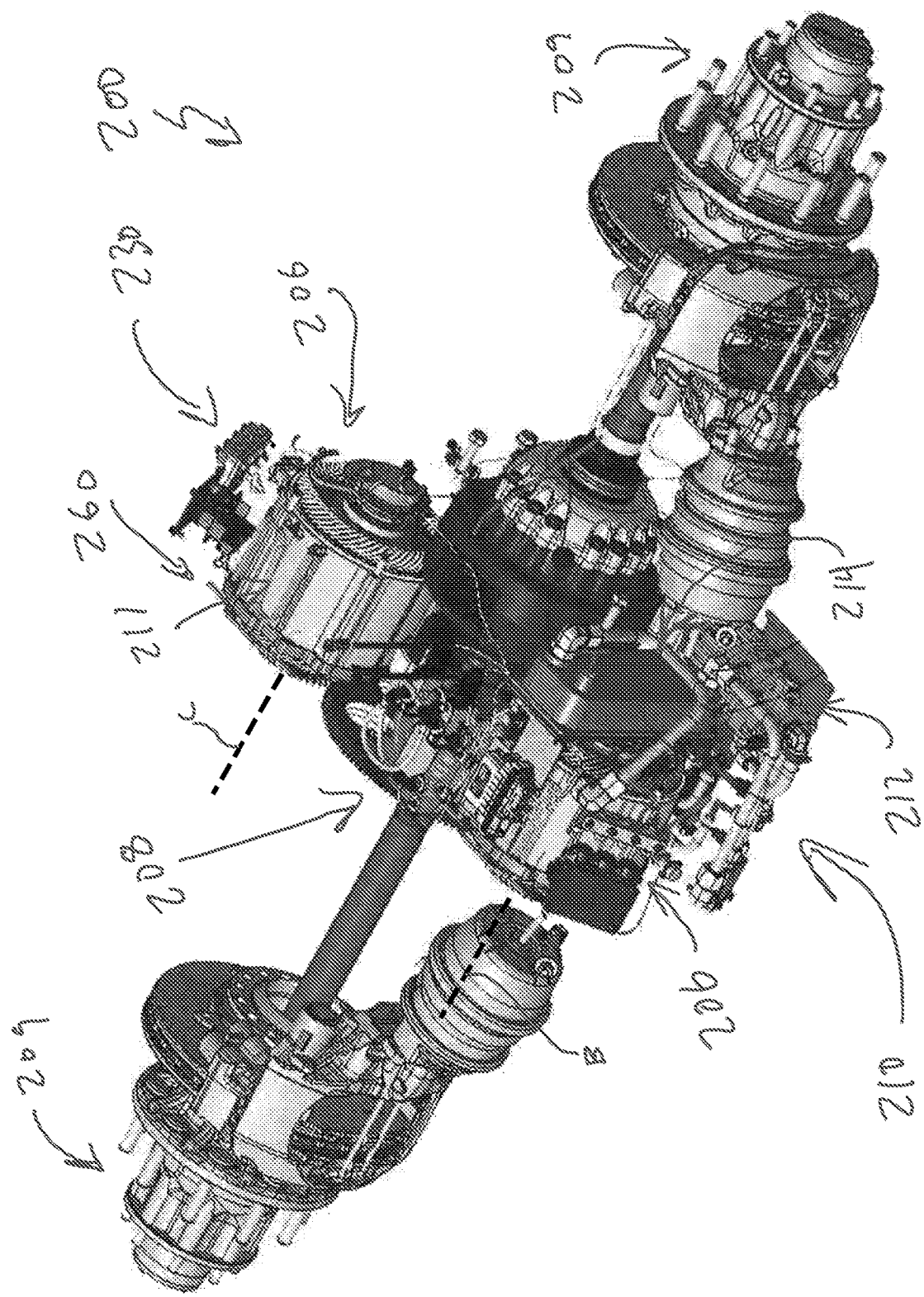
FIG. 21 is another perspective view of the electric axle assembly of FIG. 20.
Figure 22:
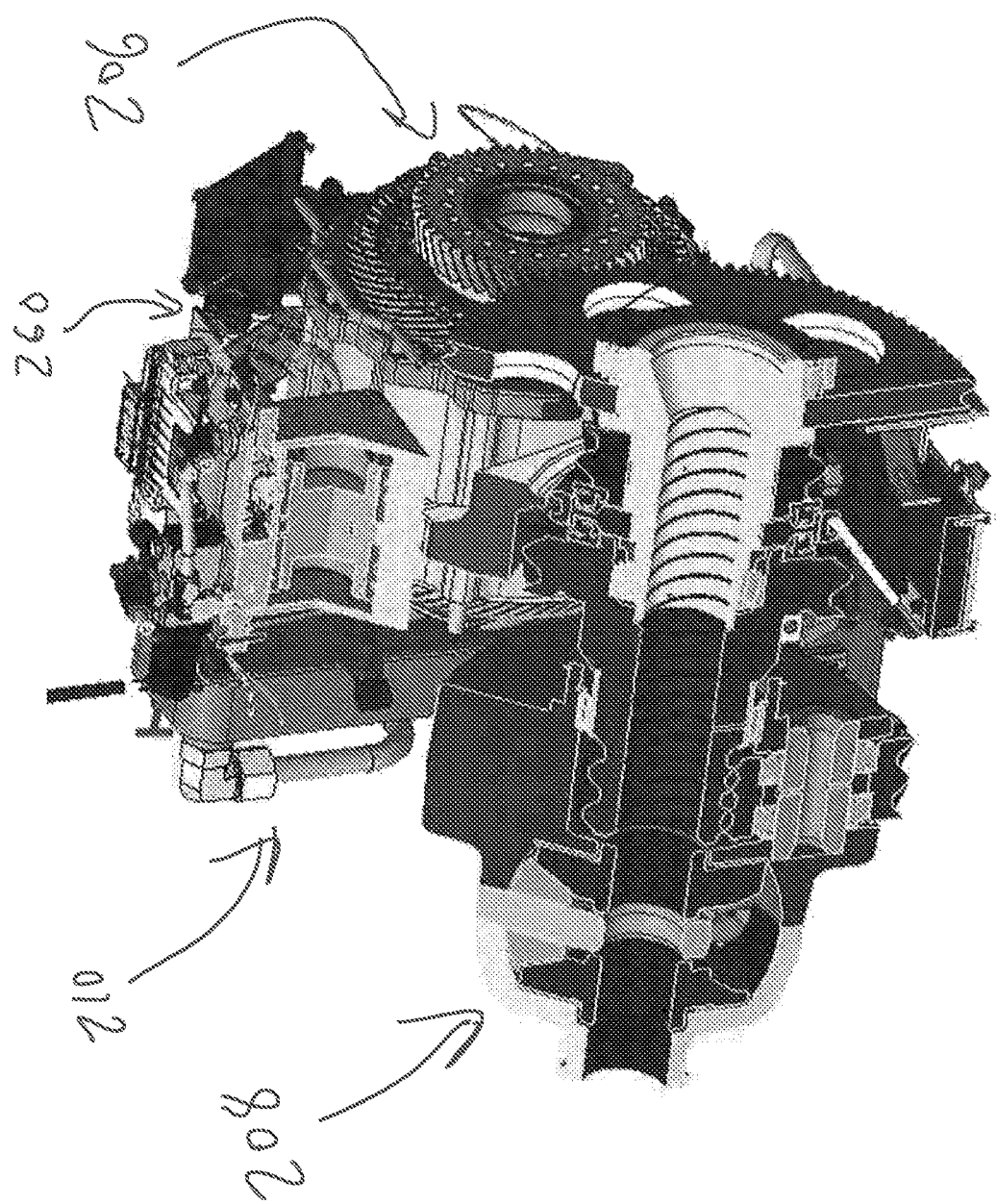
FIG. 22 is a partial perspective sectional view the electric axle assembly of FIG. 20.

Another embodiment of an electric axle assembly 200 in accordance with the present disclosure is shown in FIGS. 14-18. The electric axle assembly 200 can be used, for example, in a single or multi-axle towing or hauling vehicle, such as semi truck, to support the vehicle for travel over the ground and propel the vehicle. The electric axle assembly 200 includes a drive assembly 204 and axle tubes 202 extending from opposite sides of the drive assembly 204. The electric axle assembly 200 attaches to a suspension arrangement of a vehicle frame (not shown) for supporting the drive assembly 204 relative to the vehicle frame. A controller 205 controls operation of the electric axle assembly 200. The drive assembly 204 includes a drive input 230 and a drive train 208. In the illustrative embodiment, the drive input 230 includes a pair of drive units 206, such as electric motors. The drive units 206 and drive train 208 are housed in a case 203 of the drive assembly 204. The drive train 208 extends through the axle tubes 202 to engage with wheel hubs 209. The wheel hubs 209 allow attachment of wheels to the drive assembly 204 for rotation about an axis A with rotation of the drive train 208 by the drive input 230 as suggested in FIG. 15. The drive units 206 provide motive force to the wheels through the drive trains 208 for propelling the vehicle along the ground. An exemplary drive input 230 and drive train 208 are shown in FIGS. 20 and 21. Examples of other axle assemblies are shown in PCT International Patent Application Publication Nos. WO2019/161390 and WO2019/161395, the disclosures of which are both incorporated by reference herein in their entireties.

Figure 14:
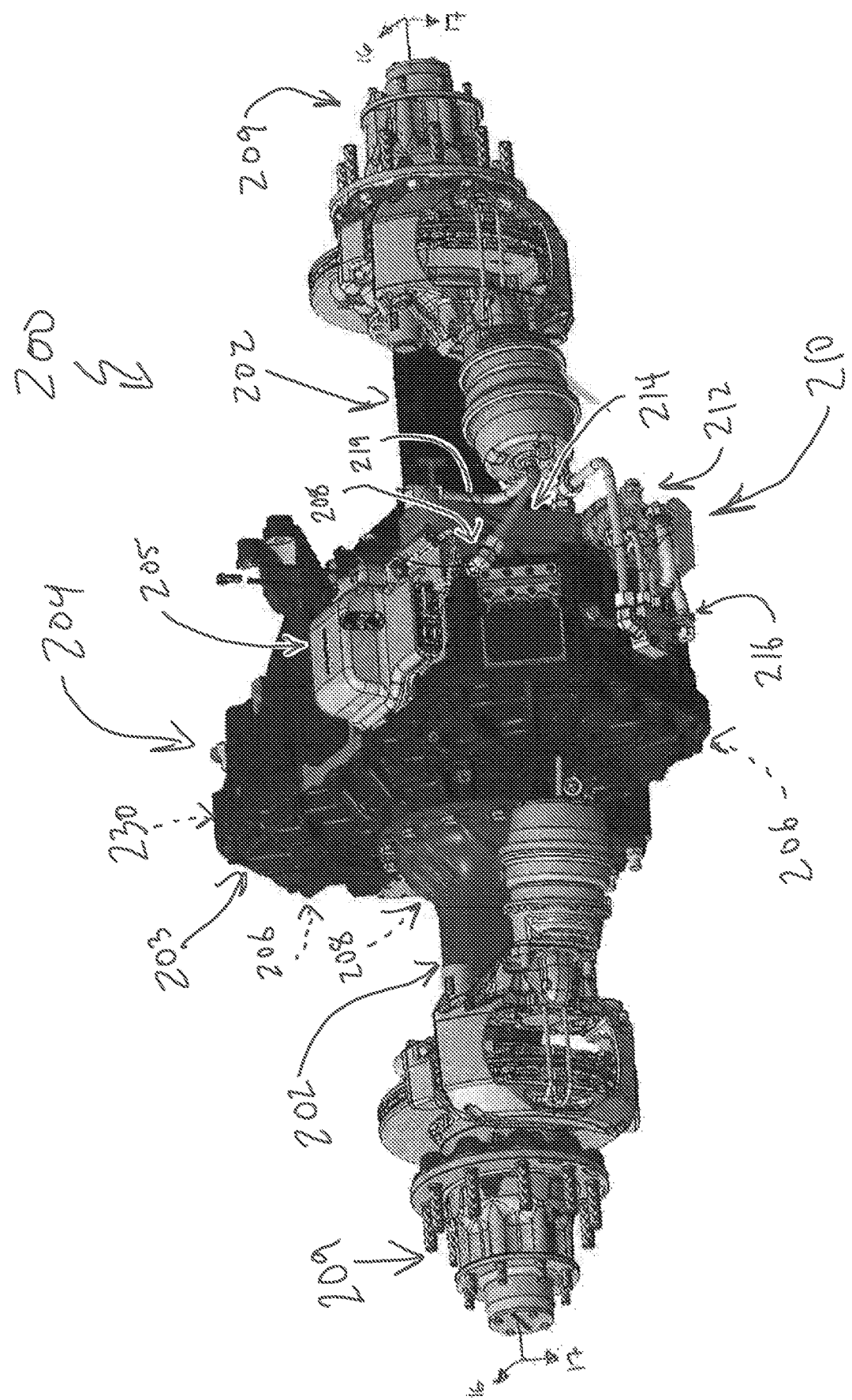
FIG. 14 is a front perspective view of an electric axle assembly according to a second embodiment of the present disclosure.
Figure 15:
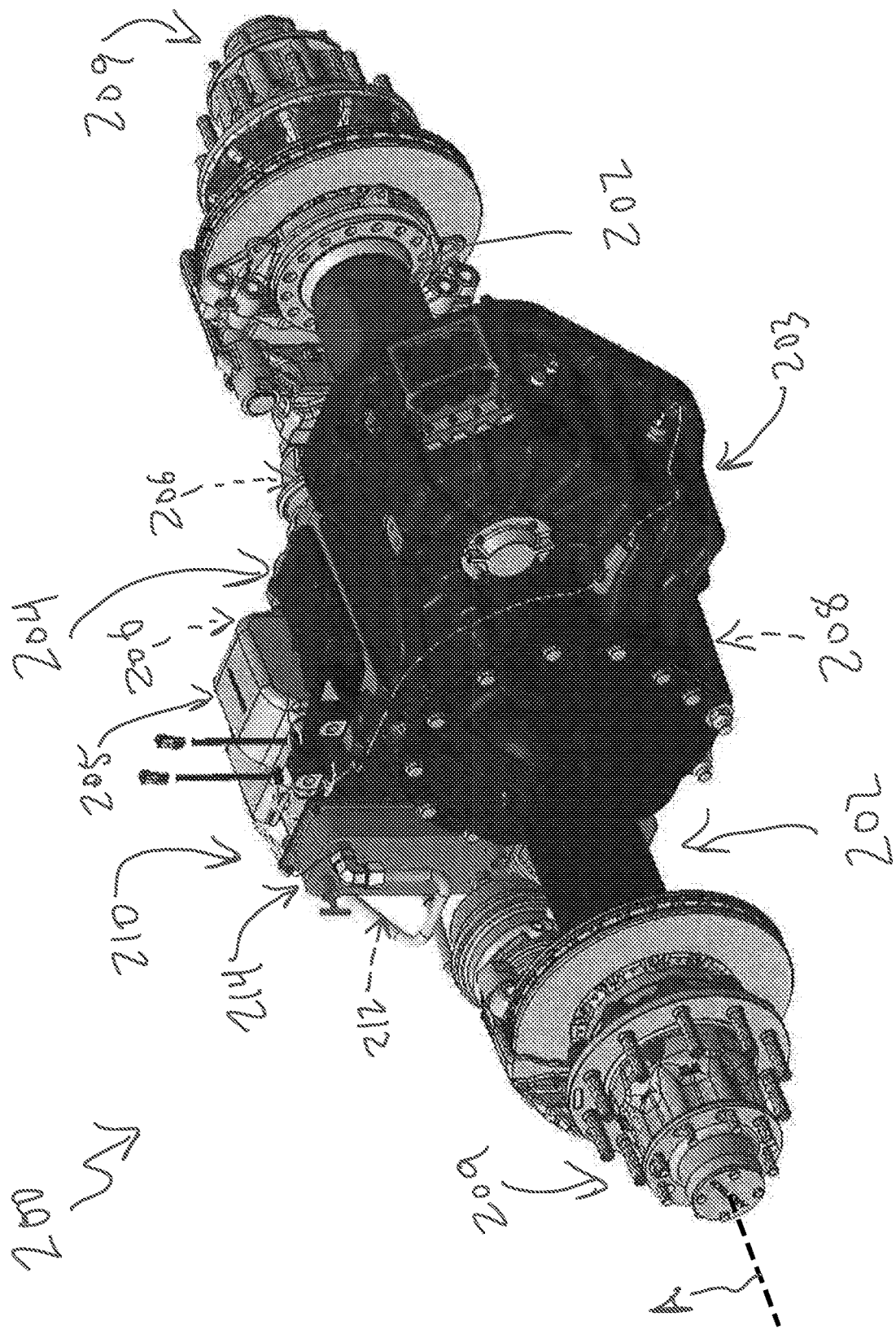
FIG. 15 is a rear perspective view of the electric axle assembly of FIG. 14.
Figure 24:
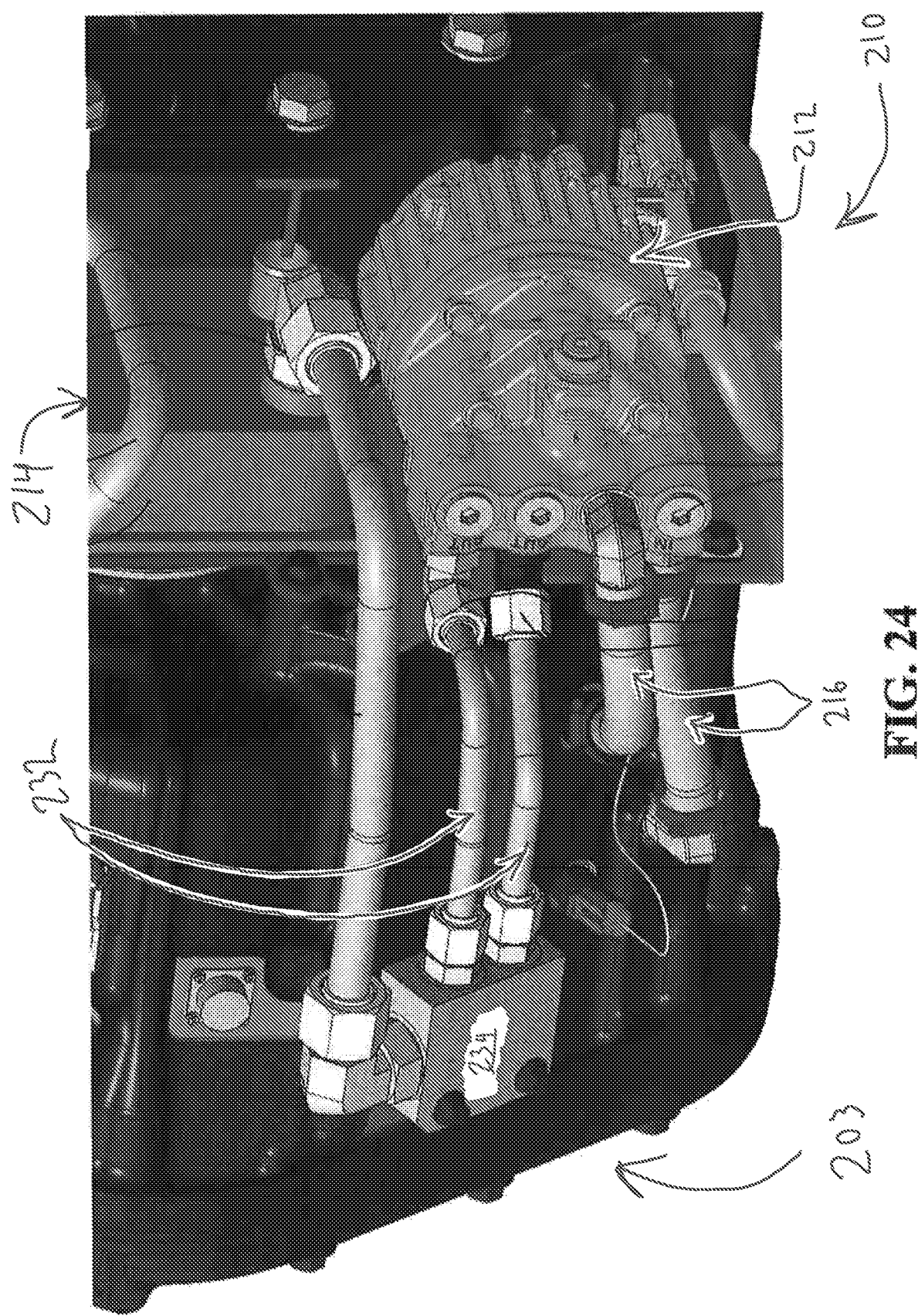
FIG. 24 is a perspective view of a pump for the electric axle assembly of FIG. 14.

A cooling system 210 in accordance with the present disclosure circulates a cooling fluid, such as oil, transmission fluid, or other substantially non-conductive fluid, to drive assembly 204 as suggested in FIGS. 14, 20, and 21. The cooling fluid circulated by the cooling system 210 controls heat produced by the drive units 206 during operation. In the illustrative embodiment, the cooling system 210 includes a pump 212 and a heat exchanger 214. The pump 212 draws cooling fluid from the case 203 through one or more conduits 216 as shown in FIG. 24. In some embodiments, two conduits 216 feed cooling fluid from the case 203 to the pump 212, and two conduits 232 feed cooling fluid from the pump 212 into a merging block to provide a single flow to the heat exchanger 214. The pump 212 can be driven by one of the drive units 206 and/or drive trains 208 and/or through a separate drive arrangement. The cooling fluid passes through the heat exchanger 214 to remove heat from the cooling fluid. The cooled fluid passes through one or more conduits 219 and enters the case 203 through one or more inlets 218 as shown in FIG. 14. The cooling fluid is distributed through the case 203 for cooling and/or lubricating the drive units 206 and/or the drive trains 208. In some embodiments, the heat exchanger 214 is an air-cooled heat exchanger. In some embodiments, the heat exchanger 214 is a liquid-cooled heat exchanger passing an exchange medium, such as water or antifreeze, in a parallel or counter flow to draw heat from the cooling fluid into the exchange medium. In some embodiments, the exchange medium can be used in another cooling system elsewhere in the vehicle to cool other vehicle components, such as the batteries and/or power inverters. In some embodiments, multiple pumps 212 and/or heat exchangers 214 can be used. In some embodiments, each drive unit 206 is provided with its own cooling system 210.

Figure 16:
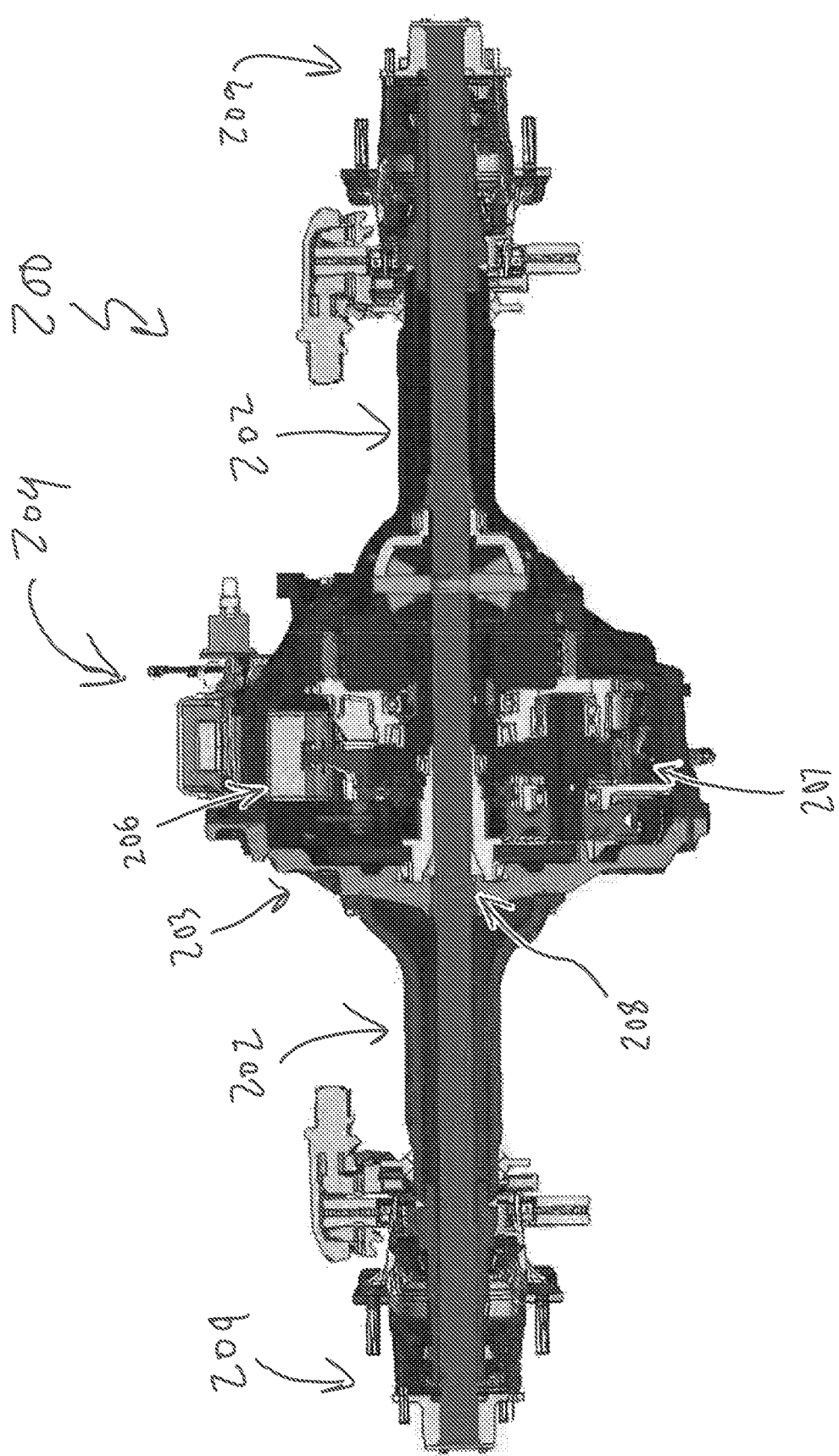
FIG. 16 is a cross-sectional view taken along line 16-16 in FIG. 14.
Figure 17:
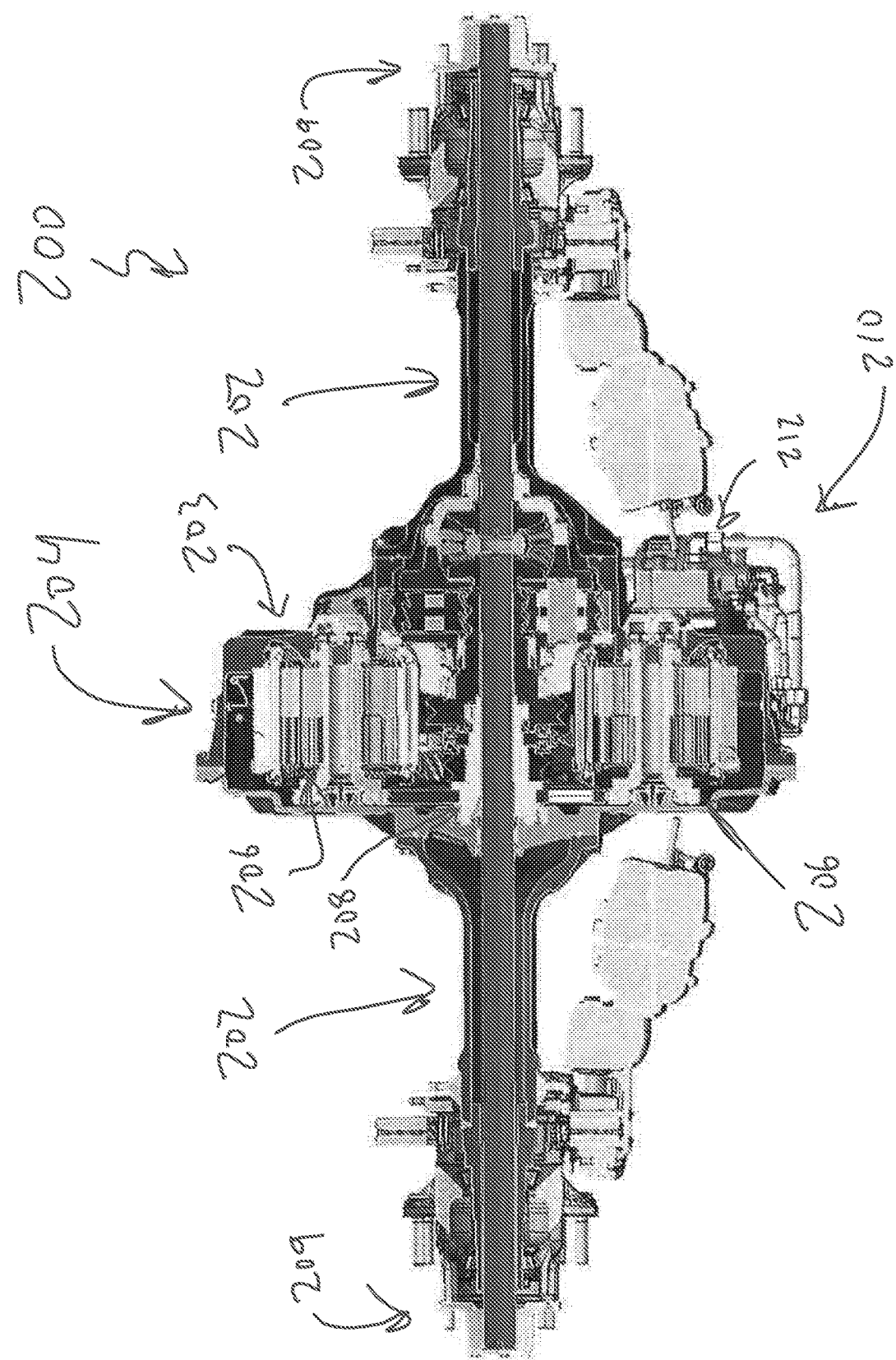
FIG. 17 is a cross-sectional view taken along line 17-17 in FIG. 14.
Figure 18:
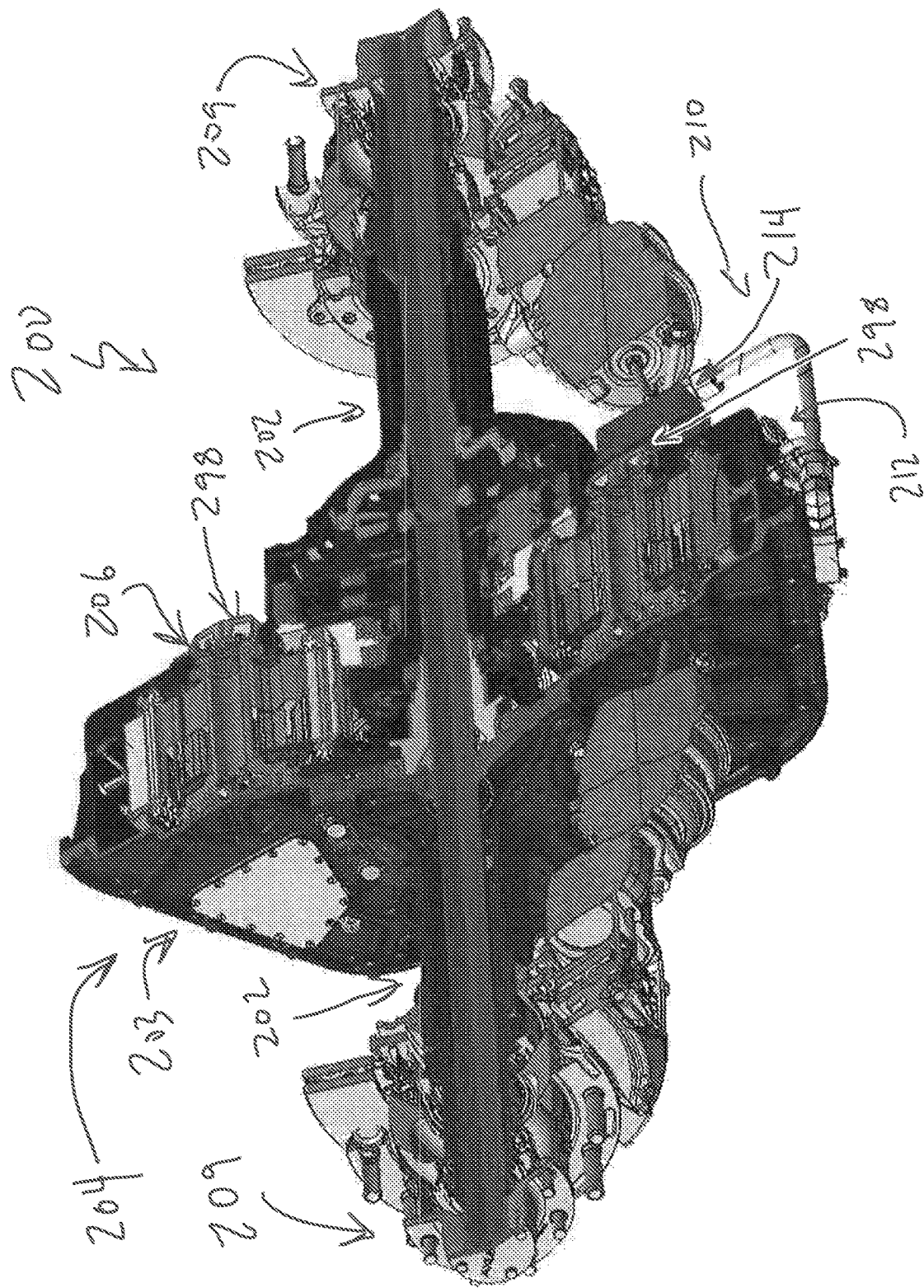
FIG. 18 is a perspective sectional view of the electric axle assembly of FIG. 17.
Figure 19:
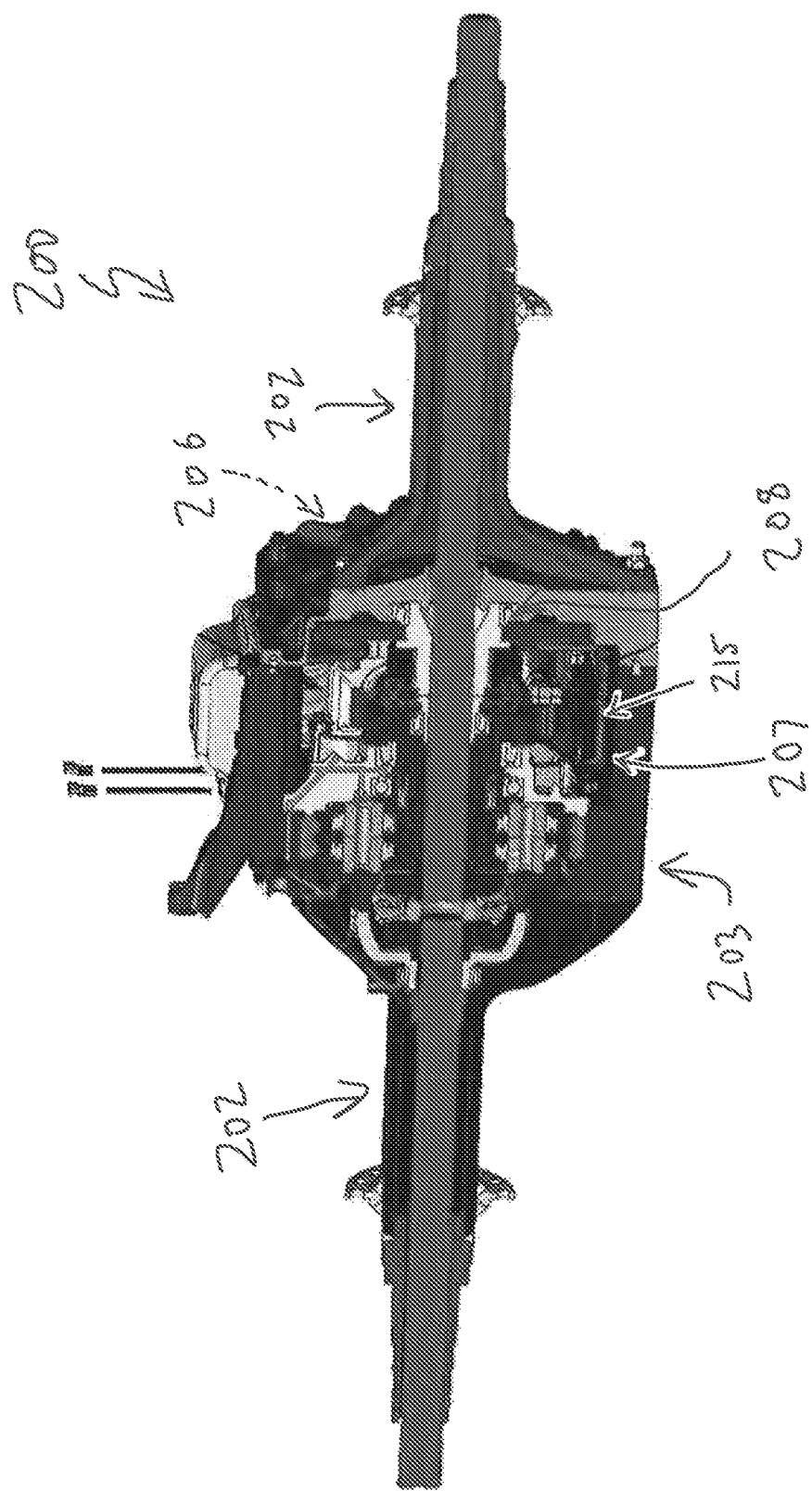
FIG. 19 is a partial perspective sectional view of the electric axle assembly of FIG. 16.
Figure 25:
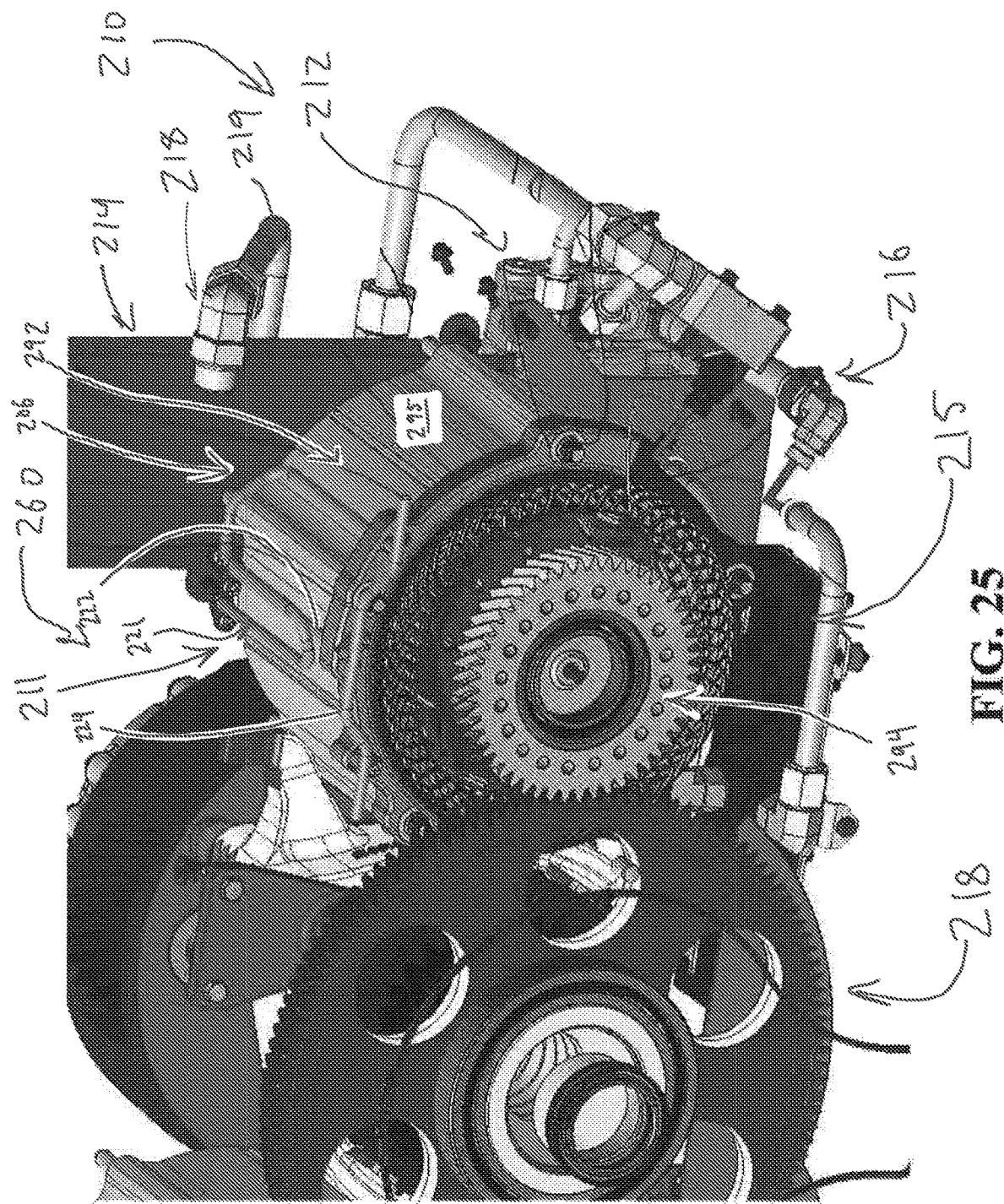
FIG. 25 is a perspective view of a drive unit and parts of the gear train of the electric axle assembly of FIG. 21 including a cooling system.
Figure 29:
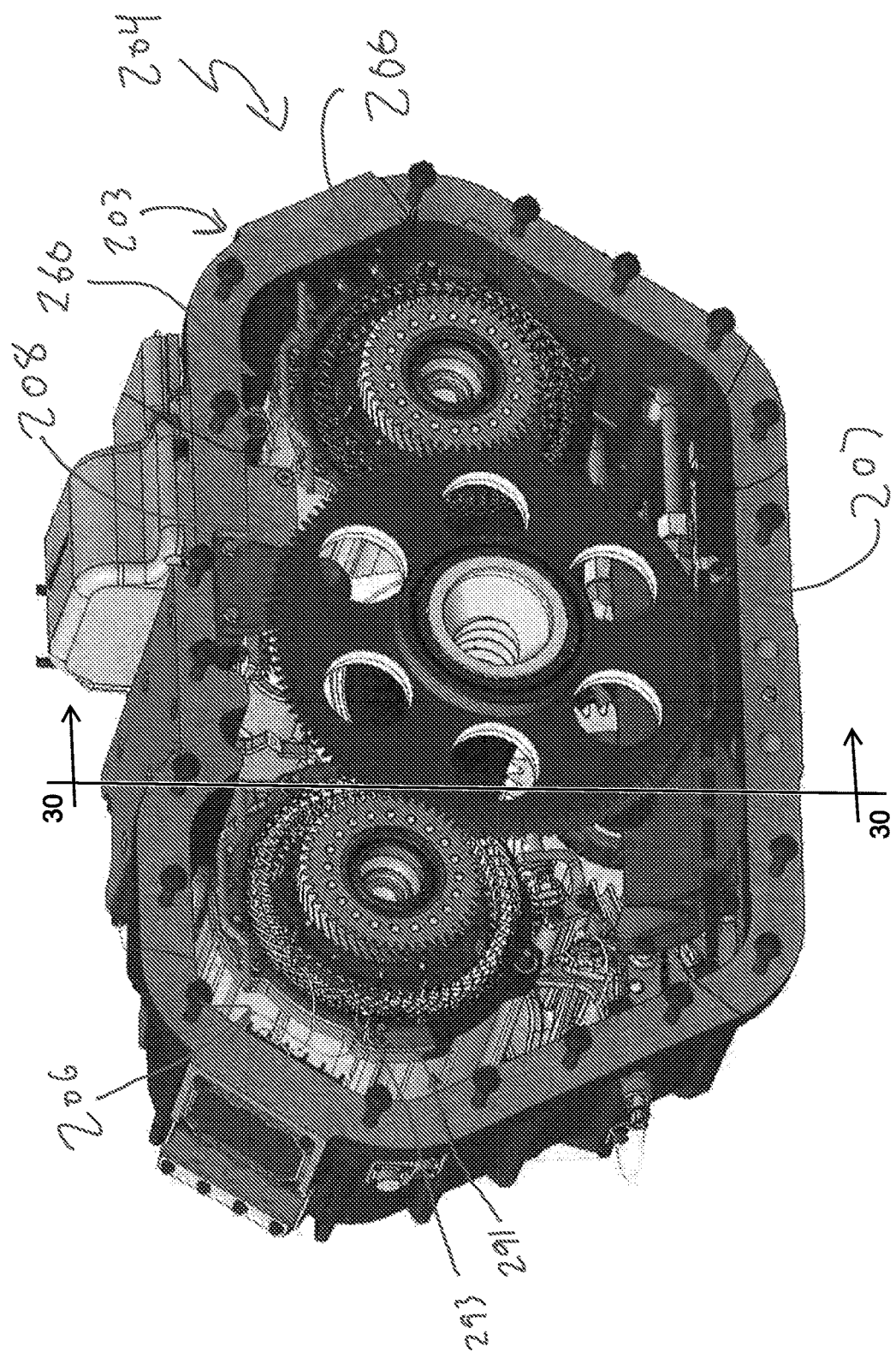
FIG. 29 is a perspective view of the electric axle assembly of FIG. 14 with a portion of the case removed showing an oil sump and a windage tray.
Figure 30:
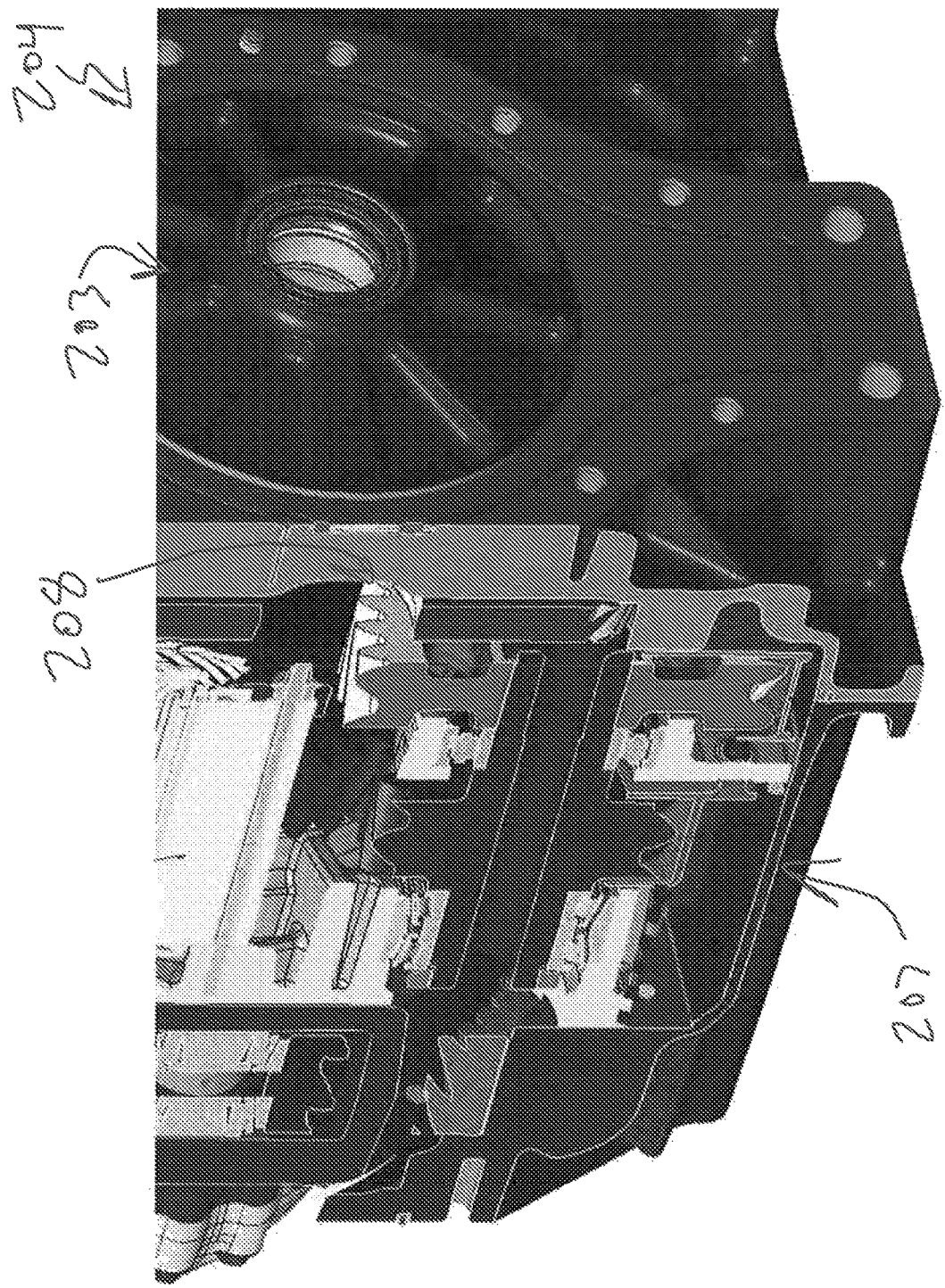
FIG. 30 is a perspective sectional view of taken along line 30-30 in FIG. 29 showing the oil sump and the windage tray.

The cooling fluid flows onto and/or into the drive unit 206 and/or drive train 208 and down to a lower portion of the case 203 (e.g., below the axle tubes 202) defining a sump 207 for the cooling fluid to collect. In some embodiments, a pickup 215 is arranged in the sump 207 and fluidly coupled to the pump 212 (such as by conduit 216) to draw cooling fluid from the case 203 for re-circulation as shown in FIGS. 16, 19, and 25. In some embodiments, the pickup 215 includes a filter to clear debris from the cooling fluid. In some embodiments, a filter is coupled to the cooling system 210 outside of the case 203 for clearing debris from the cooling fluid. One or more gears of the drive train 208 can extend into the sump 207 for spreading the cooling fluid to other gears of the drive train 208 as shown in FIGS. 29 and 30. Rotation of the gears can also splash the cooling fluid throughout the case 203 for lubricating contact surfaces.

An exemplary drive unit 206 is shown in FIGS. 20-22 and 25. The drive units 206 can be constructed similar to drive units 106 described above. In the illustrative embodiment, the drive units 206 each include a stator 292 and a rotor 294. The stator 292 is coupled to the case 203 of the drive assembly 204, and the rotors 294 is arranged for rotation relative to the stators 292 about respective axes B, C. Pinion gears 296 are coupled to the rotors 294 and engage with the drive train 208 for transferring motive force from the drive units 206 to the drive train 208. In some embodiments, the drive units 206 include internal passageways in the stator 292 and/or rotor 294 for flow of cooling fluid through the drive units 206. The stator 292 includes a core 295 and windings 297. The core 295 has a tubular profile, and the windings 297 include electrical conductors, such as copper wire, circumferentially distributed around the core 295 that receive electric energy to generate a magnetic field for driving rotation of the rotor 294.

Figure 23:
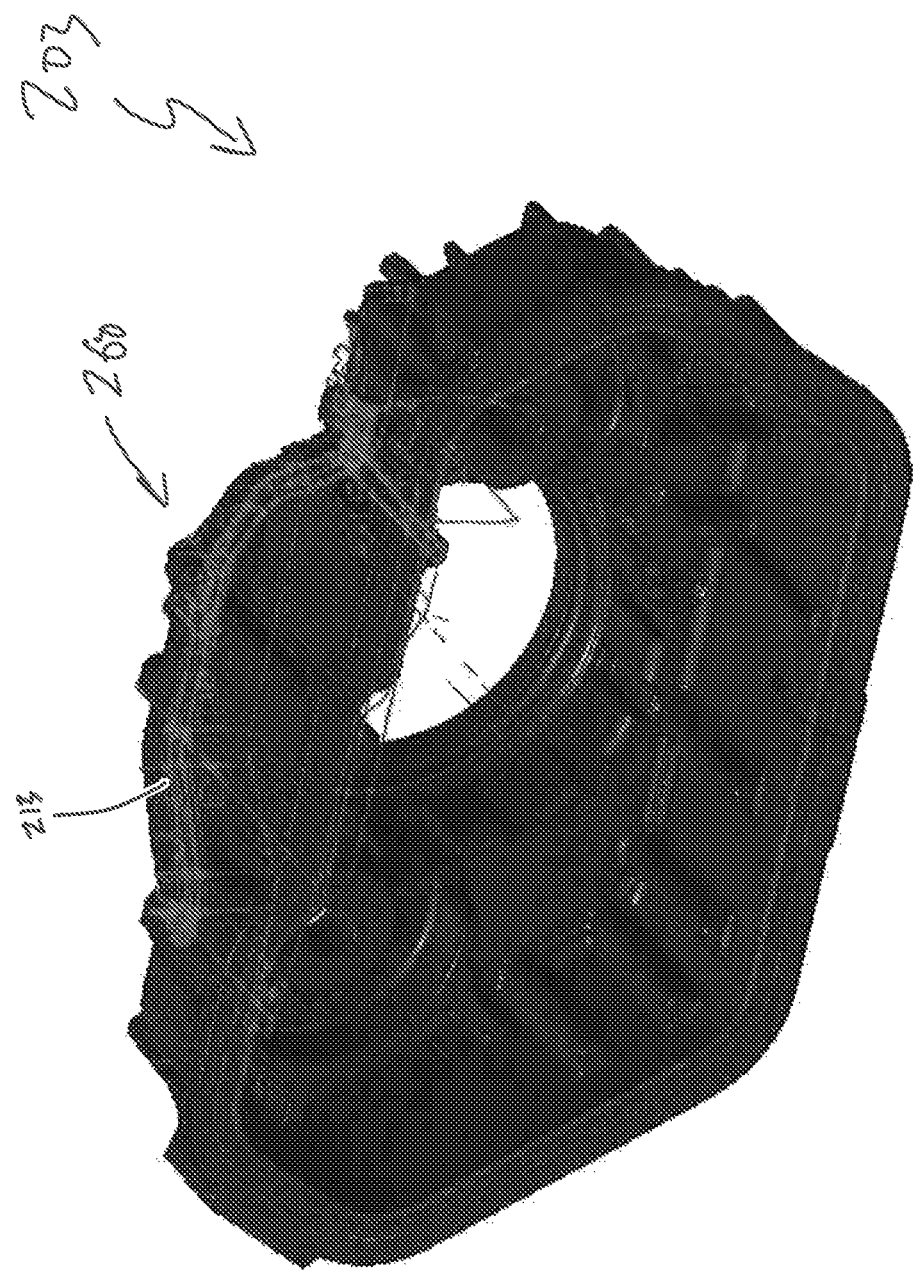
FIG. 23 is a perspective view of the case for the electric axle assembly of FIG. 14 including passageways formed in the case.
Figure 27:
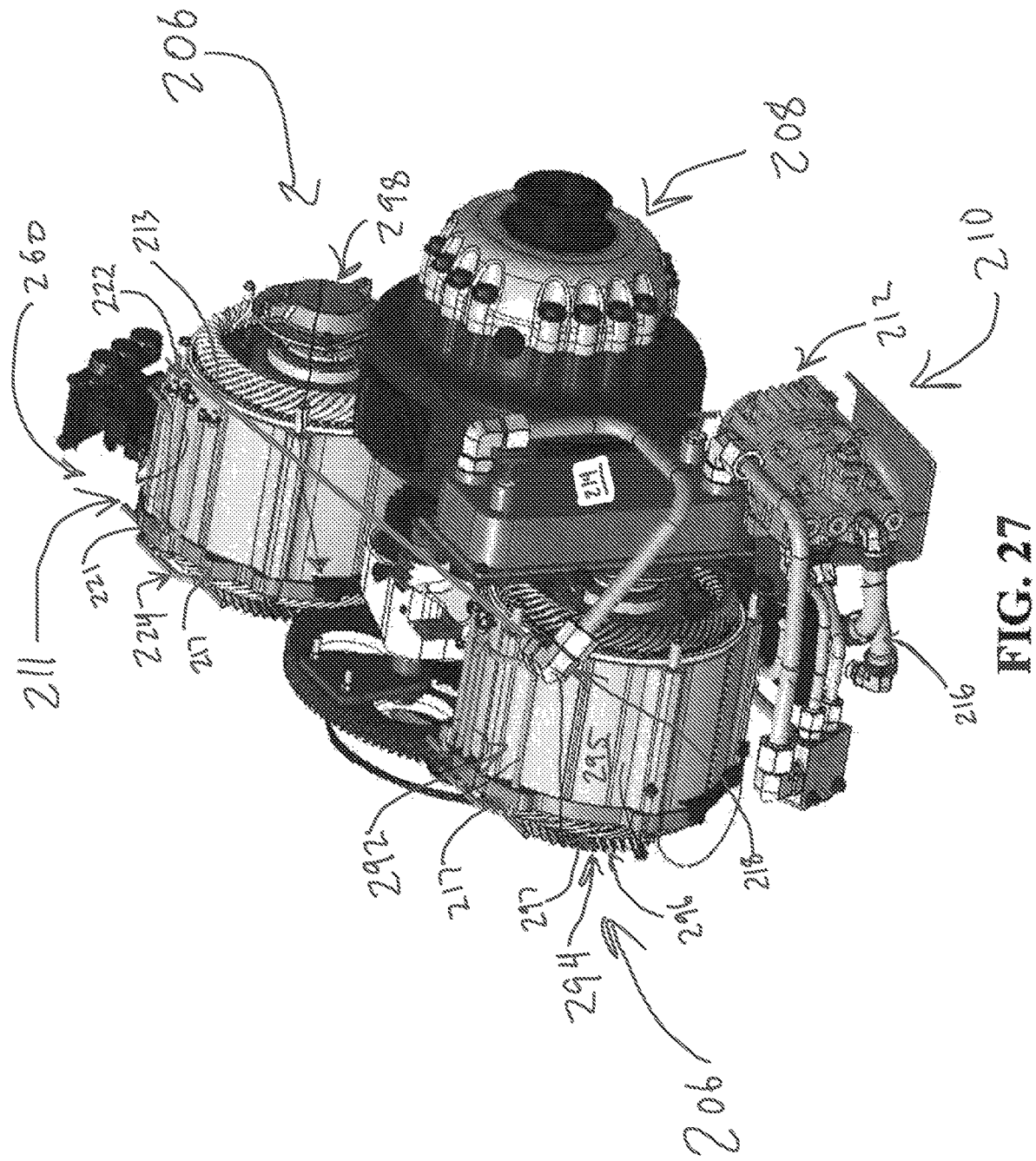
FIG. 27 is another perspective view of the drive units and the cooling system of FIG. 21.

In the illustrative embodiment, one or more conduits 211 are provided as part of the cooling system 210 for directing the cooling fluid from the heat exchanger 214 to the drive units 206 and/or drive train 208. The conduits 211 can be arranged to pass the cooling fluid into the internal passageways of the drive unit 206 and/or direct cooling fluid onto the drive unit 206. In some embodiments, the conduits 211 are coupled to passageways 213 in the case 203 for passing cooling fluid from the inlet 218 to the drive units 206 and/or drive train 208 as shown in FIG. 23 and schematically represented in FIG. 27. In some embodiments, the passageways 213 can be formed through the case 203 similar to passageways 13 through the cases 103 described above. The passageways 213 in case 203 extend along and through portions of the case 203 to distribute the cooling fluid to the conduits 211 and otherwise circulate the cooling fluid around the drive assembly 204. The passageways 213 can be formed as part of a casting process or post-processing of the case 203, for example. In some embodiments, the passageways 213 of the case 203 are used without the conduits 211. In some embodiments, the conduits 211 are used without the passageways 213. In some embodiments, one or more rings 217 are arranged to receive the cooling fluid and distribute the cooling fluid around the stators 292 and/or rotors 294, such as for distribution of the cooling fluid to passageways in the drive units 206. In some embodiments, caps 298 can be coupled to the case 203 and arranged to receive cooling fluid from the passageways 213 of the case 203 and pass the cooling fluid into the rotor 294 and/or stator 292 of the drive units 206.

Figure 28:
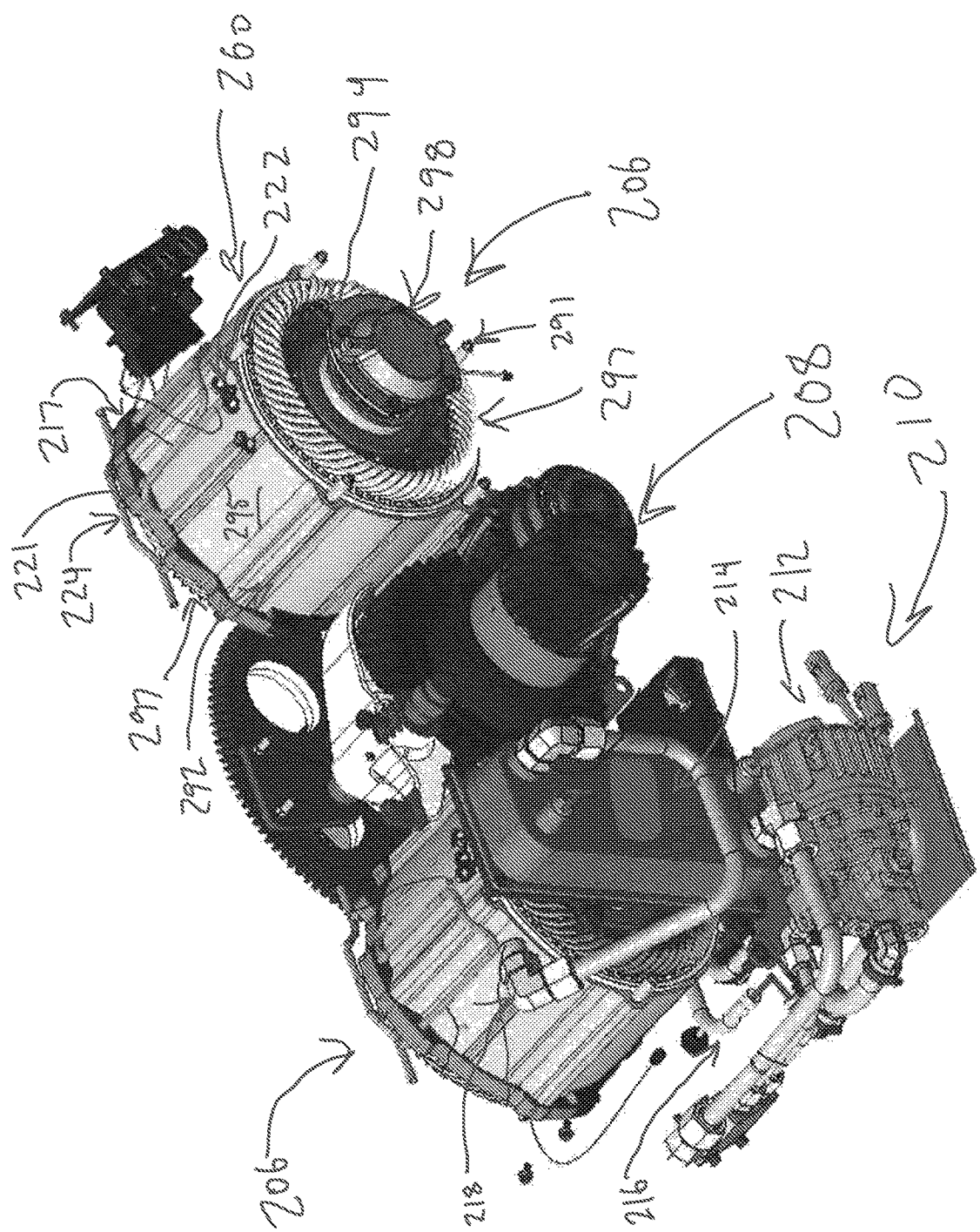
FIG. 28 is a view similar to FIG. 27.

In exemplary embodiments, the conduits 211 can include one or more core sprayers 221, feed tubes 222, transfer tubes, winding sprayers 224, and other possible conduit configurations for delivering cooling fluid through the drive assembly 204 as suggested in FIGS. 25-29. The conduits 211 can be supplied with cooling fluid by one or more of the passageways 213 in the case 203 or otherwise supplied with cooling fluid from the pump 212. In the illustrative embodiment, the core sprayers 221 are arranged above the drive units 206 and in fluid communication with the passageways 213 of the case 103. The core sprayers 221 can be formed in a generally S-shaped or U-shaped profile defining a plurality of legs (FIGS. 25 and 27), with one or more of the legs formed to include one or more outlet orifices. Cooling fluid that flows into the core sprayers 221 is distributed into each leg, which feeds the series of outlet orifices to spray the cooling fluid onto the core 295 of the stator 292. It is contemplated that the core sprayer 221 could define more or less than three legs. Other configurations are also contemplated. As shown in FIG. 28, the feed tubes 222 transfer cooling fluid from the passageways 213 of the case 203 to a ring 217 having one or more internal passageways (similar to ring 17 described above) for distribution of the cooling fluid around the drive unit 206 and for use by the drive unit 206. In some embodiments, the passageways of the ring 217 can be formed as a cavity during a molding process, with an insert molding process, or by a machining operation, for example. The transfer tubes (similar to transfer tubes 23 described above) can direct cooling fluid to the drive train 208 and other portions of the drive assembly 204.

Figure 26:
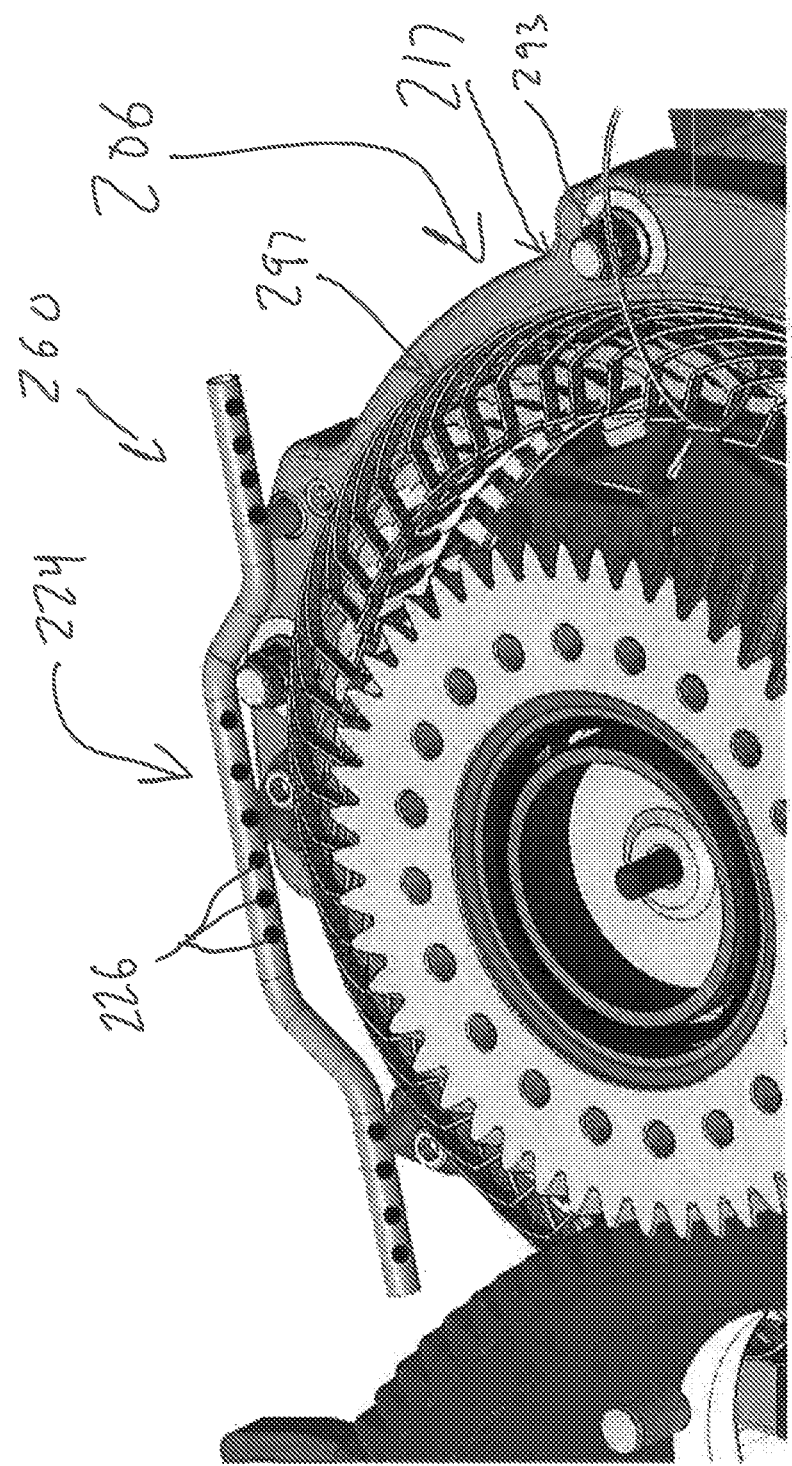
FIG. 26 is another perspective view of the drive unit and parts of the cooling system of the electric axle assembly of FIG. 25.

The winding sprayer 224 can be arranged above the windings 297 of the drive unit 206 and formed to include outlet orifices 226 for spraying cooling fluid onto the windings 297 as shown in FIGS. 25, 26, and 29. In some embodiments, the winding sprayer 224 is coupled to the ring 217 and receives cooling fluid from the feed tube 222 through the ring 217. In some embodiments, winding sprayers 224 are positioned on both sides of each drive unit 206. The winding sprayer 224 can be formed with a contoured portion that provides clearance between the winding sprayer 224 and the windings 297. Other configurations are contemplated. In some embodiments, one or more of the passageways 213 in the case 203 define a rear sprayer for spraying cooling fluid onto the windings 297 opposite from the winding sprayer 224 (similar to the rear sprayer 27 described above). In some embodiments, the rear sprayer is formed in the case 203 in an arcuate path around the drive unit 206. In some embodiments, the rear sprayer includes a series of outlet orifices circumferentially distributed around the drive unit 206 above the windings 297 for spraying the windings 297 with cooling fluid. Other configurations are contemplated.

In the illustrative embodiment, each ring 217 further acts as a clamp ring for holding the respective drive unit 206 to the case 203 as shown in FIG. 29. For example, fasteners, such as studs 291 and nuts 293, engage with the clamp ring 217 and case 203 to hold the drive unit 206 on the case 203. The studs 291 are circumferentially distributed around the drive unit 206 and extend through the clamp ring 217 to engage with the case 203, such as by cooperative threading on the stud 291 and case 203. The nut 293 engages with the stud 291, such as by cooperative threading on the stud 291 and nut 293, and engages with the clamp ring 217 to force the clamp ring 217 against the stator 292 and force the stator 292 against the case 203. The clamp ring 217 distributes clamping force from the fasteners evenly around the stator 292. In some embodiments, the studs 291 extend through the stator 292. The clamp ring 217 can be formed as a single component or in multiple sections assembled together.

The conduits 211, passageways 213, and other structures described herein and contemplated by the present disclosure for moving the cooling fluid through the drive assembly 204 can collectively be referred to as a fluid-delivery network 260 of the cooling system 210.

Figure 31:
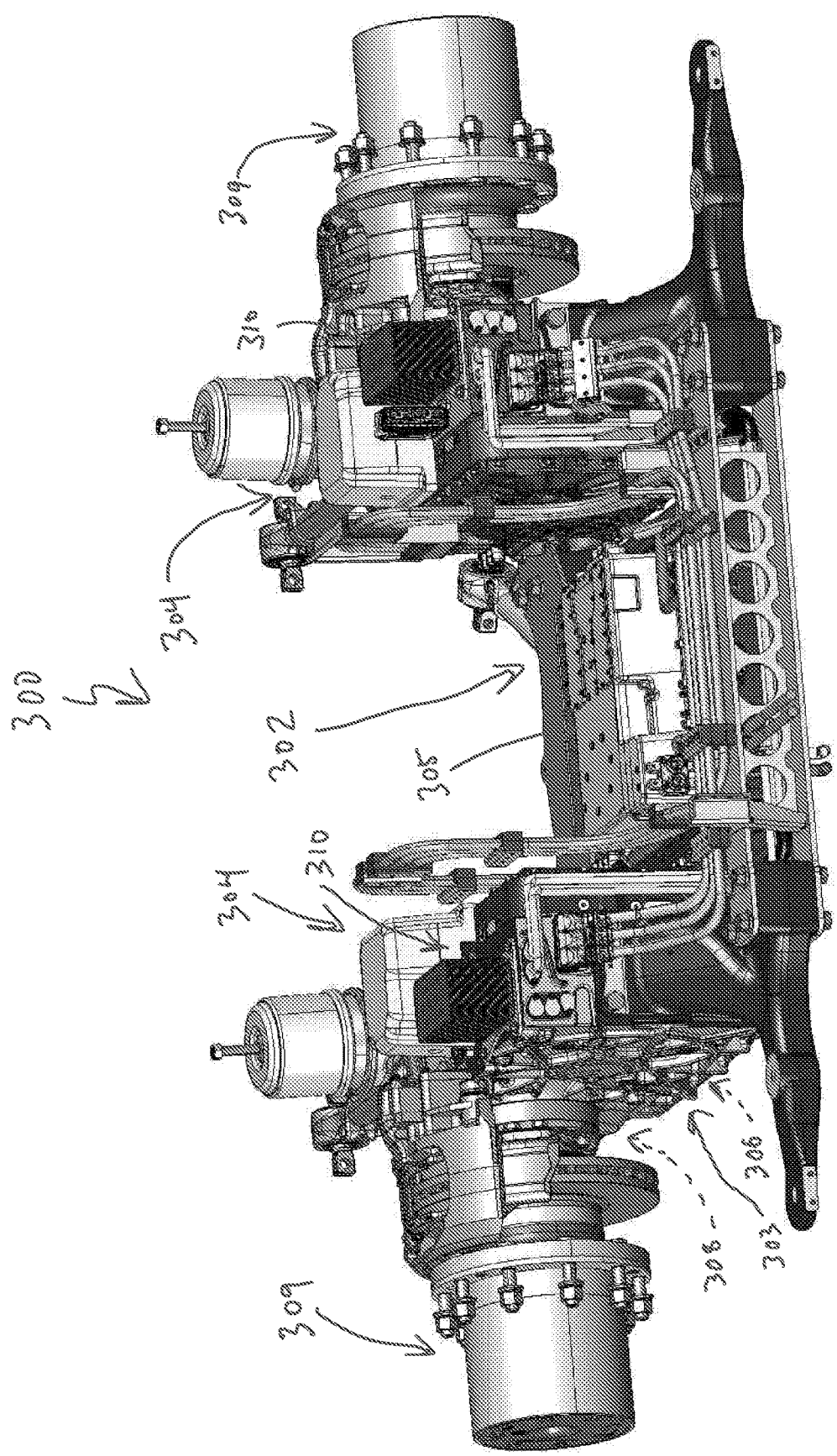
FIGS. 31-42 show an electric axle assembly according to a third embodiment of the present disclosure.

Another embodiment of an electric axle assembly 300 in accordance with the present disclosure is shown in FIG. 31. The electric axle assembly 300 is similar to the electric axle assembly 100 shown in FIGS. 1-13 and described above, with similar reference numbers in the 300's used to identify similar structures in the electric axle assembly 300 to those of electric axle assembly 100. The electric axle assembly 300 includes a suspension frame 302 and a pair of drive assemblies 304 coupled to opposing sides of the suspension frame 302. A controller 305 controls operation of the electric axle assembly 300. Each of the drive assemblies 304 includes a drive unit 306, such as an electric motor, and a drive train 308. The drive units 306 and drive trains 308 are housed in cases 303 of the drive assemblies 304. Wheel hubs 309 allow attachment of wheels to the drive assemblies 304 for rotation with rotation of the drive trains 308. The drive units 306 provide motive force to the wheels through the drive trains 308 for propelling the vehicle along the ground.

Figure 32:
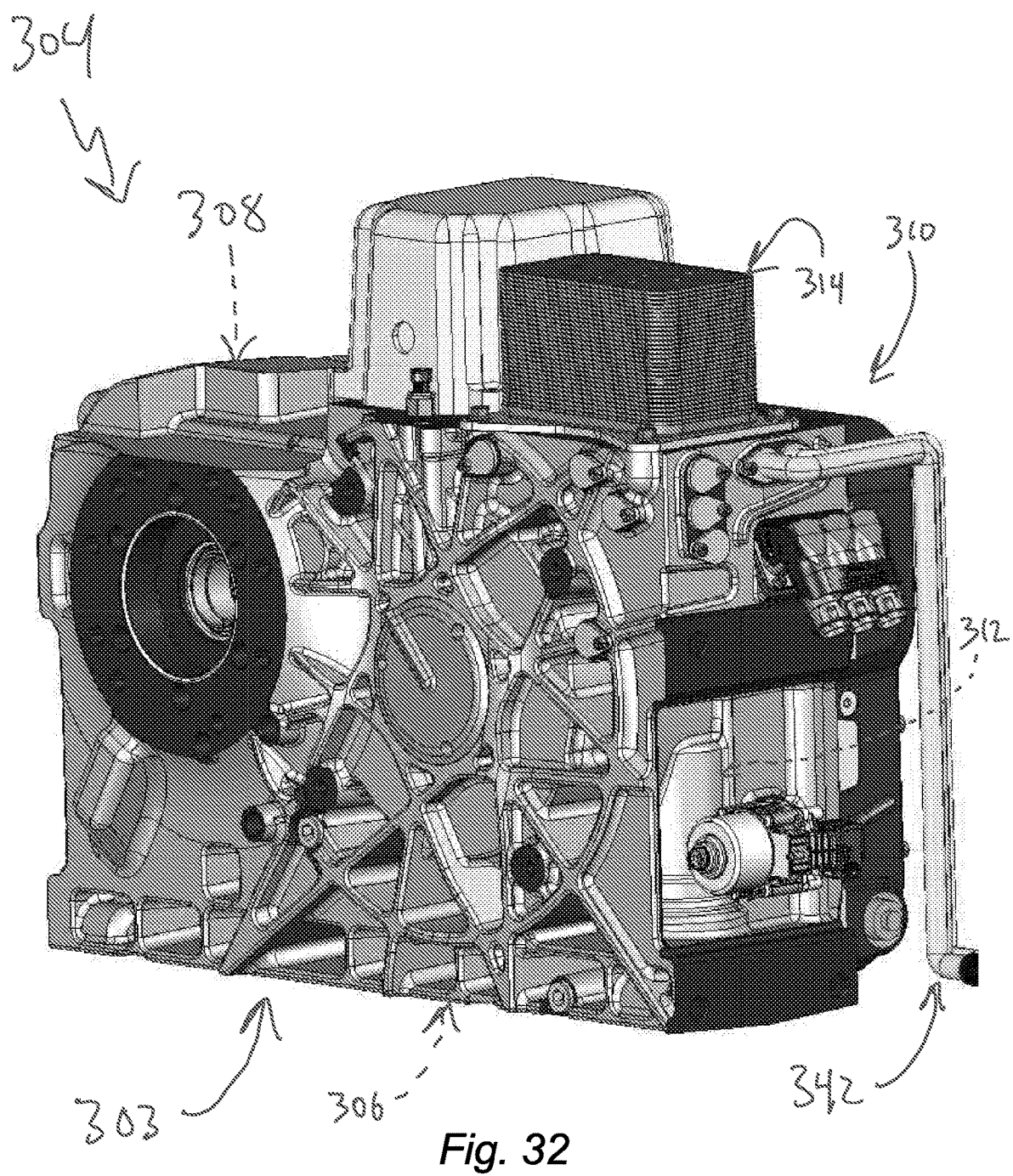

In the illustrative embodiment, each drive assembly 304 is provided with a cooling system 310 in accordance with the present disclosure that circulates a cooling fluid, such as oil, transmission fluid, or other substantially non-conductive fluid, through the drive assemblies 304 as suggested in FIGS. 31-42. Each cooling system 310 includes a pump 312 and a heat exchanger 314 as shown in FIG. 32. The pump 12 can be driven by the drive unit 306 and/or drive train 308 and/or through a separate drive arrangement. The pump 312 moves cooling fluid through the case 303 of the drive assembly 304 for cooling and/or lubricating the drive unit 306 and/or the drive train 308. The cooling fluid passes through the heat exchanger 314, and an exchange medium, such as water or antifreeze, flows through the heat exchanger 314 in a parallel or counter flow to the cooling fluid for drawing heat from the cooling fluid into the exchange medium. The exchange medium can be supplied and removed from the heat exchanger 314 through conduits 342. In some embodiments, the exchange medium can be used in another cooling system elsewhere in the vehicle to cool other vehicle components, such as the batteries and/or power inverters. In some embodiments, the heat exchanger 14 is an air-cooled heat exchanger. In some embodiments, multiple pumps 12 and/or heat exchangers 14 can be used.

Figure 33:
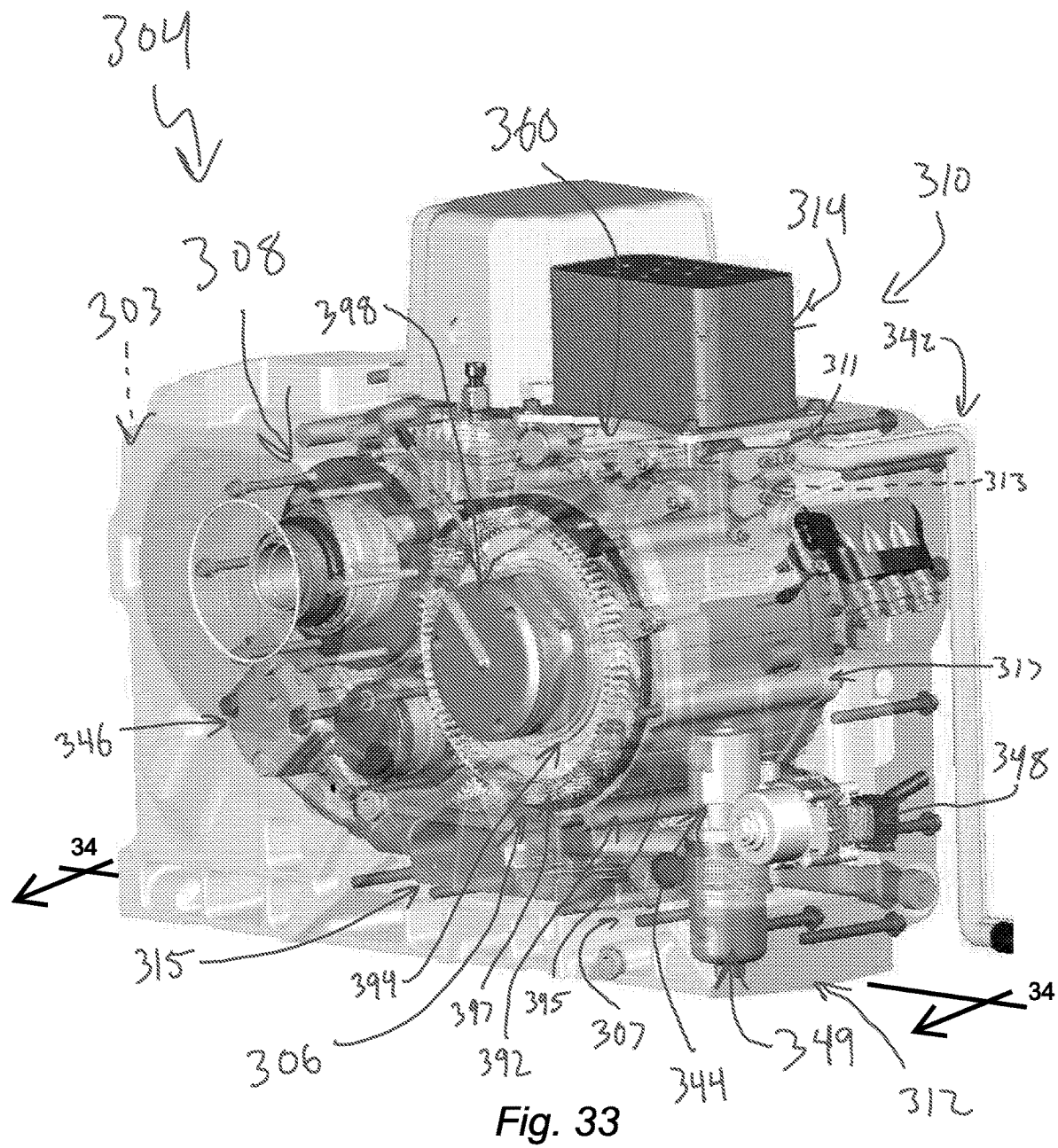
Figure 34:
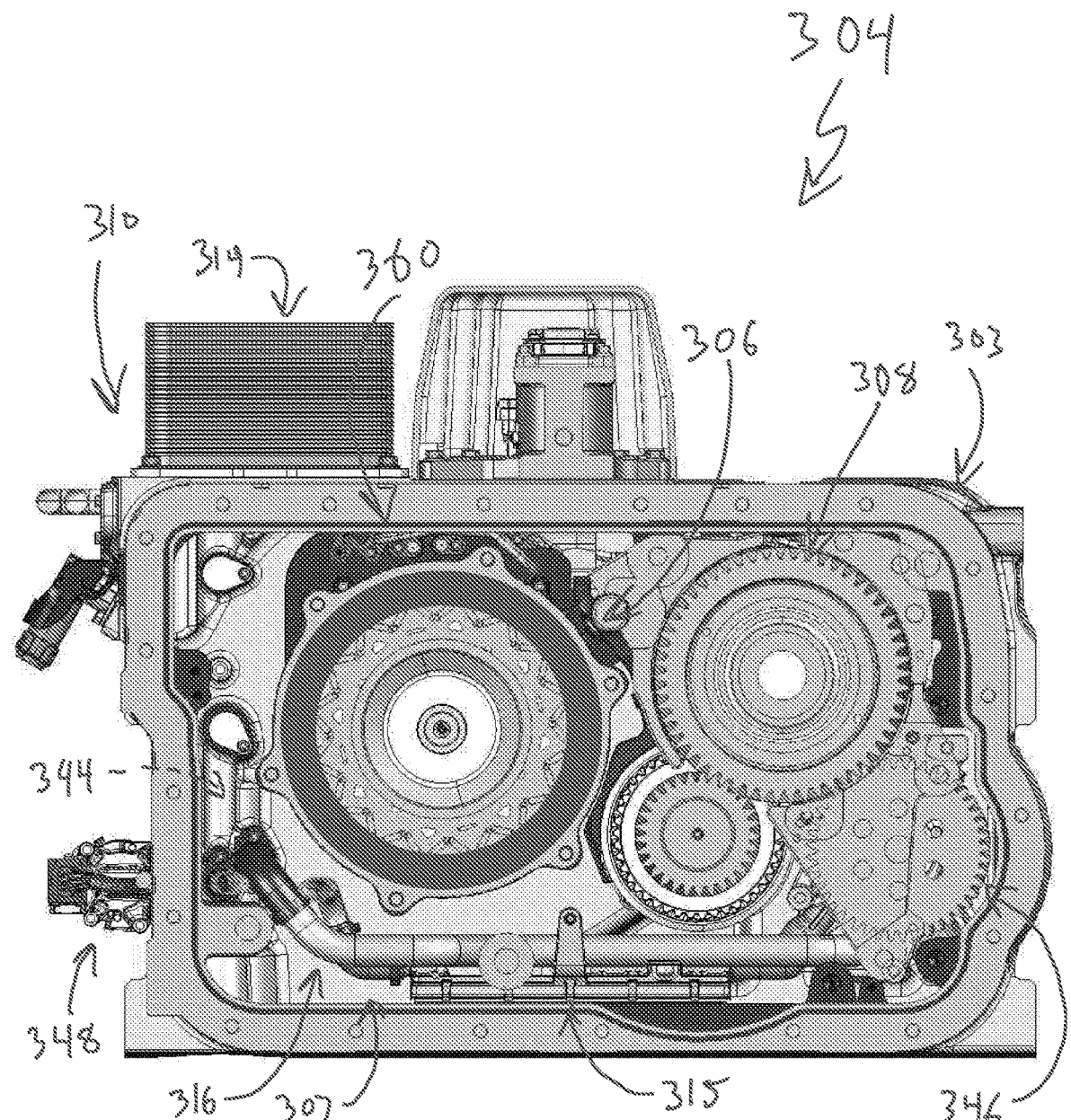
Figure 35:
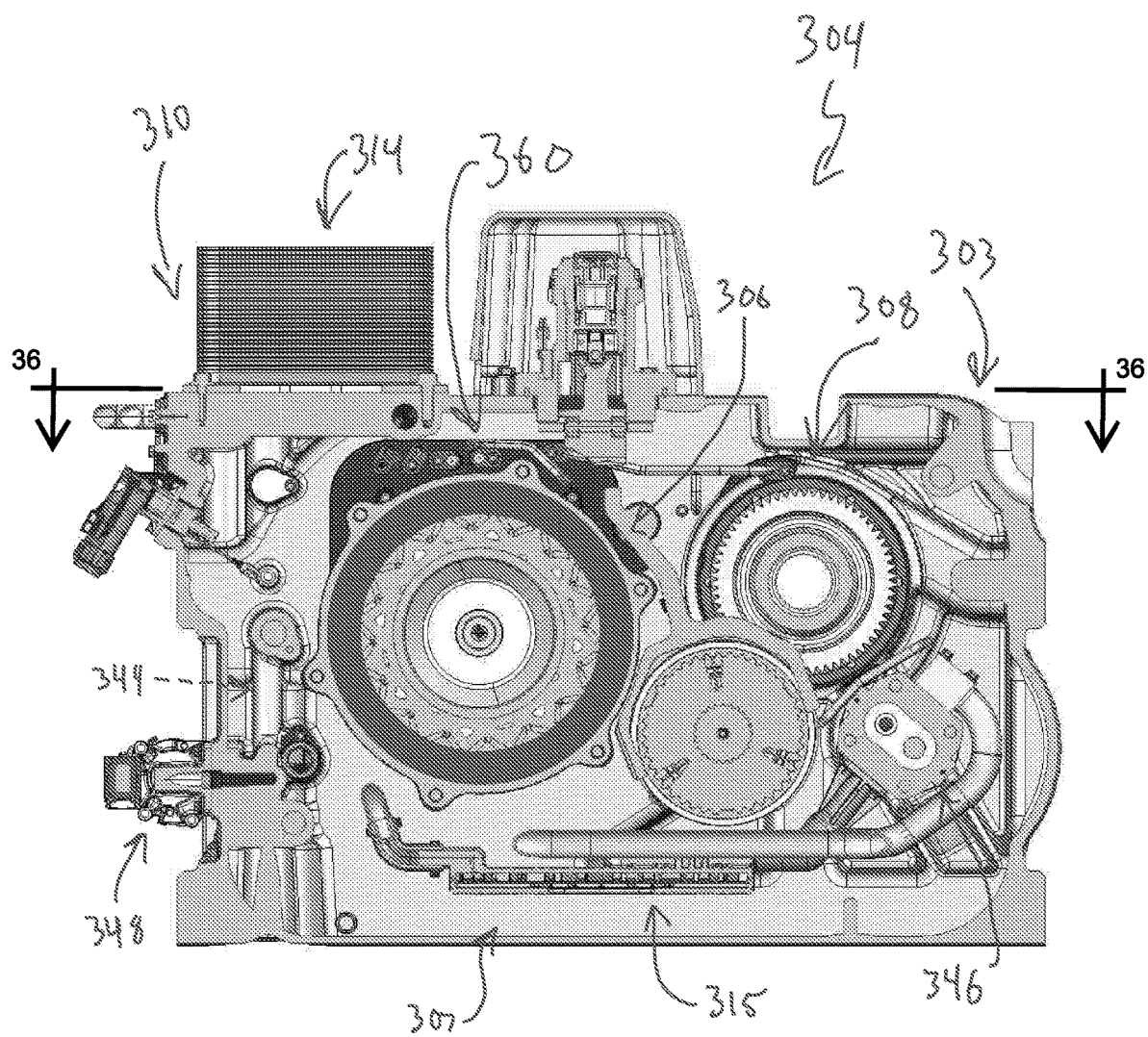

The cooling fluid flows onto and/or into the drive unit 306 and/or drive train 308 and down to a lower portion of the case 303 (e.g., near suspension frame 302) defining a sump 307 for the cooling fluid to collect as shown in FIG. 33. In the illustrative embodiment, the pump 312 includes a first pump 344 and a second pump 346. The first pump 344 can be driven by a drive arrangement 348, such as an electric motor, and the second pump 346 can be driven by the drive unit 306 and/or drive train 308 as shown in FIGS. 33-35. In some embodiments, the first pump 344 operates to continuously circulate cooling fluid through the case 303 and the second pump 346 provides additional cooling fluid flow during operation of drive unit 306. In some embodiments, the first pump 344 operates during idle periods of the drive unit 306 to circulate the cooling fluid and ceases operation in favor of the second pump 346 with operation of the drive unit 306. In some embodiments, the first pump 344 operates when the drive unit 306 is operating below a certain threshold (e.g., rotational speed, power level, etc.).

A pickup 315 can be arranged in the sump 307 and fluidly coupled to the first and second pumps 344, 346 (such as by conduits 316) to draw cooling fluid from the sump 307 for re-circulation though the case 303 as shown in FIGS. 33-35. A filter 349 can arranged to receive the cooling fluid moved by pumps 344, 346 for clearing debris from the cooling fluid. The filter 349 can be mounted external of the case 303 for replacement. In some embodiments, the pickup 315 includes a filter to clear debris from the cooling fluid. One or more gears of the drive train 308 can extend into the sump 307 for spreading the cooling fluid to other gears of the drive train 308. Rotation of the gears can also splash the cooling fluid throughout the case 303 for lubricating contact surfaces.

Figure 39:
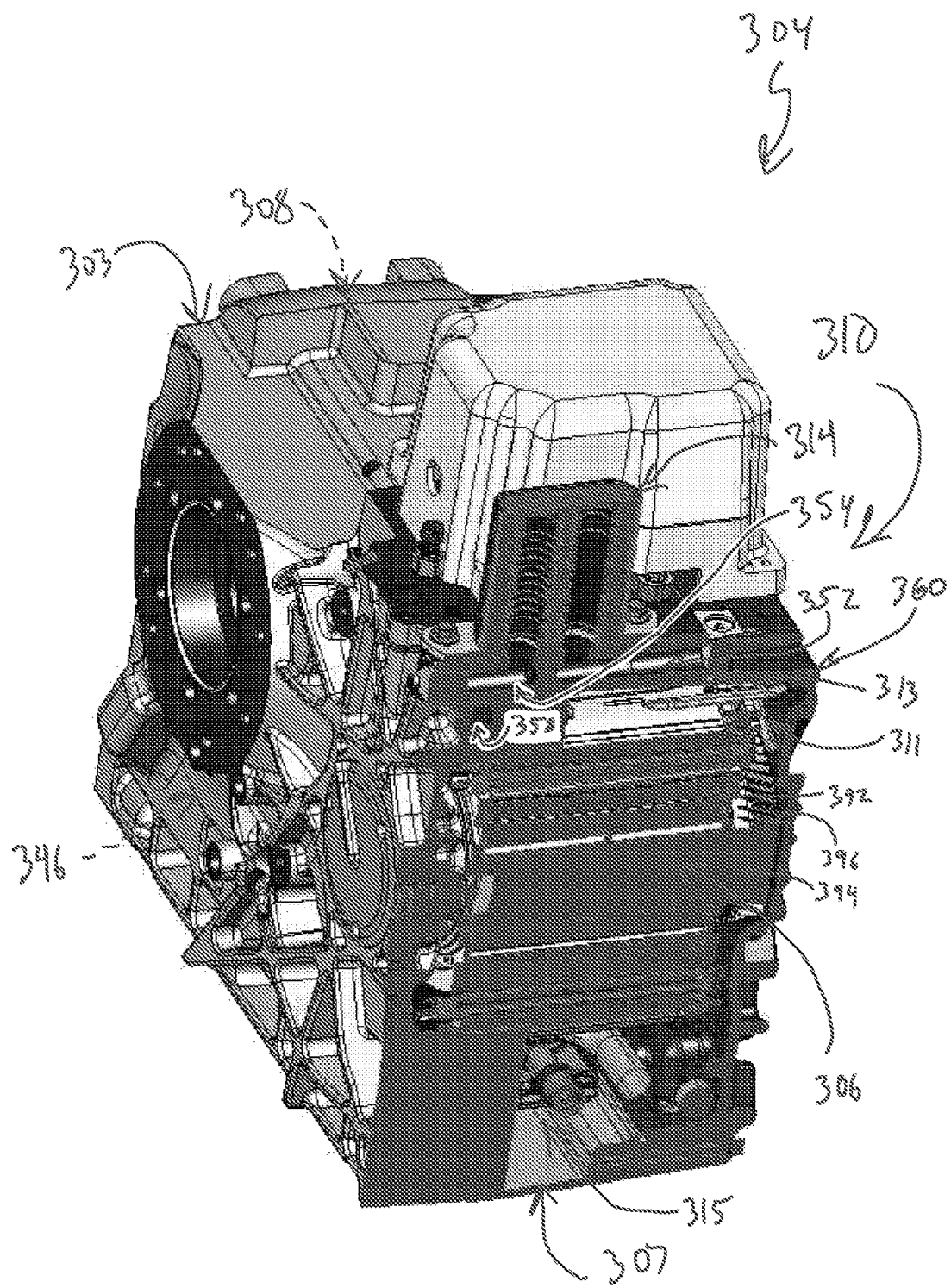

An exemplary drive unit 306 is shown in FIGS. 33 and 39. The drive unit 306 can be constructed similar to drive units 106, 206 described above. The drive unit 306 includes a stator 392 and a rotor 394. The stator 392 is coupled to the case 303 of the drive assembly 304, and the rotor 394 is arranged for rotation relative to the stator 392. A pinion gear 396 is coupled to the rotor 394 and engaged with the drive train 308 for transferring motive force from the drive unit 306 to the drive train 308. In some embodiments, the drive unit 306 includes internal passageways in the stator 392 and/or rotor 394 for flow of cooling fluid through the drive unit 306. The stator 392 includes a core 395 and windings 397 as shown in FIG. 33.

In the illustrative embodiment, the cooling system 310 further includes a plurality of conduits 311 arranged in the case 303 and passageways 313 formed through the case 303 for circulating the cooling fluid as shown in FIGS. 36-42. The conduits 311 and passageways 313 direct the cooling fluid from the heat exchanger 314 to the drive unit 306 and/or drive train 308. The conduits 311 can be arranged to pass the cooling fluid into the internal passageways of the drive unit 306 and/or direct cooling fluid onto the drive unit 306. In some embodiments, the conduits 311 are coupled to the passageways 313 in the case 303 for passing cooling fluid from the heat exchanger 314 to the drive unit 306 and/or drive train 308. The passageways 313 extend along and through portions of the case 303 to distribute the cooling fluid to the conduits 311 and otherwise circulate the cooling fluid around the drive assembly 304. The passageways 313 can be formed as part of a casting process or post-processing of the case 303, for example. In some embodiments, the passageways 313 of the case 103 are used without the conduits 311. In some embodiments, the conduits 311 are used without the passageways 313. In some embodiments, one or more rings 317 are arranged to receive the cooling fluid and distribute the cooling fluid around the stator 392 and/or rotor 394, such as for distribution of the cooling fluid to passageways in the drive unit 306. In the illustrative embodiment, the ring 317 further acts as a clamp ring for holding the drive unit 306 to the case 303. For example, fasteners, such as studs and nuts, engage with the clamp ring 317 and case 303 to hold the drive unit 306 on the case 303 as detailed herein.

Figure 36:
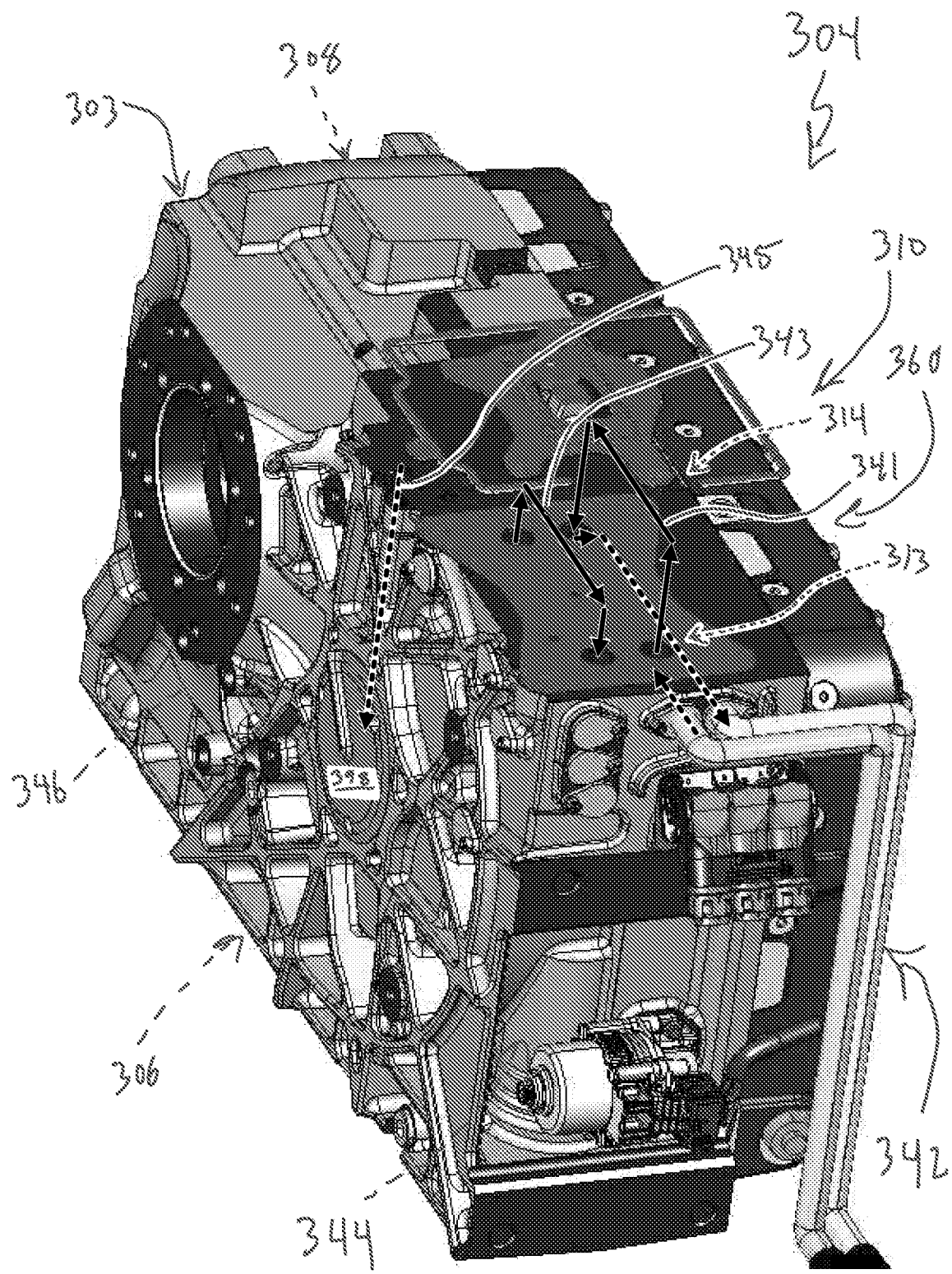
Figure 37:
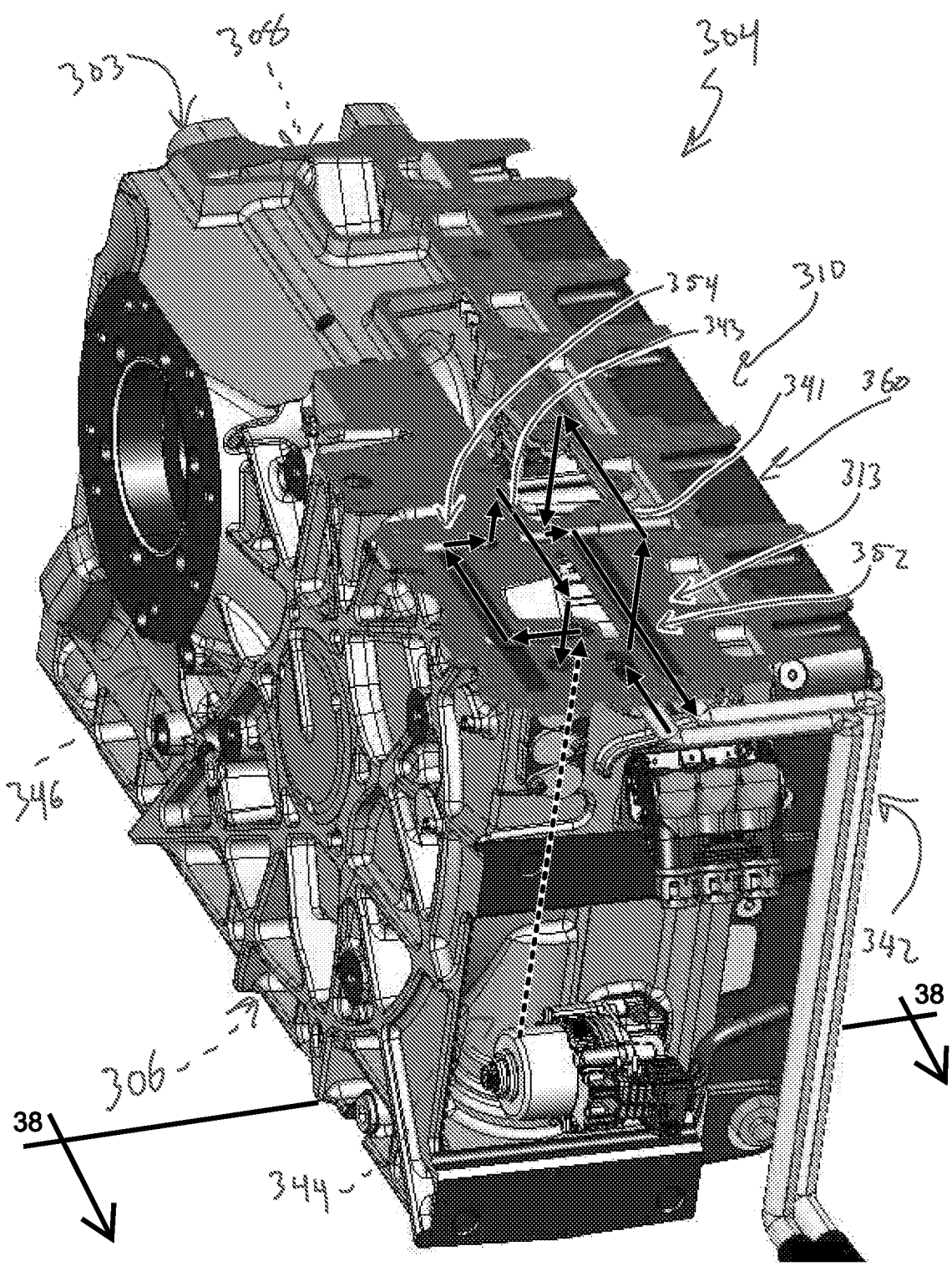
Figure 38:
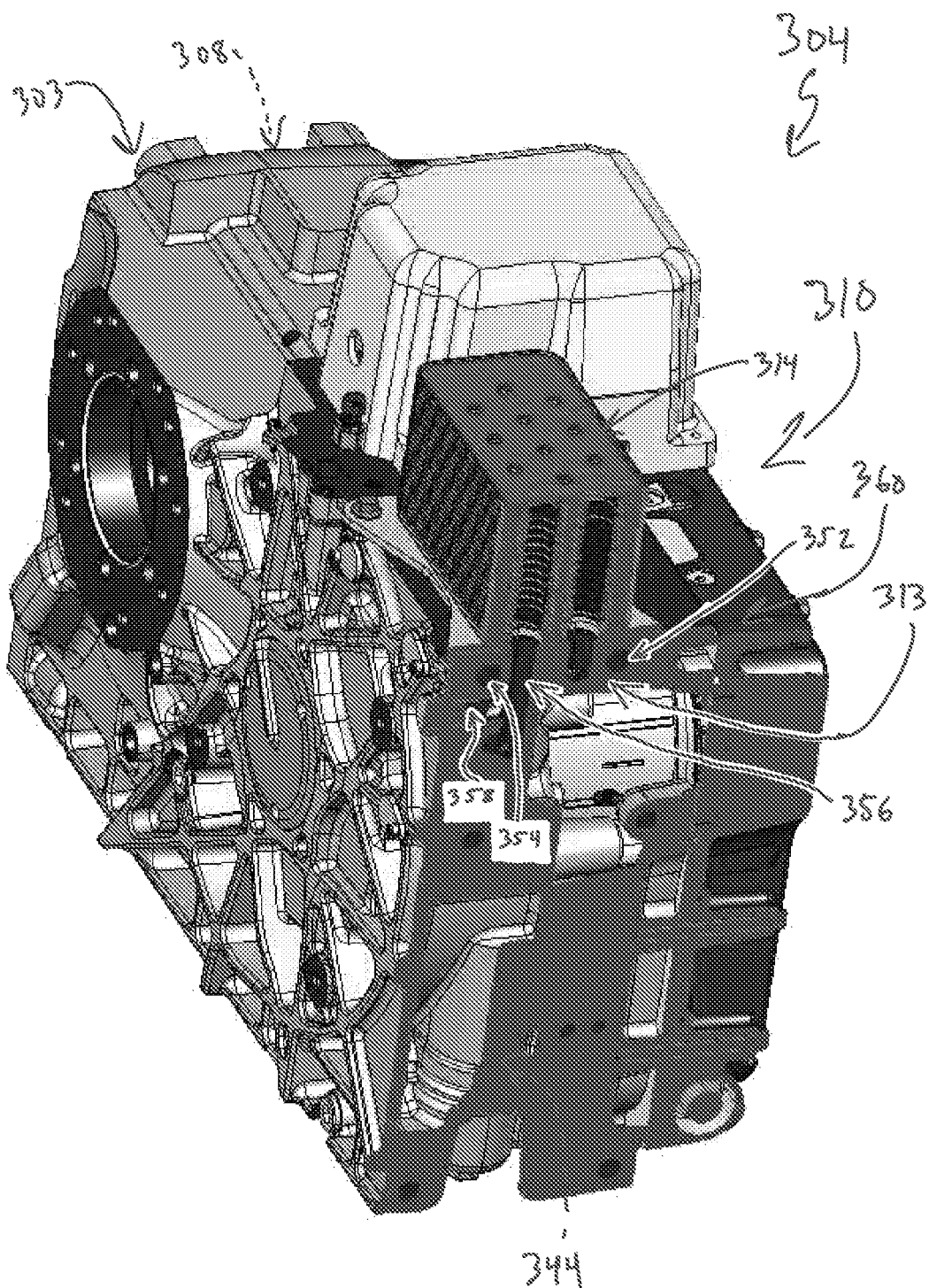

An exemplary flow path for the exchange medium through the heat exchanger 314 is schematically represented by arrows 341 in FIGS. 36 and 37. The exchange medium enters the case 303 through one of the conduits 342, passes up and through the heat exchanger 314, and passes down and through a passageway 352 of the case 303 to the other conduit 342. An exemplary flow path for the cooling fluid through the heat exchanger 314 is schematically represented by arrows 343. The cooling fluid passes up into and through the heat exchanger 314 from a passageway 354 of the case 303 (FIG. 37), and passes down into the case 303 through passageways 356, 358 (FIG. 38) for circulation through the case 303. In some embodiments, a portion of the cooling fluid can be circulated to a cap 298 coupled to the case 303 through an inlet 351 and passageway 353 (FIG. 42) for distribution to the drive unit 306 as schematically represented by arrow 345 in FIG. 36.

Figure 40:
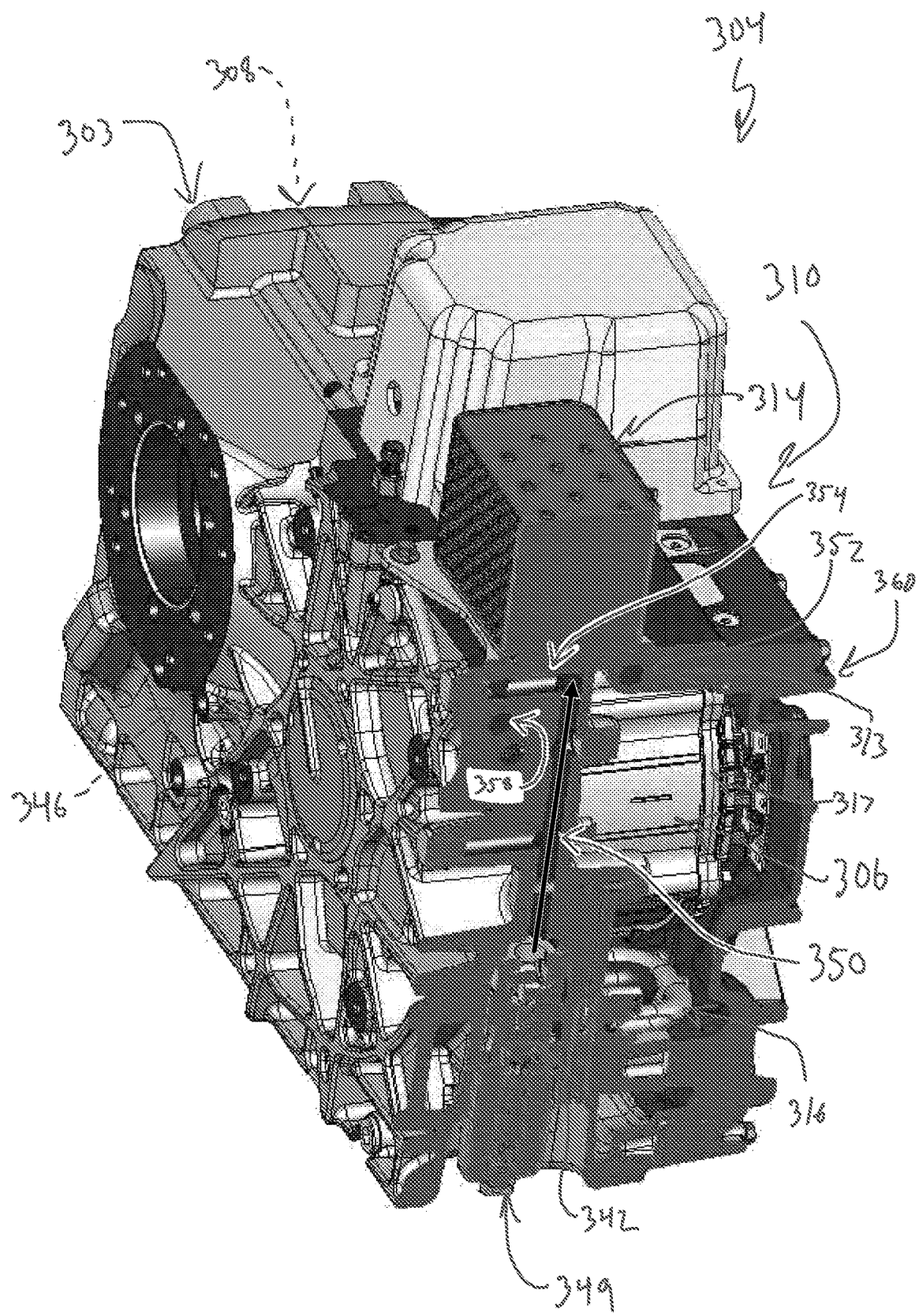
Figure 41:
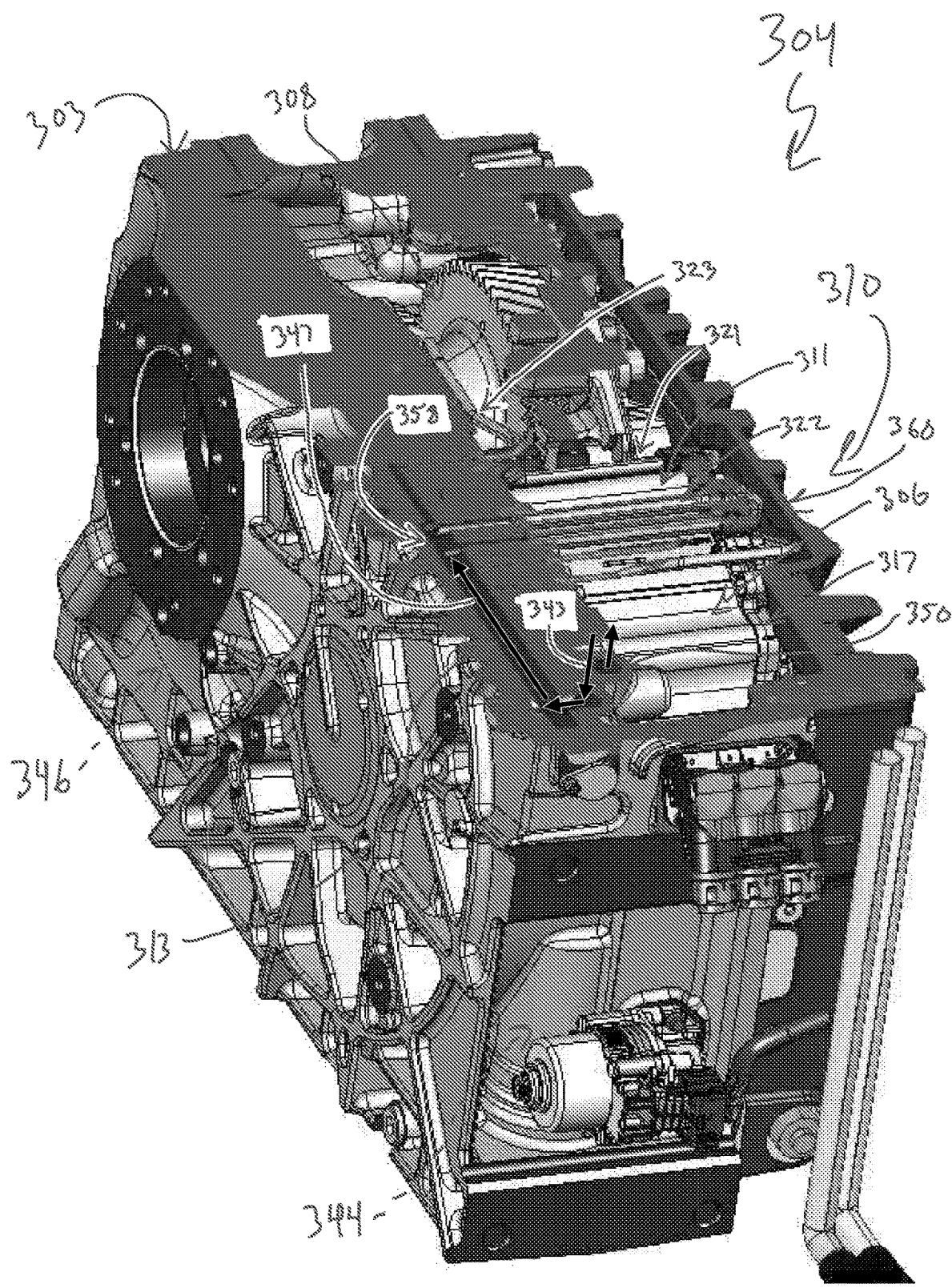
Figure 42:
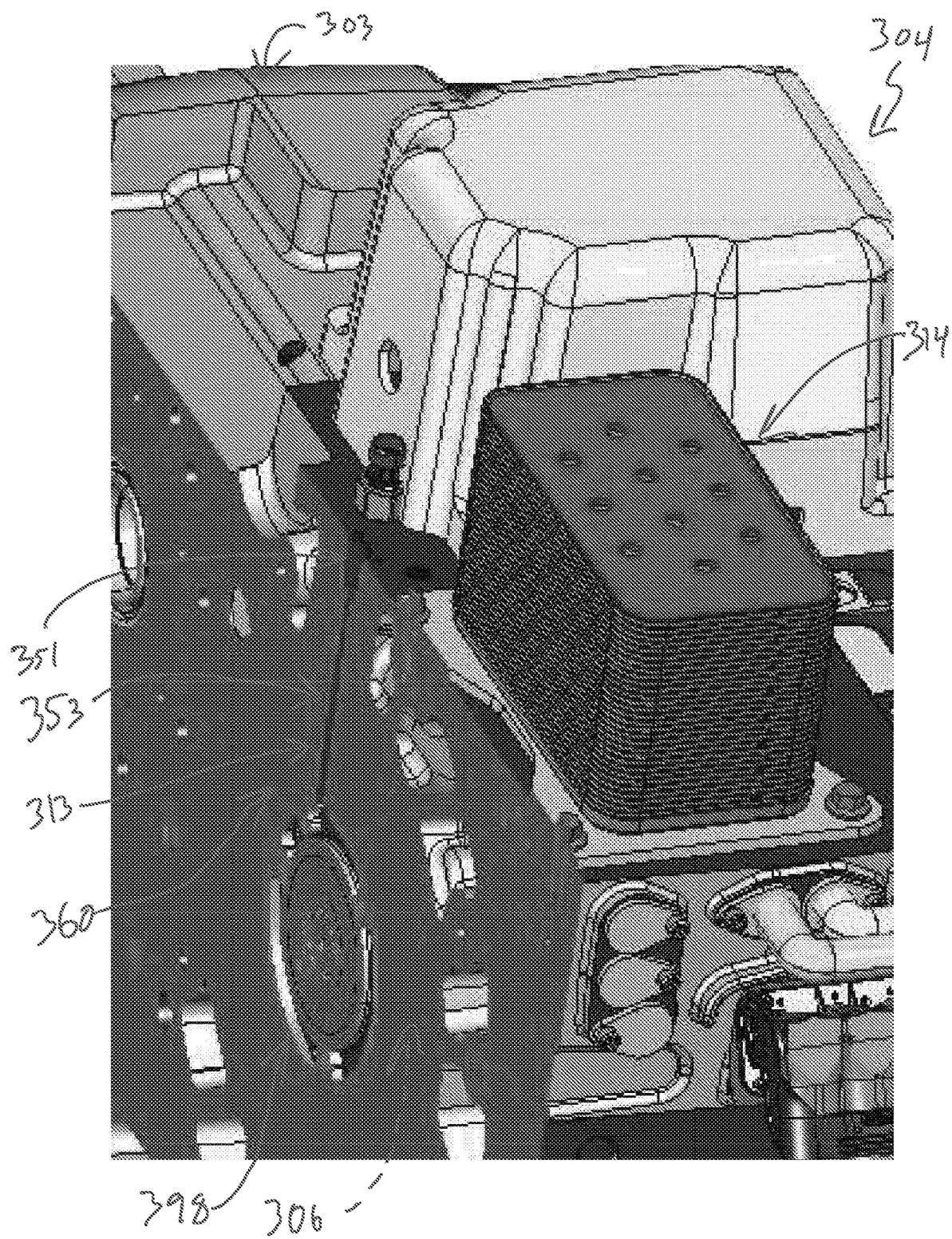

The first and second pumps 344, 346 pass cooling fluid into a passageway 350 for distribution to the passageway 354 into the heat exchanger 314 as shown in FIG. 40. In some embodiments, the cooling fluid moved by pump 346 passes through and/or around pump 344 into a passageway 350. The flow of cooling fluid from the heat exchanger 314 (arrow 343 in FIG. 41) passes into the passageway 358 as represented by arrow 347. In the illustrative embodiment, one or more of the conduits 311 are arranged to circulate cooling fluid from the passageway 358 around the case 303. For example, the conduits 311 can include one or more core sprayers 321, feed tubes 322, transfer tubes 323, winding sprayers, and other possible conduit configurations as detailed herein for delivering cooling fluid through the drive assembly 304 as suggested in FIG. 41. In some embodiments, one or more of the passageways 313 in the case 303 define one or more winding sprayers for spraying cooling fluid onto the windings 397 of the drive unit 306 as detailed herein.

The conduits 311, passageways 313, and other structures described herein and contemplated by the present disclosure for moving the cooling fluid through the drive assembly 304 can collectively be referred to as a fluid-delivery network 360 of the cooling system 310.

Figure 43:
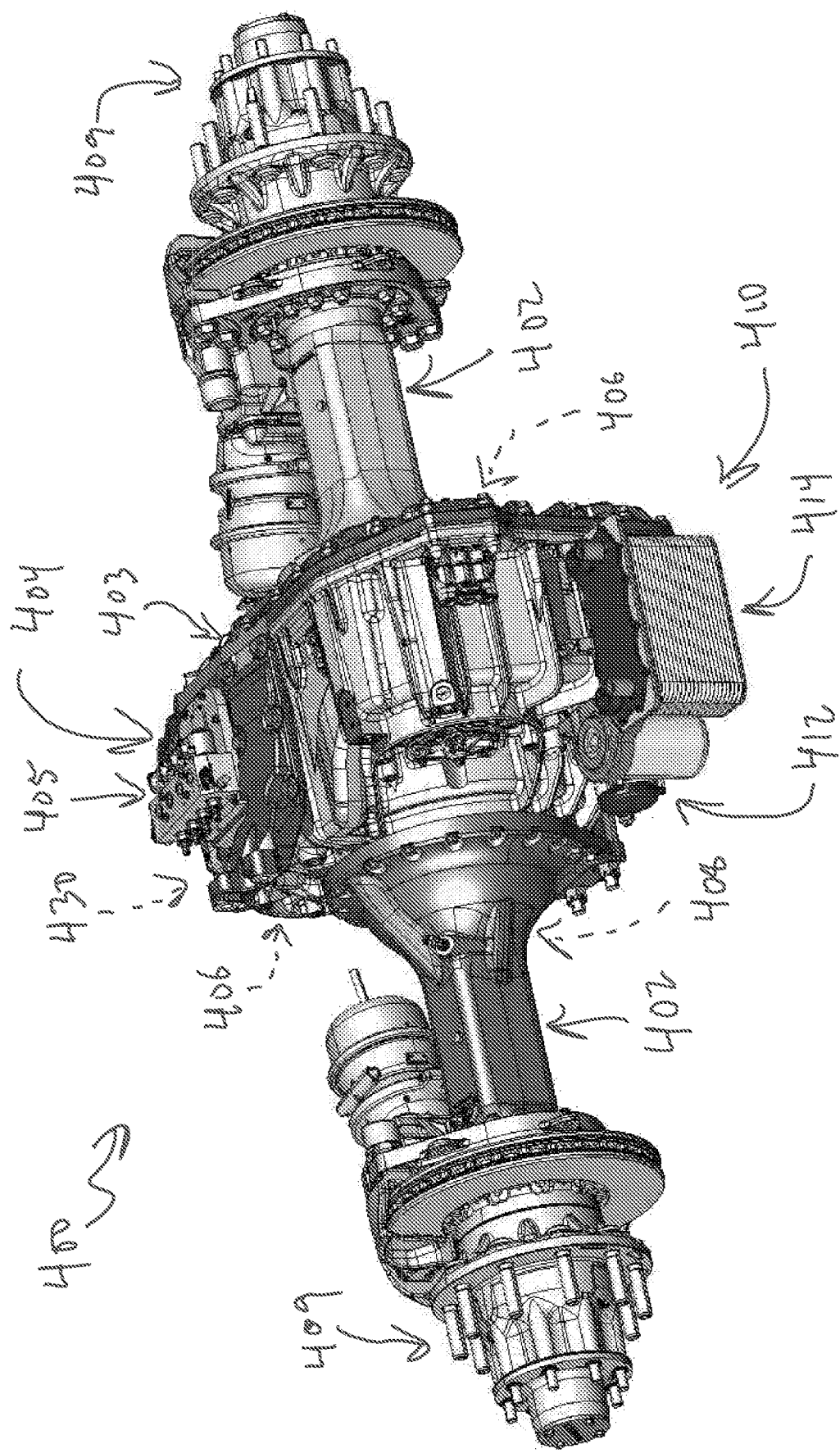
FIGS. 43-50 show an electric axle assembly according to a fourth embodiment of the present disclosure.

Another embodiment of an electric axle assembly 400 in accordance with the present disclosure is shown in FIG. 43. The electric axle assembly 400 is similar to the electric axle assembly 200 shown in FIGS. 14-30 and described above, with similar reference numbers in the 400's used to identify similar structures in the electric axle assembly 400 to those of electric axle assembly 200. The electric axle assembly 400 includes a drive assembly 404 and axle tubes 402 extending from opposite sides of the drive assembly 404. A controller 405 controls operation of the electric axle assembly 400. The drive assembly 404 includes a drive input 430 and a drive train 408. In the illustrative embodiment, the drive input 430 includes a pair of drive units 406, such as electric motors. The drive units 406 and drive train 408 are housed in a case 403 of the drive assembly 404. The drive train 408 extends through the axle tubes 402 to engage with wheel hubs 409. The wheel hubs 409 allow attachment of wheels to the drive assembly 404 for rotation with rotation of the drive train 408 by the drive input 430. The drive units 406 provide motive force to the wheels through the drive trains 408 for propelling the vehicle along the ground.

A cooling system 410 in accordance with the present disclosure circulates a cooling fluid, such as oil, transmission fluid, or other substantially non-conductive fluid, to drive assembly 404 as suggested in FIGS. 43-46. The cooling fluid circulated by the cooling system 410 controls heat produced by the drive units 406 during operation. In the illustrative embodiment, the cooling system 410 includes a pump 412 and a heat exchanger 414. The pump 412 passes cooling fluid from the case 403 through the heat exchanger 414 (as schematically shown by arrows 443 in FIG. 44) and back into the case 403 through one or more inlets 462, 464, 466, 468 (as schematically shown by arrows 445) for circulation to the drive units 406 and/or drive train 408. The pump 412 can be driven by one of the drive units 406 and/or drive trains 408 and/or through a separate drive arrangement. In the illustrative embodiment, the pump 412 includes a pump 444 operated by one or more drive arrangements 446, 448. For example, the drive arrangement 446 can be engaged with the drive train 408 (FIG. 47) to transfer motive force from the drive units 406 to the pump 444 during operation of the drive units 406. The drive arrangement 448 can be an electric motor and operate in addition or alternative to the drive arrangement 446. For example, in some embodiments, the drive arrangement 446 operates the pump 444 to continuously circulate cooling fluid through the case 403 and the drive arrangement 448 provides additional cooling fluid flow during operation of the drive unit 406. In some embodiments, the drive arrangement 446 operates the pump 444 during idle periods of the drive unit 406 to circulate the cooling fluid and ceases operation in favor of the drive arrangement 448 with operation of the drive unit 406. In some embodiments, the drive arrangement 446 operates the pump 444 when the drive unit 406 is operating below a certain threshold (e.g., rotational speed, power level, etc.).

Figure 44:
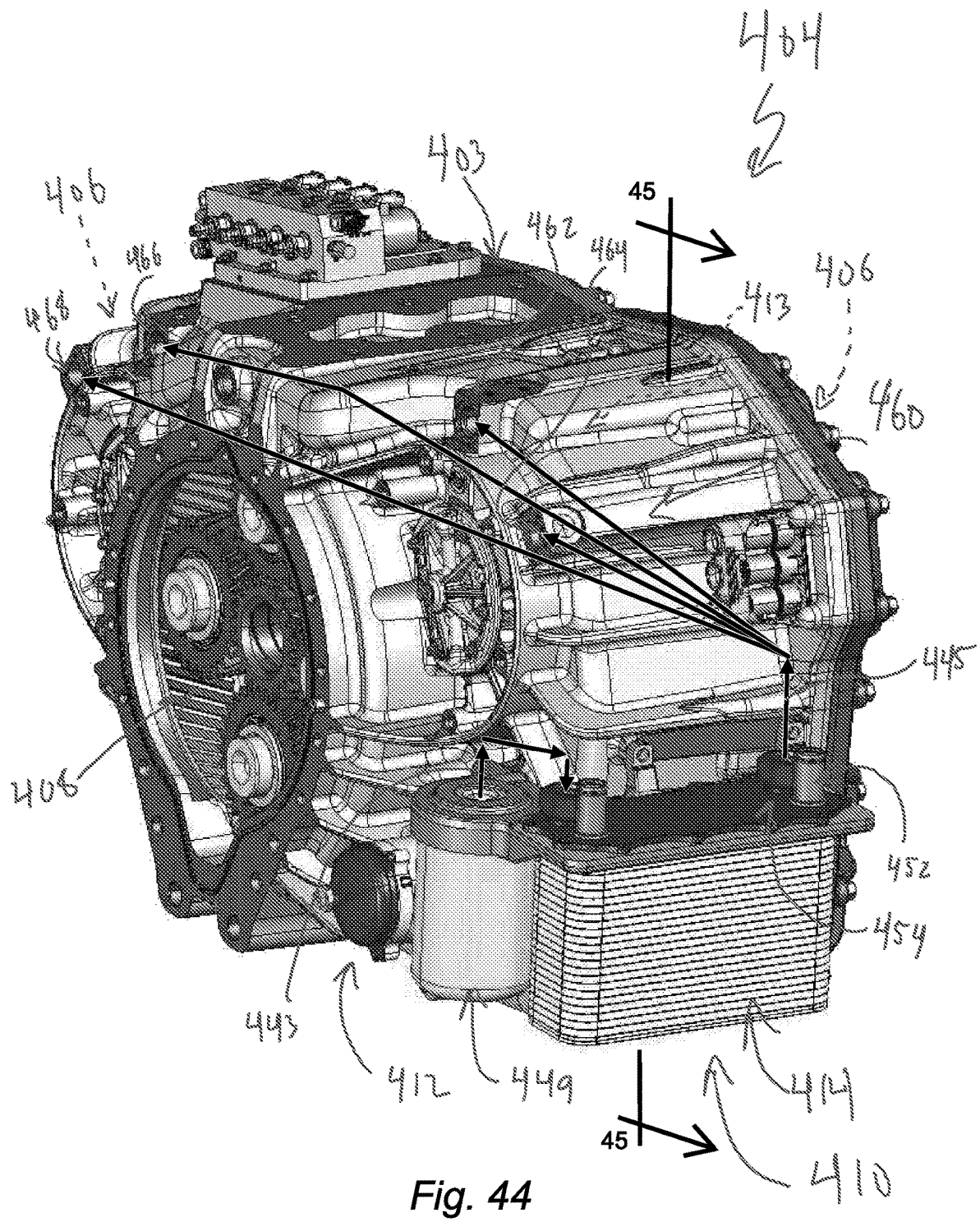

The cooling fluid passes through the heat exchanger 414 to remove heat from the cooling fluid as suggested in FIG. 44. The cooled fluid passes through one or more conduits (schematically represented by arrows 445) and enters the case 403 the inlets 462, 464, 466, 468. The cooling fluid is distributed through the case 403 for cooling and/or lubricating the drive units 406 and/or the drive trains 408. In the illustrative embodiment, the heat exchanger 414 is a liquid-cooled heat exchanger passing an exchange medium, such as water or antifreeze, in a parallel or counter flow through fittings 454 to draw heat from the cooling fluid into the exchange medium. In some embodiments, the exchange medium can be used in another cooling system elsewhere in the vehicle to cool other vehicle components, such as the batteries and/or power inverters. In some embodiments, the heat exchanger 414 is an air-cooled heat exchanger. In some embodiments, multiple pumps 412 and/or heat exchangers 414 can be used. In some embodiments, each drive unit 406 is provided with its own cooling system 410.

Figure 45:
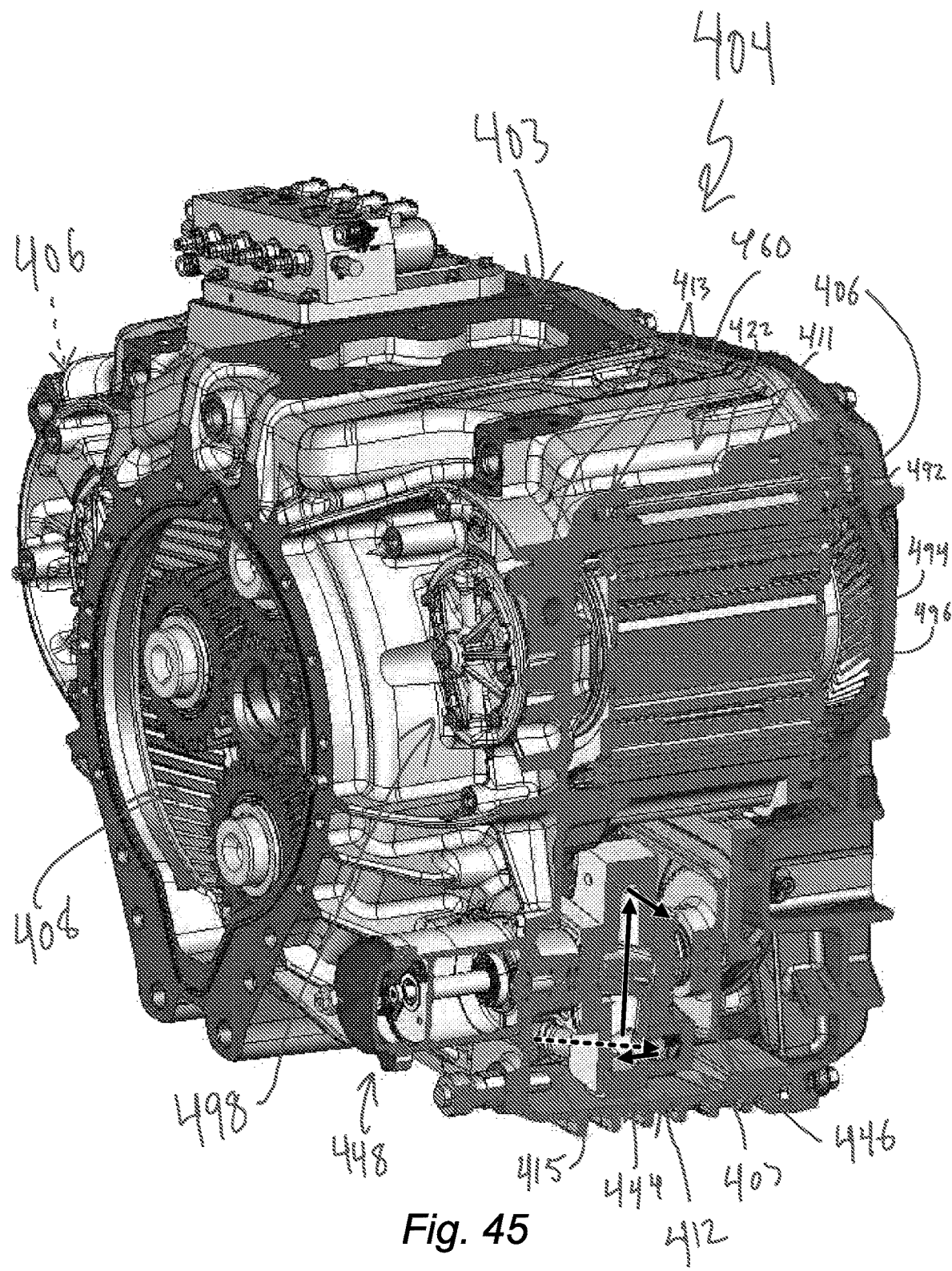
Figure 46:
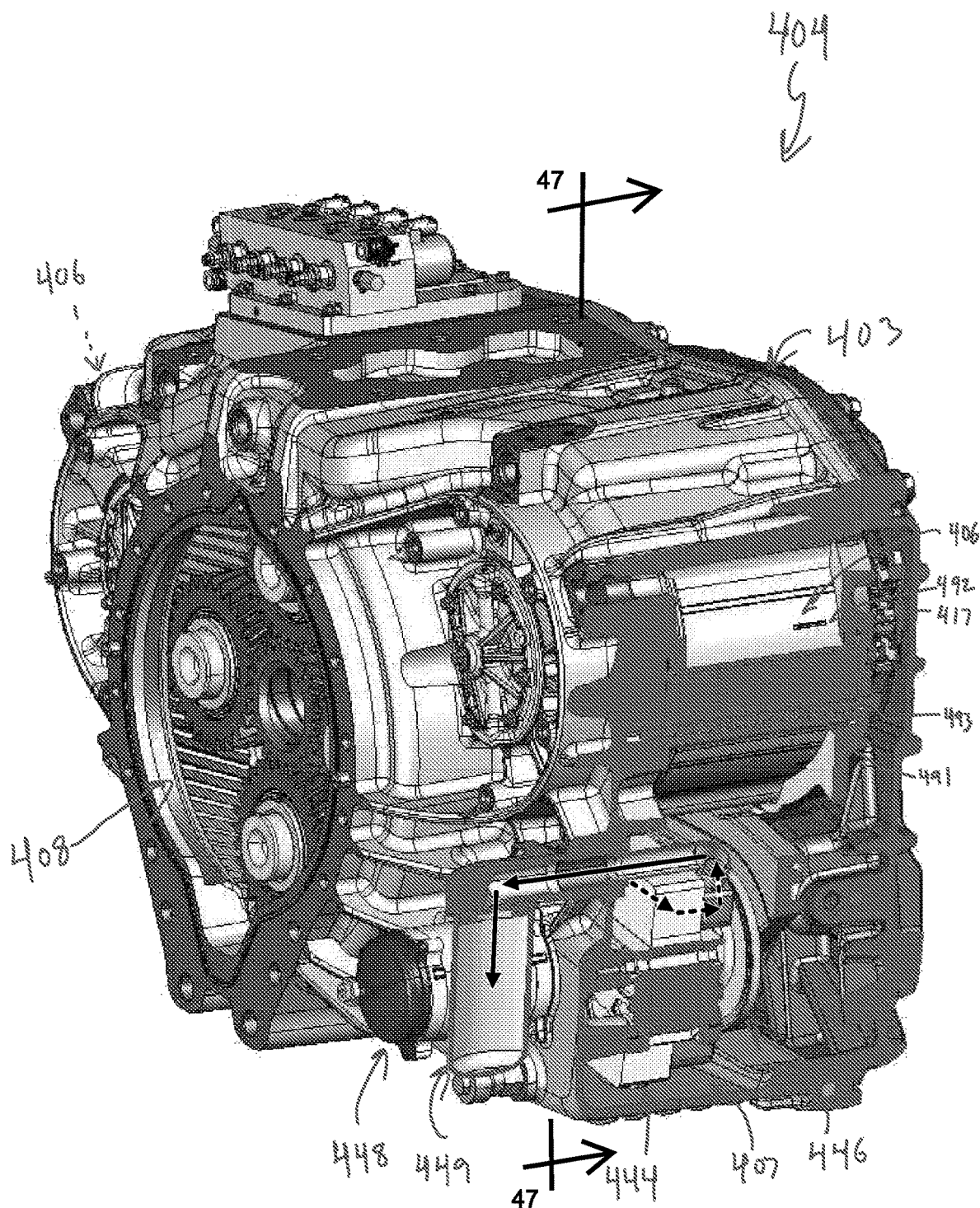
Figure 47:
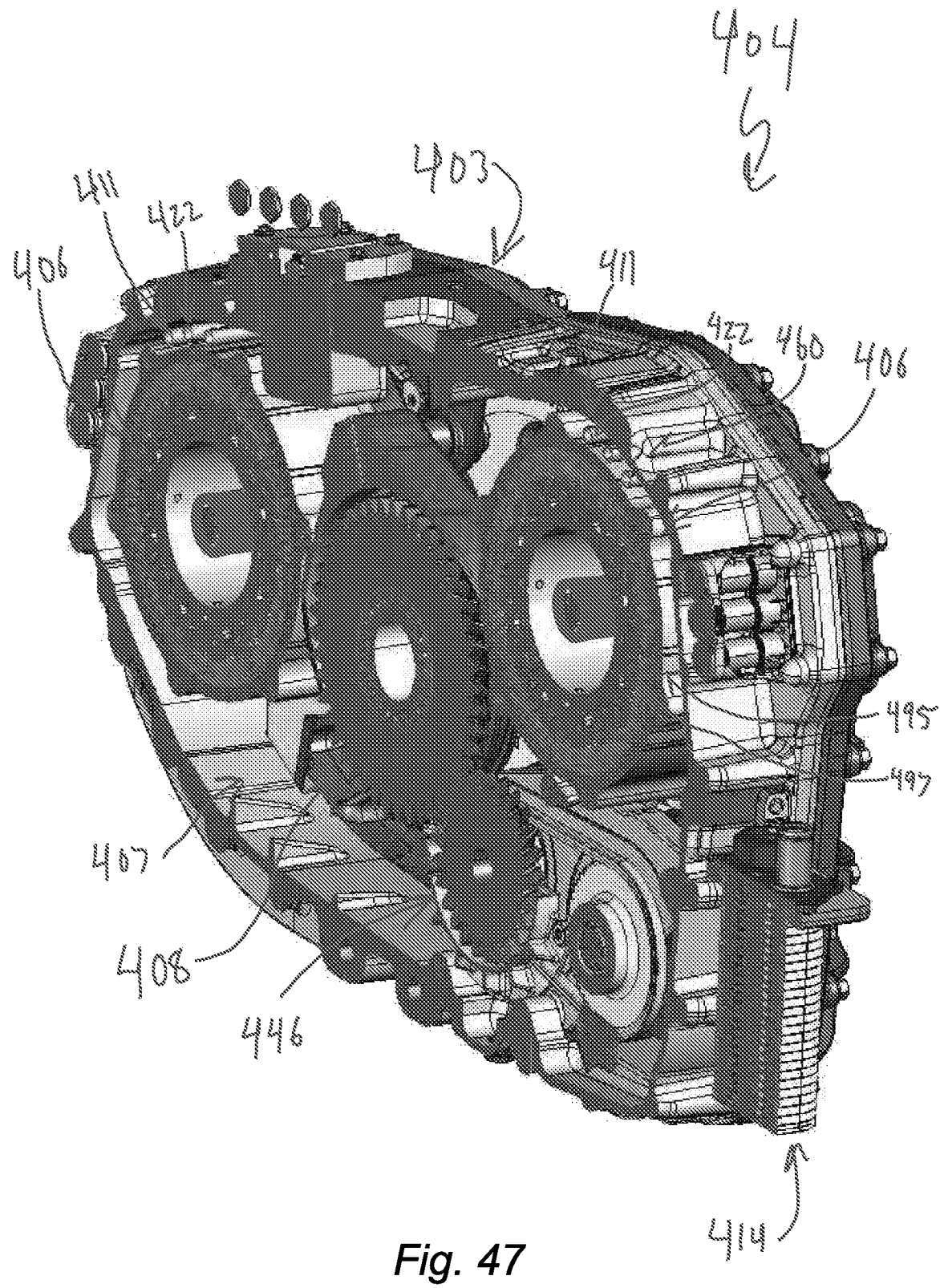

The cooling fluid flows onto and/or into the drive unit 406 and/or drive train 408 and down to a lower portion of the case 403 (e.g., below the axle tubes 402) defining a sump 407 for the cooling fluid to collect as shown in FIGS. 45-49. In some embodiments, a pickup 415 is arranged in the sump 407 and fluidly coupled to the pump 444 (such as by a conduit 416) to draw cooling fluid from the case 403 for re-circulation as shown in FIGS. 45 and 46. In some embodiments, the pickup 415 includes a filter to clear debris from the cooling fluid. In some embodiments, the filter 449 is coupled to the cooling system 410 outside of the case 403 for replacement. One or more gears of the drive train 408 can extend into the sump 407 for spreading the cooling fluid to other gears of the drive train 408 as shown in FIG. 47. Rotation of the gears can also splash the cooling fluid throughout the case 403 for lubricating contact surfaces.

An exemplary drive unit 406 is shown in section in FIGS. 45 and 47. The drive units 406 can be constructed similar to drive units 106, 206, 306 described above. In the illustrative embodiment, the drive units 406 each include a stator 492 and a rotor 494. The stator 492 is coupled to the case 403 of the drive assembly 404, and the rotor 494 is arranged for rotation relative to the stator 492. Pinion gears 496 are coupled to the rotors 494 and engage with the drive train 408 for transferring motive force from the drive units 406 to the drive train 408. In some embodiments, the drive units 406 include internal passageways in the stator 492 and/or rotor 494 for flow of cooling fluid through the drive units 406. The stator 492 includes a core 495 and windings 497.

Figure 48:
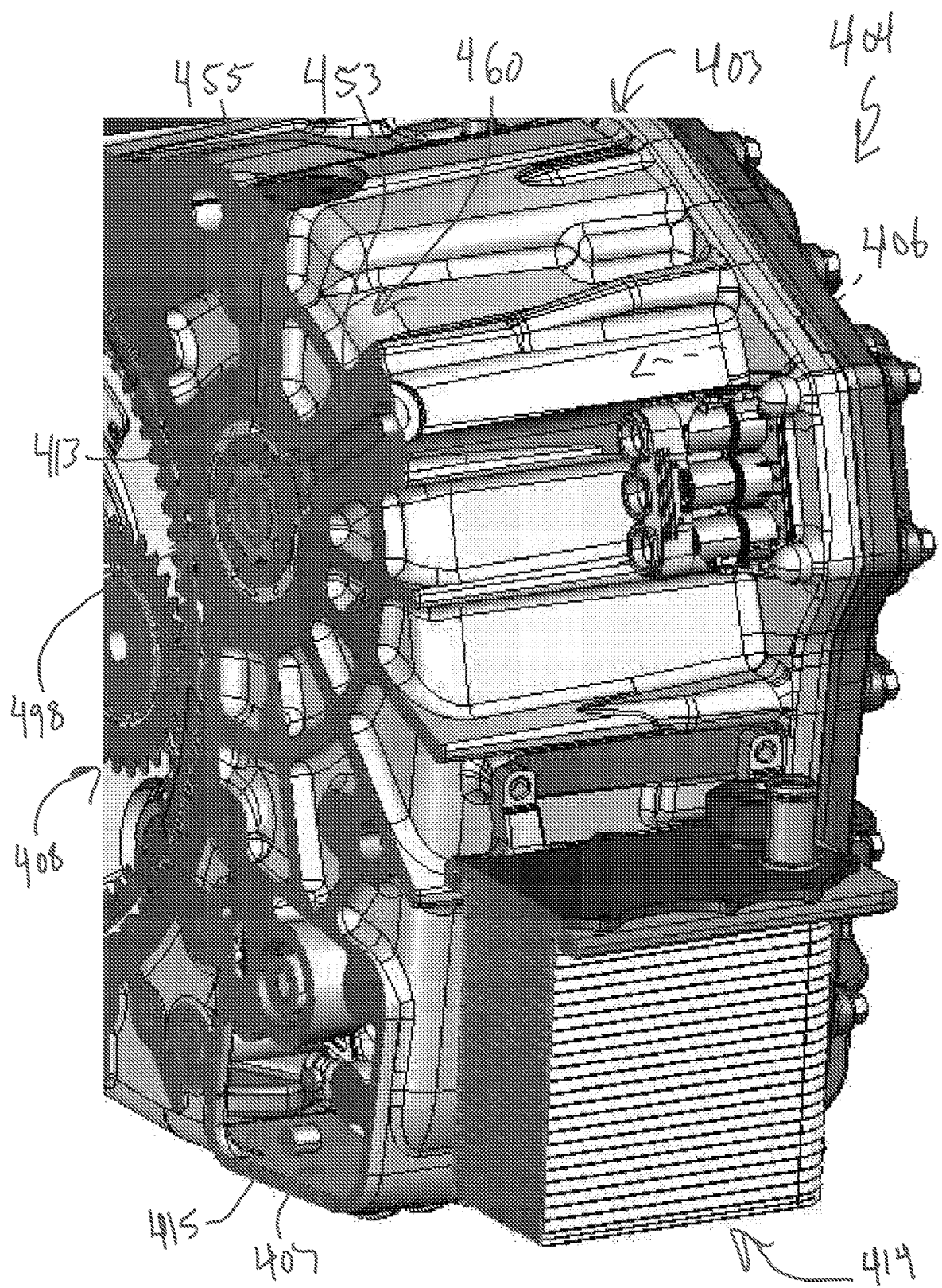
Figure 49:
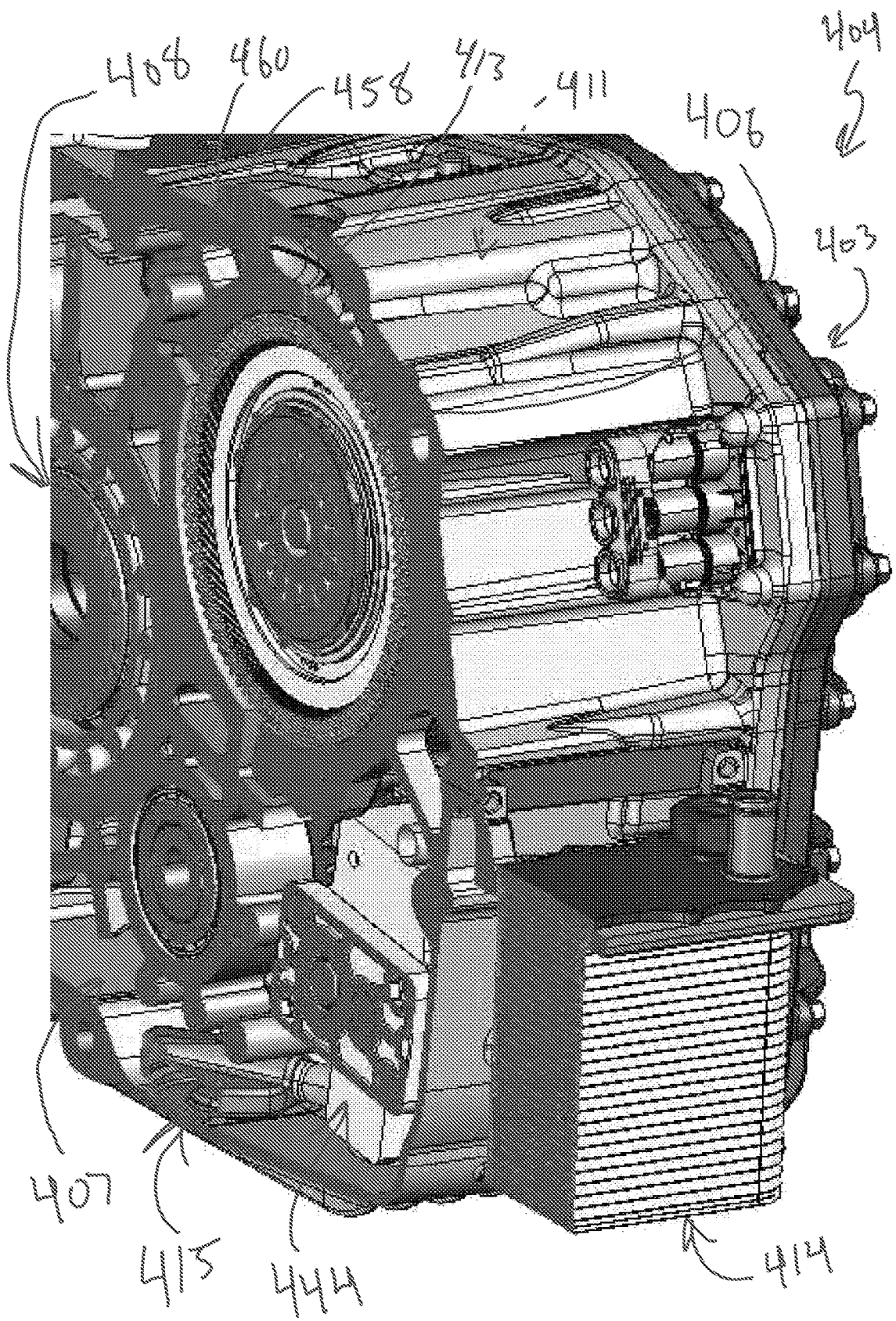
Figure 50:
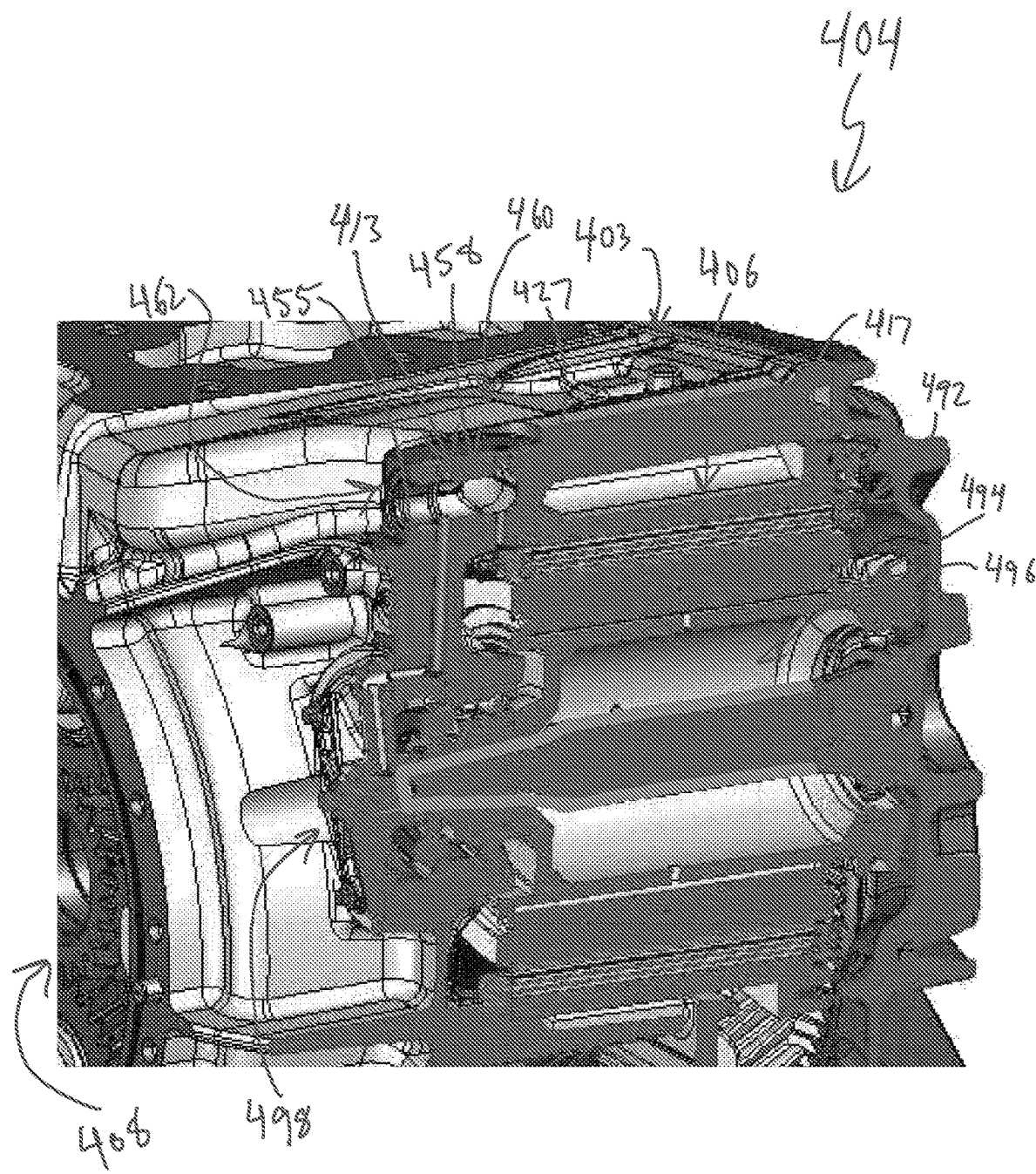

In the illustrative embodiment, one or more conduits 411 are provided as part of the cooling system 410 for directing the cooling fluid from the heat exchanger 414 to the drive units 406 and/or drive train 408. The conduits 411 can be arranged to pass the cooling fluid into the internal passageways of the drive unit 406 and/or direct cooling fluid onto the drive unit 406. In some embodiments, the conduits 411 are coupled to passageways 413 in the case 403 for passing cooling fluid from the inlets 462, 464, 466, 468 to the drive units 406 and/or drive train 408 as shown in FIGS. 45 and 48-50. In some embodiments, the passageways 413 can be formed through case 403 similar to passageways 13, 213, 313 through the cases 103, 203, 303 described above. The passageways 413 in case 403 extend along and through portions of the case 403 to distribute the cooling fluid to the conduits 411 and otherwise circulate the cooling fluid around the drive assembly 404. The passageways 413 can be formed as part of a casting process or post-processing of the case 403, for example. In some embodiments, the passageways 413 of the case 403 are used without the conduits 411. In some embodiments, the conduits 411 are used without the passageways 413. In some embodiments, one or more rings 417 are arranged to receive the cooling fluid and distribute the cooling fluid around the stators 492 and/or rotors 494, such as for distribution of the cooling fluid to passageways in the drive units 406. In some embodiments, caps 498 can be coupled to the case 403 and arranged to receive cooling fluid from the passageways 413 of the case 403 (such as a passageway 453 fed by inlet 464 and a passageway 455 fed by inlet 462 as shown in FIGS. 48 and 50) and pass the cooling fluid into the rotor 494 and/or stator 492 of the drive units 406.

In exemplary embodiments, the conduits 411 can include one or more core sprayers, feed tubes 422, transfer tubes, winding sprayers, and other possible conduit configurations as detailed herein for delivering cooling fluid through the drive assembly 404 as suggested in FIGS. 45 and 47-50. The conduits 411 can be supplied with cooling fluid by one or more of the passageways 413 in the case 403 or otherwise supplied with cooling fluid from the pump 412. In the illustrative embodiment, the feed tubes 422 transfer cooling fluid received from the inlets 462, 466 and passageways 413 of the case 403 (such as passageway 458 shown in FIG. 49) to the ring 417 having one or more internal passageways (similar to ring 17 described above) for distribution of the cooling fluid around the drive unit 406 and for use by the drive unit 406. In some embodiments, the passageways of the ring 417 can be formed as a cavity during a molding process, with an insert molding process, or by a machining operation, for example. In some embodiments, one or more of the passageways 413 in the case 403 define a winding sprayer 427 for spraying cooling fluid onto the windings 497 of the drive units 406. In some embodiments, the winding sprayer 427 is formed in the case 403 in an arcuate path around the drive unit 406. In some embodiments, the winding sprayer 427 includes a series of outlet orifices circumferentially distributed around the drive unit 406 above the windings 497 for spraying the windings 497 with cooling fluid. Other configurations are contemplated.

In the illustrative embodiment, each ring 417 further acts as a clamp ring for holding the respective drive unit 406 to the case 403 as shown in FIG. 46. For example, fasteners, such as studs 491 and nuts 493, engage with the clamp ring 417 and case 403 to hold the drive unit 406 on the case 403. The studs 491 are circumferentially distributed around the drive unit 406 and extend through the clamp ring 417 to engage with the case 403, such as by cooperative threading on the stud 491 and case 403. The nut 493 engages with the stud 491, such as by cooperative threading on the stud 491 and nut 493, and engages with the clamp ring 417 to force the clamp ring 417 against the stator 492 and force the stator 492 against the case 403. The clamp ring 417 distributes clamping force from the fasteners evenly around the stator 492. In some embodiments, the studs 491 extend through the stator 492. The clamp ring 417 can be formed as a single component or in multiple sections assembled together.

The conduits 411, passageways 413, and other structures described herein and contemplated by the present disclosure for moving the cooling fluid through the drive assembly 404 can collectively be referred to as a fluid-delivery network 460 of the cooling system 410.

The descriptions herein of the various embodiments of electric axle assemblies may be incorporated by reference with respect to one another.

In illustrative embodiments, electric axle assemblies in accordance with the present disclosure can be arranged for use with a vehicle such as, for example, a body-on-frame truck. Wheels are arranged at opposing ends of the electric axle assemblies to support the vehicle for conveyance along a ground surface. The electric axle assemblies propel the vehicle by transferring motive power to the wheels in contact with the ground surface. The vehicle can include a chassis upon which a body and other equipment may be supported. For example, a cab, a cargo box, a lift boom, or a hitch system may be mounted to the chassis. The chassis can include frame rails; suspension components such as springs, dampers, and trailing arms; and brake components such as air cylinders, brake calipers, brake rotors, brake drums, brake hoses, and the like. The electric axle assemblies can be mounted perpendicular to the frame rails such that the vehicle travels in a direction aligned with the frame rails.

In illustrative embodiments, the electric axle assemblies may be configured for "single-wheel" applications and "dual-wheel" applications. In "single-wheel" applications a single wheel is coupled to each end of the electric axle assembly. Likewise, in "dual-wheel" applications, wheels are arranged in pairs at each end of the electric axle assembly. Vehicles requiring increased payload or towing capacity are one example of a "dual-wheel" application. Vehicles that require a further increased payload/towing capacity may be equipped with two or more electric axle assemblies. Some vehicles may require drive devices other than wheels. For example, crawler tracks or rail wheels may be coupled to the electric axle assembly to propel the vehicle. The electric axle assembly may be mounted to the vehicle in the front and in the rear to realize various drive types such as front-wheel drive, rear-wheel drive, and all/four-wheel drive.

In illustrative embodiments, vehicle performance is optimized when the wheels are in constant contact with the ground. In order to more easily follow the ground, a suspension system can movably couple the electric axle assembly to the frame rails. The suspension system allows the electric axle assembly to move relative to the frame rails and urges the wheels toward the ground when the vehicle encounters imperfections in the ground. The suspension system may include springs and dampers, which absorb movement and improve ride quality; control arms that constrain the movement of the electric axle assembly; and other elements as determined by the application such as steering and kinematic linkages. The electric axle assembly may also be mounted to a vehicle that was not originally equipped with an electric axle assembly. The electric axle assembly can be retrofit to these vehicles to offer an electric driveline upgrade.

In illustrative embodiments, the electric axle assembly may be utilized in both hybrid-electric and fully-electric vehicles. In a fully-electric vehicle, electricity to power the electric axle assembly may be stored in a battery mounted to the chassis. Alternatively, electricity may be supplied from an external power source, such as an overhead wire or third rail system. If the vehicle is configured as a hybrid-electric vehicle, an internal combustion engine may be mounted to the chassis and coupled to an drive unit capable of generating electricity; the electricity may power the electric axle assembly directly, or may be stored in a battery.

In illustrative embodiments, the electric axle assembly can include a drive housing (sometimes called a case) that houses at least one drive unit and drives a gear train (sometimes called a drive train). The drive unit is coupled to the drive housing and engaged with the gear train to transfer power to the wheels. The gear train may include a series of gears and shafts supported for rotation within the drive housing. Typically, bearings are used to reduce friction between rotating components of the gear train. Various bearing types may be used depending on the requirements of the application, for example, journal (plain) bearings, roller bearings, ball bearings, etc. Friction is further reduced through the use of a lubricant, such as oil supplied to contact surfaces between components, such as gear teeth and bearings, to prevent wear and to reduce heat. The electric axle assembly may further include two wheel ends (sometimes called wheel hubs) coupled to the drive housing. It should be appreciated that the drive housing and wheel ends may be constructed and coupled in a variety of ways. The electric axle assembly can be configured for use in a low-floor bus and include multiple drive housings, each arranged on opposing sides of the electric axle assembly. The drive housings may be assembled using fasteners and the like. The electric axle assembly can include a single drive housing configured to support multiple drive units.

In illustrative embodiments, the drive unit includes a rotor and a stator. The rotor is supported for rotation about a rotor axis by bearings in the drive housing. The stator is coupled to the drive housing and disposed about the rotor such that the rotor rotates within the stator. During operation, the drive units of the electric axle assembly generate heat, primarily through friction between the contact surfaces and electrical current flowing through the windings of the electric motors. Performance of the drive units is improved with a cooling system that transfers heat away from the drive units during operation. The cooling system can include a coolant fluid, a pump, and a heat exchanger. The cooling system reduces the temperature of the electric axle assembly by pumping coolant fluid through the heat exchanger and distributing the coolant fluid to the drive units.

In illustrative embodiments, the oil used to lubricate the electric axle assembly serves as the coolant fluid. The oil is non-conductive, which allows the oil to contact high-voltage portions of the drive units. Oil is pumped through the cooling system and supplied to the drive units as well as the contact surfaces of the gear train. The pump can be an oil pump that pumps oil from a pump inlet to a pump outlet. Oil is pumped into the heat exchanger and supply lines to direct the oil toward a desired component within the drive housing. The oil pump may be powered by a discrete electric motor or may be driven by the gear train. In some embodiments, the cooling system may comprise two pumps, each powered by a respective electric motor.

In illustrative embodiments, the heat exchanger that cools the oil by transferring heat into a second coolant fluid. The heat exchanger is arranged downstream of the pump and removes heat from the oil. In some embodiments more than one heat exchanger may be implemented, such as in an axle with two independent cooling systems, or to increase the cooling capacity of the cooling system. The heat exchanger may utilize a variety of fluids as the second coolant fluid, for example water or antifreeze. The heat exchanger may further be configured as a radiator to cool the oil using a source of flowing air. Furthermore, heat rejection requirements of the heat exchanger may permit the use of a finned oil tank to cool the oil without airflow. Further still, it is contemplated that the cooling system may comprise a thermostat arranged between the oil pump and the heat exchanger blocking oil from flowing into the heat exchanger until a predetermined temperature is reached.

In illustrative embodiments, oil is supplied to the pump from an oil sump in each housing via a respective pickup tube fluidly coupled to the pump inlet. The pickup tube may include a pickup screen or filter element to help prevent contaminants that have settled in the oil sump from reaching the pump. Oil in the sump flows through each pickup tube and into the pump, which pumps the oil out of each pump outlet and into auxiliary lines. The auxiliary lines route oil to a distribution manifold where the flow is merged into an outlet line coupled between the distribution manifold and the heat exchanger. The heat exchanger may an inlet and an outlet, with the inlet is arranged to receive oil from the pump and the outlet is coupled to a housing case gallery (sometimes called a passageway) defined in the drive housing.

In illustrative embodiments, cooled oil from the heat exchanger flows into the housing case gallery, which may be realized as one or more passages that are formed in the housing case by casting or by machining Each passage routes oil from a housing case gallery inlet to one or more housing case gallery outlets to be further distributed within an interior of the drive housing.

In illustrative embodiments, a clamp ring comprises an upper portion and a lower portion, which interlock to form a ring. Each portion defines a plurality of mounting holes that receive threaded fasteners for coupling the drive unit to the drive housing. In some embodiments, the clamp ring is formed from a polymer or composite material, for example by an injection molding process. In some embodiments, the clamp ring is formed from a fiber reinforced polymer such as glass-filled nylon. Other materials, such as metals and alloys, and processes, such as casting or forging, are contemplated.

In illustrative embodiments, the cooling system further comprises a crossover tube that transfers oil between the housing case gallery and the clamp ring gallery. The crossover tube extends between a first end coupled to the housing case in fluid communication with the housing case gallery and a second end coupled to the clamp ring in fluid communication with the clamp ring gallery. Oil flows from one of the housing case gallery outlets, through the crossover tube, into the clamp ring gallery.

In illustrative embodiments, the cooling system further comprises a winding sprayer arranged above the windings of the drive unit and coupled to the clamp ring in fluid communication with one of the clamp ring gallery outlets. The winding sprayer is formed with a contoured portion that provides clearance between the winding sprayer and the windings. A series of outlet orifices, which direct oil onto the windings, are defined in the winding sprayer. Oil flows out of clamp ring gallery outlet, through the winding sprayer, to the series of outlet orifices. Other configurations are contemplated.

In illustrative embodiments, the cooling system further comprises a rear sprayer. The rear sprayer may be defined in the housing case in an arcuate path around the drive unit. The rear sprayer may comprise a series of outlet orifices in fluid communication with one of the housing case gallery outlets and arranged above the windings protruding from the second end of the stator. Oil flows out of the housing case gallery outlet, through the rear sprayer, to the series of outlet orifices. Other configurations are contemplated.

In illustrative embodiments, the electric axle assembly may include a gear baffle disposed in the oil sump and coupled to the housing case. The gear baffle has a semi-circular profile with an open end configured to receive a portion of one of the gears of the gear train. The gear baffle protrudes into the oil sump with the open end above the oil in order to prevent oil from collecting in the gear baffle. The gear baffle creates a trough for gears partially protruding into the oil sump to rotate without skimming the oil, thereby reducing churning losses and oil aeration.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A cooling system for use with a drive unit having a stator and a rotor, the rotor having a core and windings coupled to the core, the rotor adapted for rotation relative to the stator, the stator and rotor of the drive unit being housed in a case separate from the stator, the cooling system comprising:

- a pump;
- a heat exchanger; and
- a fluid-delivery network including first passageways formed into the case in which the stator and the rotor of the drive unit are housed and a plurality of internal second passageways formed in a clamp ring engaged with the stator of the drive unit to hold the drive unit to the case, the internal second passageways of the clamp ring in fluid communication with the first passageways formed into the case, wherein the first passageways formed into the case are spaced apart from the stator of the drive unit, wherein the pump is configured to pass a cooling fluid to the heat exchanger, the heat exchanger is configured to draw heat from the cooling fluid, and the fluid-delivery network is configured to pass the cooling fluid from the heat exchanger to the drive unit.

2. The cooling system of claim 1, wherein the fluid-delivery network is arranged to direct the cooling fluid onto and/or into the drive unit for cooling the drive unit.

3. The cooling system of claim 1, wherein an exchange medium flows through the heat exchanger, and wherein heat is transferred from the cooling fluid to the exchange medium in the heat exchanger.

4. The cooling system of claim 1, wherein the cooling fluid is further configured to lubricate the drive unit.

5. The cooling system of claim 1, wherein the fluid-delivery network further includes conduits coupled to the case.

6. The cooling system of claim 1, wherein the fluid-delivery network includes a plurality of conduits comprising at least one of:
- a winding sprayer configured to spray the cooling fluid on the windings of the stator;
- a core sprayer configured to spray the cooling fluid on the core of the stator; and
- a feed tube configured to pass the cooling fluid to a ring coupled to the drive unit.

* * * * *